US012695878B2

(12) United States Patent
Liu et al.

(10) Patent No.: US 12,695,878 B2
(45) Date of Patent: *Jul. 28, 2026

(54) SUB-REGION BASED DETERMINATION OF MOTION INFORMATION REFINEMENT

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/448,591

(22) Filed: Aug. 11, 2023

(65) Prior Publication Data

US 2023/0403398 A1     Dec. 14, 2023

Related U.S. Application Data

(63) Continuation of application No. 17/506,578, filed on Oct. 20, 2021, now Pat. No. 11,736,698, which is a (Continued)

(30) Foreign Application Priority Data

May 16, 2019    (WO) ................ PCT/CN2019/087193
Jun. 4, 2019    (WO) ................ PCT/CN2019/090037

(Continued)

(51) Int. Cl.
*H04N 19/137*     (2014.01)
*H04N 19/132*     (2014.01)
(Continued)

(52) U.S. Cl.
CPC ......... *H04N 19/137* (2014.11); *H04N 19/132* (2014.11); *H04N 19/159* (2014.11); *H04N 19/176* (2014.11)

(58) Field of Classification Search
None
See application file for complete search history.

(56) References Cited

U.S. PATENT DOCUMENTS 7,627,037 B2    12/2009  Li
9,294,777 B2    3/2016   Wang
(Continued)

FOREIGN PATENT DOCUMENTS

CN        108432250 A      8/2018
CN        108496367 A      9/2018
(Continued)

OTHER PUBLICATIONS

Lai, C. et al., CE4-related: Alignment of displacement bitdepths for BDOF and PROF, Joint Video Experts Team (JVET) of ITU-T SB 16 WP 3 and ISO/IEC JTC 1/SC 29/WG 11, Input Document to JVET, JVET-O0281-v1 (Jun. 24, 2019) (Year: 2019).*

(Continued)

*Primary Examiner* — Lindsay J Uhl
(74) *Attorney, Agent, or Firm* — Conley Rose, P.C.

(57)     ABSTRACT

Devices, systems, and methods for video processing are described. In one aspect, a video processing method is provided to include determining, for a conversion between a current video block of a video and a coded representation of the video, that a motion information of the current video block is refined using an optical flow-based method in which at least one motion vector offset is derived for a region within the current video block; clipping the at least one motion vector offset to a range [−N,M], where N and M are (Continued)

1210

Determining, for a conversion between a current video block of a video and a coded representation of the video, that a motion information of the current video block is refined using an optical flow-based method in which at least one motion vector offset is derived for a region within the current video block — 1212

Clipping the at least one motion vector offset to a range [-N,M], wherein N and M are integers based on a rule — 1214

Performing the conversion based on at least one clipped motion vector offset — 1216 integers based on a rule; and performing the conversion based on at least one clipped motion vector offset.

14 Claims, 28 Drawing Sheets

Related U.S. Application Data continuation of application No. PCT/CN2020/090802, filed on May 18, 2020.

(30) Foreign Application Priority Data

| | | | |
|---|---|---|---|
| Jun. 12, 2019 | (WO) | ............... | PCT/CN2019/090903 |
| Jun. 28, 2019 | (WO) | ............... | PCT/CN2019/093616 |
| Jun. 29, 2019 | (WO) | ............... | PCT/CN2019/093973 |
| Jul. 1, 2019 | (WO) | ............... | PCT/CN2019/094282 |
| Sep. 5, 2019 | (WO) | ............... | PCT/CN2019/104489 |
| Nov. 8, 2019 | (WO) | ............... | PCT/CN2019/116757 |

(51) Int. Cl.
   H04N 19/159       (2014.01)
   H04N 19/176       (2014.01)

(56) References Cited

U.S. PATENT DOCUMENTS

| | | | | |
|---|---|---|---|---|
| 9,521,425 | B2 | 12/2016 | Chen | |
| 9,667,996 | B2 | 5/2017 | Chen | |
| 9,762,927 | B2 | 9/2017 | Chen | |
| 10,523,964 | B2 | 12/2019 | Chuang | |
| 10,701,366 | B2 | 6/2020 | Chen | |
| 10,764,592 | B2 | 9/2020 | Zhang | |
| 10,779,002 | B2 | 9/2020 | Chen | |
| 10,785,494 | B2 | 9/2020 | Chien | |
| 10,805,630 | B2 | 10/2020 | Li | |
| 10,904,565 | B2 | 1/2021 | Chuang | |
| 11,736,698 | B2 * | 8/2023 | Liu | H04N 19/52 |
| | | | | 375/240.02 |
| 2014/0286408 | A1 | 9/2014 | Zhang | |
| 2015/0181216 | A1 | 6/2015 | Zhang | |
| 2015/0365649 | A1 | 12/2015 | Chen | |
| 2018/0199057 | A1 | 7/2018 | Chuang | |
| 2018/0278949 | A1 * | 9/2018 | Karczewicz | H04N 19/577 |
| 2018/0376166 | A1 | 12/2018 | Chuang | |
| 2019/0306502 | A1 | 10/2019 | Gadde | |
| 2020/0221110 | A1 | 7/2020 | Chien | |
| 2020/0314443 | A1 * | 10/2020 | Huang | H04N 19/543 |
| 2020/0382795 | A1 | 12/2020 | Zhang | |
| 2020/0382807 | A1 | 12/2020 | Liu | |
| 2021/0029362 | A1 | 1/2021 | Liu | |
| 2021/0051339 | A1 | 2/2021 | Liu | |
| 2021/0076063 | A1 | 3/2021 | Liu | |
| 2021/0092435 | A1 | 3/2021 | Liu | |

FOREIGN PATENT DOCUMENTS

| | | | | |
|---|---|---|---|---|
| WO | | 2019079206 | A2 | 4/2019 |
| WO | | 2020207475 | A1 | 10/2020 |
| WO | WO-2021041332 | A1 * | 3/2021 | ........... H04N 19/105 |

OTHER PUBLICATIONS

Lai, C. et al., CE4-related: Alignment of displacement bitdepths for BDOF and PROF, Joint Video Experts Team (JVET) of ITU-T SB 16 WP 3 and ISO/IEC JTC 1/SC 29/WG 11, Input Document to JVET, JVET-O0281-v1 (Jun. 24, 2019) (Year: 2019).*

Chiang et al. "CE10.1.1: Multi-Hypothesis Prediction for Improving AMVP Mode, Skip or Merge Mode, and Intra Mode," Joint Video Experts Team (JVET)of ITU-T SG 16 WP 3 and ISO/IEC JTC 1/SC 29/WG 1112th Meeting: Macao, CN, Oct. 3-12, 2018, documentJVET-L0100, 2018.

Bross et al. "Versatile Video Coding (Draft 5)," Joint Video Experts Team (JVET)of ITU-T SG 16 WP 3 and ISO/IEC JTC 1/SC 29/WG 1114th Meeting: Geneva, CH, Mar. 19-27, 2019, documentJVET-N1001, 2019.

Esenlik et al. "CE9: DMVR with Bilateral Matching (Test2.9)," Joint Video Experts Team (JVET)of ITU-T SG 16 WP 3 and ISO/IEC JTC 1/SC 29/WG 1111th Meeting: Ljubljana, SI, Jul. 10-18, 2018, document JVET-K0217, 2018.

Esenlik et al. "CE9: Report on the Results of Tests CE9.2.15 and CE9.2.16," Joint Video Experts Team (JVET)of ITU-T SG 16 WP 3 and ISO/IEC JTC 1/SC 29/WG 1112th Meeting: Macao, CN, Oct. 3-12, 2018, document JVET-L0163, 2018.

Sasaki et al. "Non-CE9: Harmonization of DMVR and MMVD," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0145, 2019.

Bross et al. "Versatile Video Coding (Draft 4)," Joint Video Experts Team (JVET)of ITU-T SG 16 WP 3 and ISO/IEC JTC 1/SC 29/WG 1113th Meeting: Marrakech, MA, Jan. 9-18, 2019, document JVET-M1001, 2019.

"Information Technology—High Efficiency Coding and Media Delivery in Heterogeneous Environments—Part 2: High Efficiency Video Coding" Apr. 20, 2018, ISO/DIS 23008, 4th Edition.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

JEM-7.0: https://jvet.hhi.fraunhofer.de/svn/svn_HMJEMSoftware/tags/ HM-16.6-JEM-7.0, Jan. 7, 2022.

Akula et al. "Description of SOR, HOR and 360° Video Coding Technology Proposal Considering Mobile Application Scenario by Samsung, Huawei, GoPro, and HiSilicon," Joint Video Exploration Team (JVET) of ITU-T SG 16 WP 3 and ISO/IEC JTC 1/SC 29/WG 11, 10th Meeting: San Diego, US, Apr. 10-20, 2018, document JVET-J0024, 2018.

Sethuraman et al. "Decoder Side MV Refinement/Derivation with CTB-Level Concurrency and other Normative Complexity Reduction Techniques," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0041, 2018.

Luo et al. "CE2-related: Prediction Refinement with Optical Flow for Affine Mode," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0236, 2019.

Zhang et al. "CE2-5.5: History-Parameter-based Affine Model Inheritance," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0263, 2019.

Luo et al. "CE4: Prediction Refinement with Optical Flow for Affine Mode (Test 2.1)," Joint Video Experts Team JVET) of ITU-T SG 16 WP 3 and ISO/IEC JTC 1/SC 29/WG 11, 15th Meeting, Gothenburg, SE, Jul. 3-12, 2019, ocument JVET-O0070, 2019.

Bross et al. "Versatile Video Coding (Draft 6)," Joint Video Experts Team (JVET) of ITU-T SG 16 WP 3 and 1S0/IEC JTC 1/SC 29/WG 11, 15th Metting, Gothenburg, SE, Jul. 3-12, 2019, document JVET-O2001, 2019.

Chen et al. "CE4-related: Clipping for PROF," Joint Video Experts Team (JVET)of ITU-T SG 16 WP 3 and ISO/IEC JTC 1/SC 29/WG 1116th Meeting: Geneva, CH, Oct. 1-11, 2019, document JVET-P0413, 2019.

Liu et al. "CE4-related: On MVD Derivation in PROF," Joint Video Experts Team (JVET)of ITU-T SG 16 WP 3 and SO/IEC JTC 1/SC 29/WG 1116th Meeting: Geneva, CH, Oct. 1-11, 2019, document JVET-P0491, 2019.

Yu et al. "Non-CE9: On Motion Refinement Parameter Derivation in BDOF," Joint Video Experts Team (JVET) of ITU-T SG 16 WP 3 and 1SO/IEC JTC 1/SC 29/WG 11 14th Meeting: Geneva, CH, Mar. 19-27, 2019, document JVET-N0152, 2019.

Yang et al. "CE4-related: On Conditions for Enabling PROF," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0313, 2019.

(56)            References Cited

OTHER PUBLICATIONS

Liu et al. "CE9-related: Motion Vector Refinement in Bi-Directional Optical Flow," Joint Video Experts Team (JVET)of ITU-T SG 16 WP 3 and 1SO/IEC JTC 1/SC 29/WG 1112th Meeting: Macao, CN, -- Oct. 3-12, 2018, JVET-L0333, 2018.

Lai et al. "CE4-related: Alignment of Displacement Bitdepths for BDOF and PROF," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0281, 2019.

Li et al."Non-CE2: Combination of Affine MV Clip and Prediction Refinement with Optical Flow," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0737, 2019.

Xiu et al. "CE9-Related: Improvements on Bi-Directional Optical Flow (BDOF)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0325, 2019.

Li et al. "CE2-4.4: Affine Block Memory Bandwidth Reduction by MV Clip," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0398, 2019.

International Search Report and Written Opinion from International Patent Application No. PCT/CN2020/090802 dated Aug. 26, 2020 (12 pages).

Extended European Search Report from European Patent Application No. 20806602.7 dated Jul. 1, 2022 (9 pages).

Notification of Reasons for Refusal from Japanese Patent Application No. 2021-564118 dated Jan. 4, 2023.

Final Office Action from U.S. Appl. No. 17/506,578 dated Feb. 11, 2022, 21 pages.

Final Office Action from U.S. Appl. No. 17/506,578 dated May 20, 2022, 15 pages.

Document: JVET-N0147-v1, Chujoh, T., et al., "CE9-related: Simplification of BDOF," Joint Video Experts Team (JVET) of ITU-T SG 16 WP 3 and ISO/IEC JTC 1/SC 29/WG 11 14th Meeting: Geneva, CH, Mar. 19-27, 2019, 4 pages.

Singporean Office Action from Singapore Patent Application No. 11202111843X dated Apr. 15, 2024, 9 pages.

Chiang M-S., et al., "CE10.1.1: Multi-Hypothesis Prediction for Improving AMVP Mode, Skip or Merge Mode, and Intra Mode," Joint Video Experts Team (JVET) of ITU-T SG 16 WP 3 and ISO/IEC JTC 1/SC 29/WG 11, 12th Meeting. Macao, CN, Oct. 3-12, 2018, Document: JVET-L0100-v3, 223 Pages.

* cited by examiner

Horizontal and vertical sub-pel MVD are derived

Vertical sub-pel MVD is derived

Horizontal sub-pel MVD is derived

No sub-pel MVD is derived

Parametric error surface fit will performed

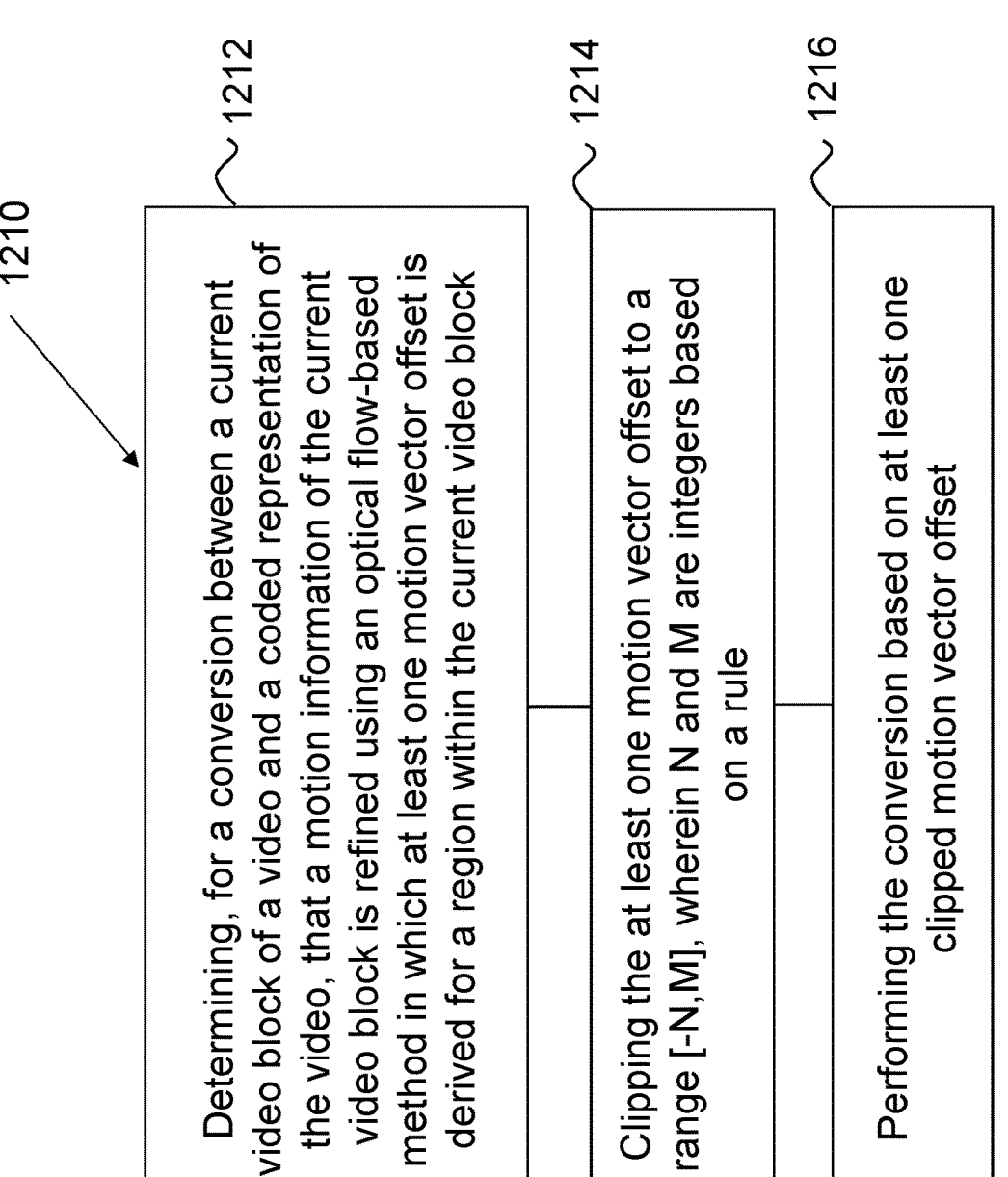

1210

1212

Determining, for a conversion between a current video block of a video and a coded representation of the video, that a motion information of the current video block is refined using an optical flow-based method in which at least one motion vector offset is derived for a region within the current video block

1214

Clipping the at least one motion vector offset to a range [-N,M], wherein N and M are integers based on a rule

1216

Performing the conversion based on at least one clipped motion vector offset

FIG. 12A

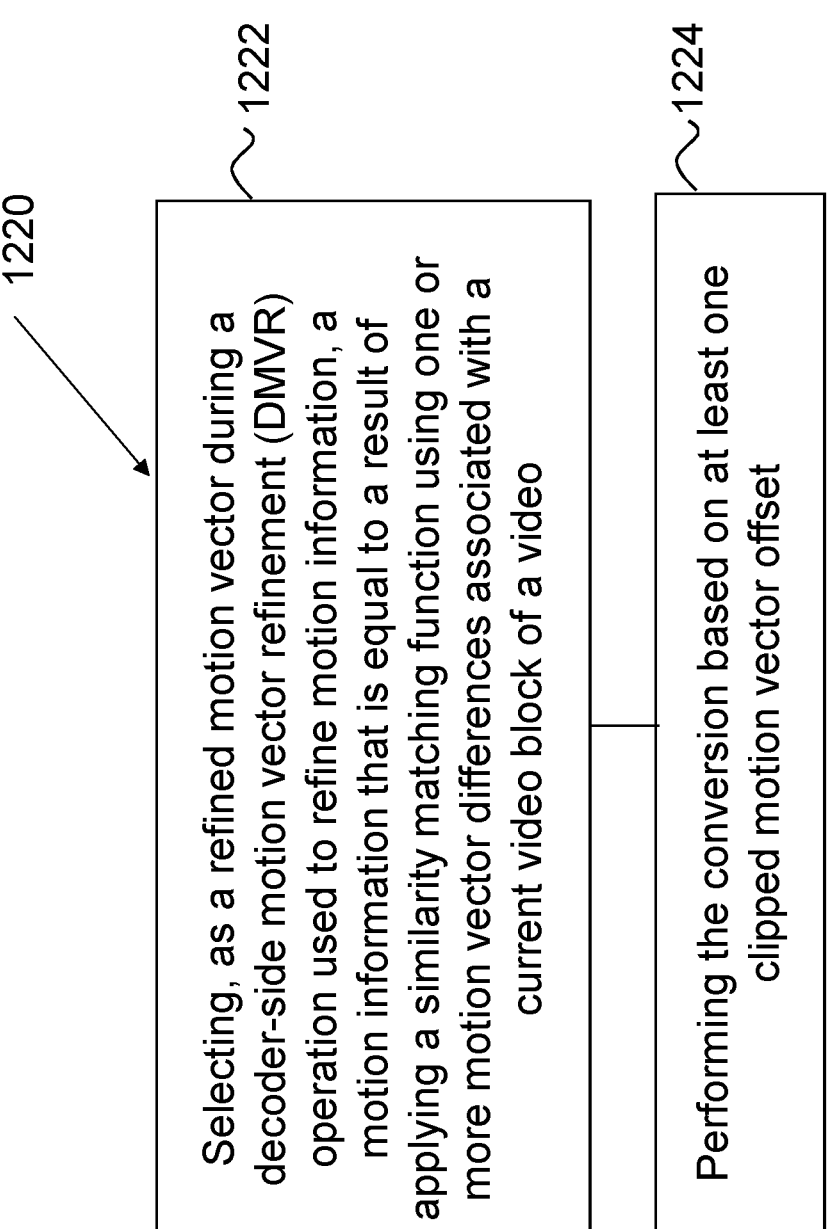

1220

1222

Selecting, as a refined motion vector during a decoder-side motion vector refinement (DMVR) operation used to refine motion information, a motion information that is equal to a result of applying a similarity matching function using one or more motion vector differences associated with a current video block of a video

1224

Performing the conversion based on at least one clipped motion vector offset

FIG. 12B

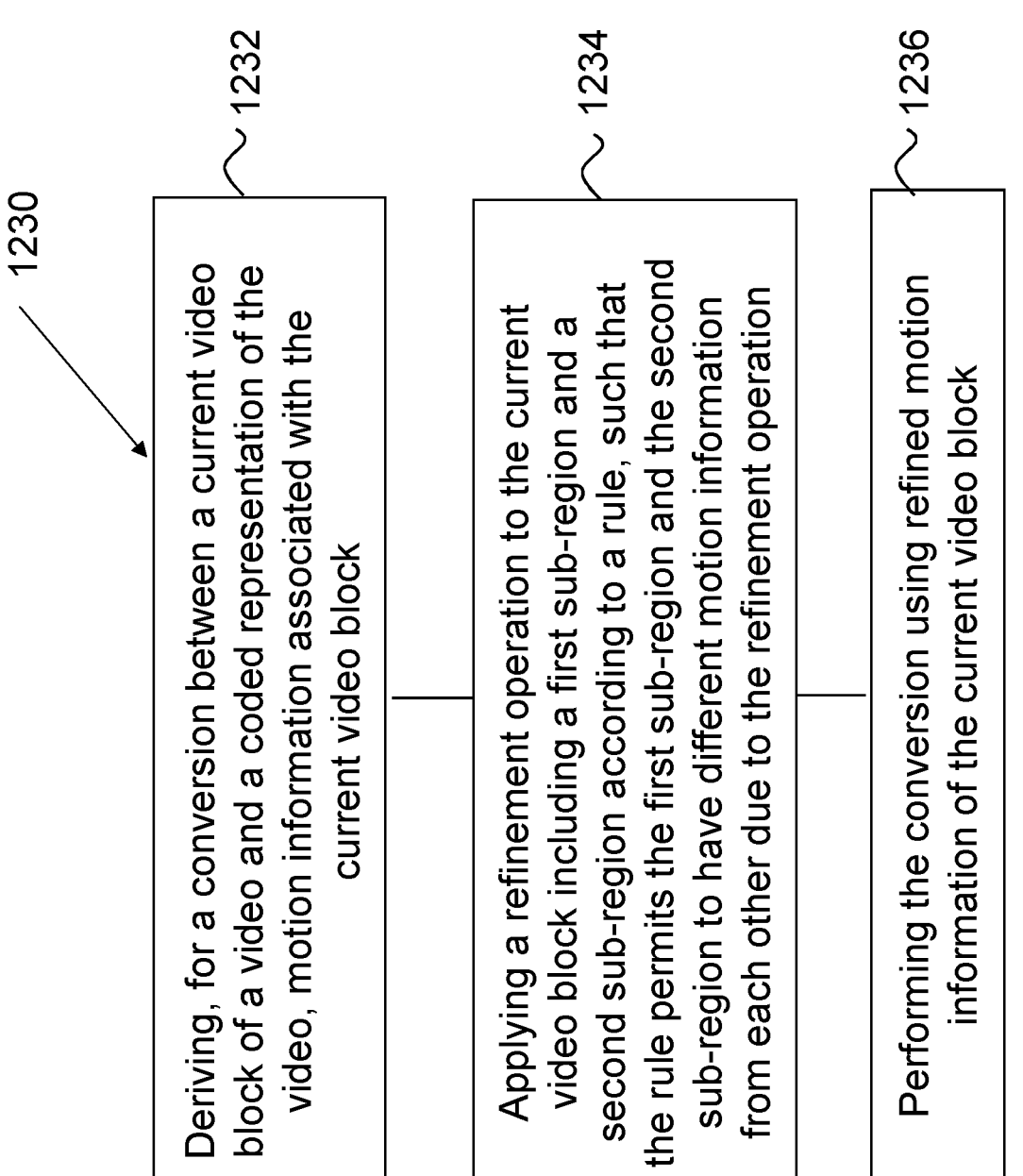

1230

1232

Deriving, for a conversion between a current video block of a video and a coded representation of the video, motion information associated with the current video block

1234

Applying a refinement operation to the current video block including a first sub-region and a second sub-region according to a rule, such that the rule permits the first sub-region and the second sub-region to have different motion information from each other due to the refinement operation

1236

Performing the conversion using refined motion information of the current video block

FIG. 12C

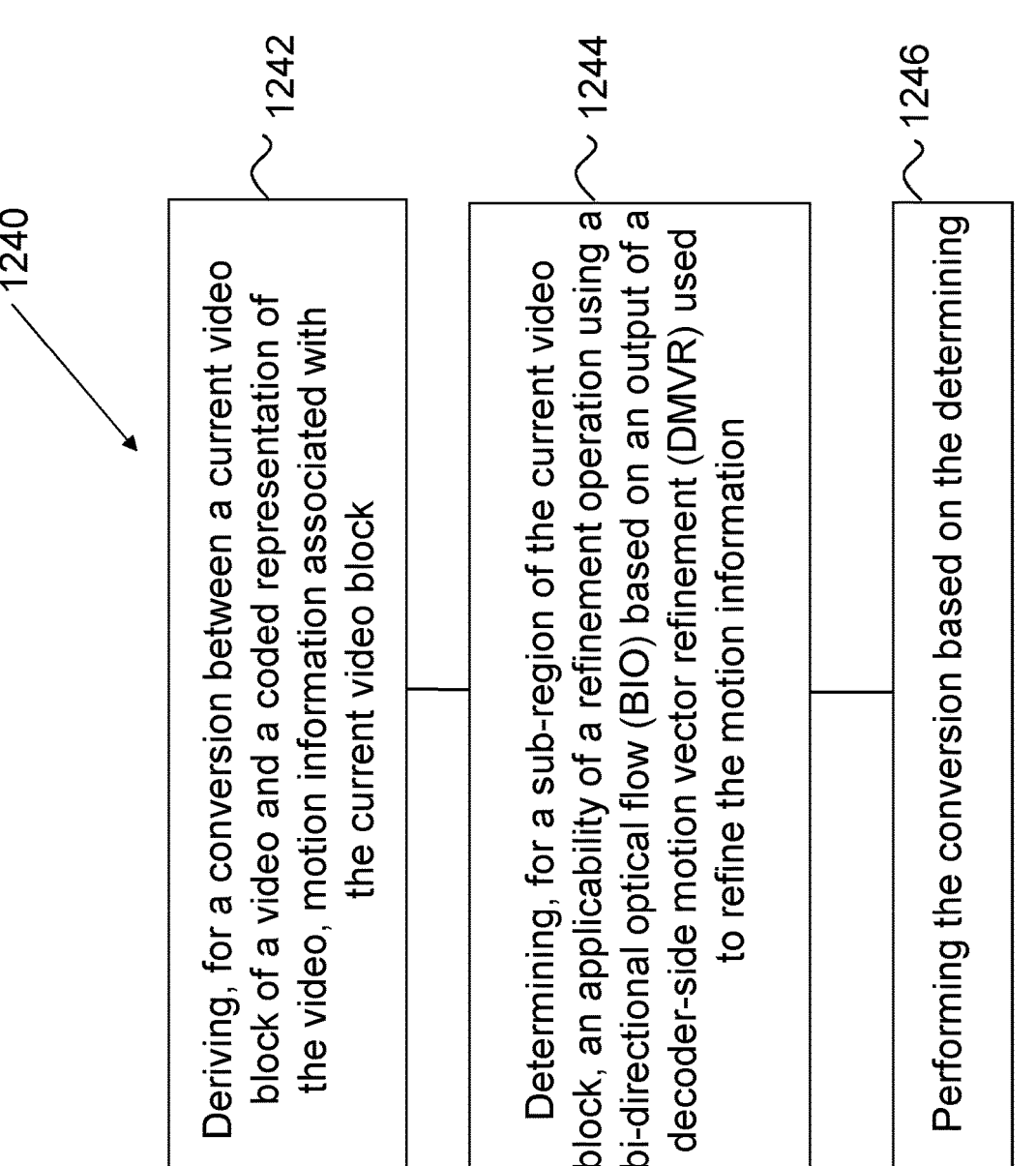

1240

1242 — Deriving, for a conversion between a current video block of a video and a coded representation of the video, motion information associated with the current video block 1244 — Determining, for a sub-region of the current video block, an applicability of a refinement operation using a bi-directional optical flow (BIO) based on an output of a decoder-side motion vector refinement (DMVR) used to refine the motion information 1246 — Performing the conversion based on the determining

FIG. 12D

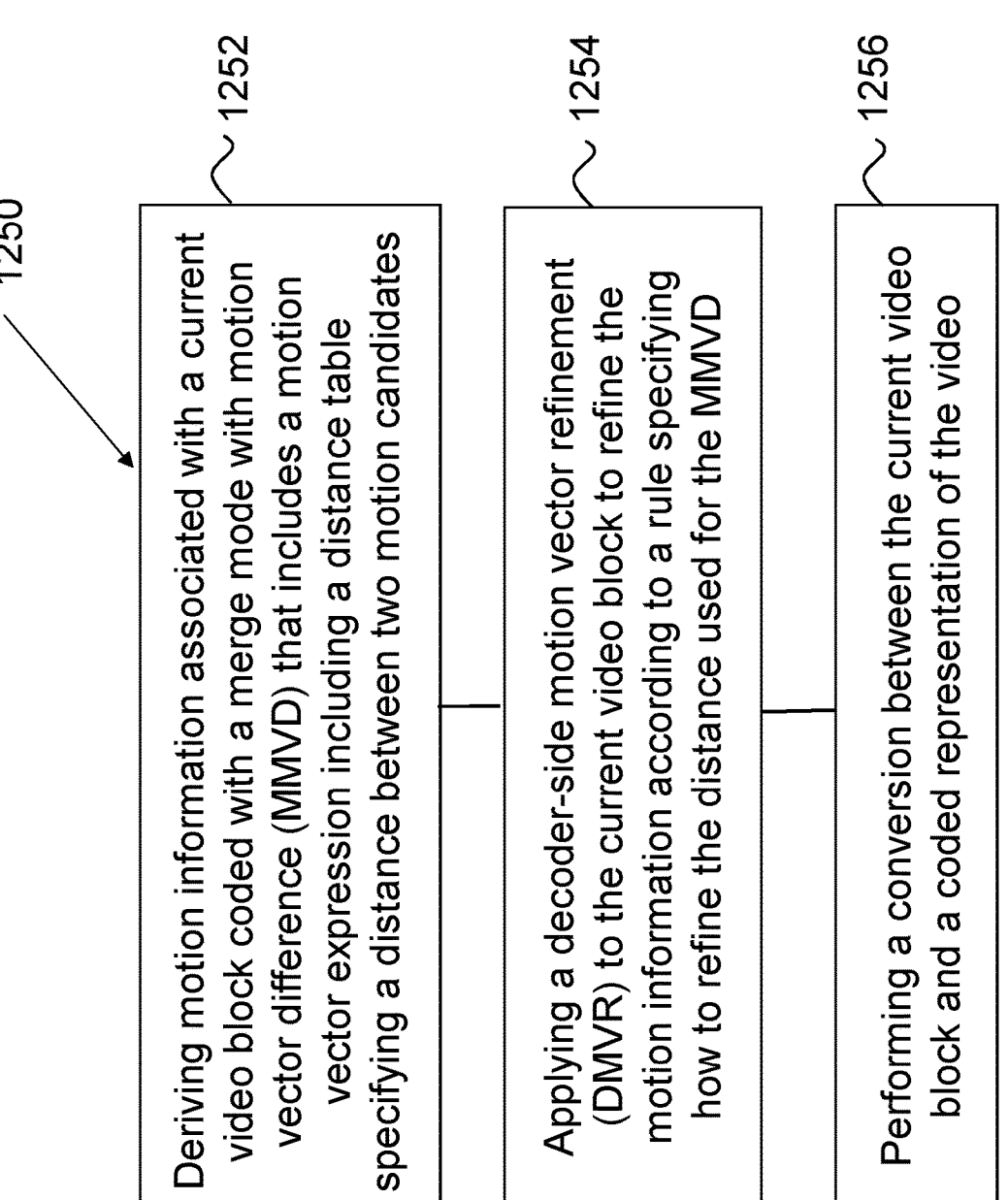

1250

1252

Deriving motion information associated with a current video block coded with a merge mode with motion vector difference (MMVD) that includes a motion vector expression including a distance table specifying a distance between two motion candidates

1254

Applying a decoder-side motion vector refinement (DMVR) to the current video block to refine the motion information according to a rule specifying how to refine the distance used for the MMVD

1256

Performing a conversion between the current video block and a coded representation of the video

Determining, for a sample or a sub-block of the current video block, according to a rule based on derived motion information, an applicability of a bi-directional optical flow (BDOF) in which derived motion information is refined using a spatial and/or a temporal gradient

1264

Performing the conversion based on the determining

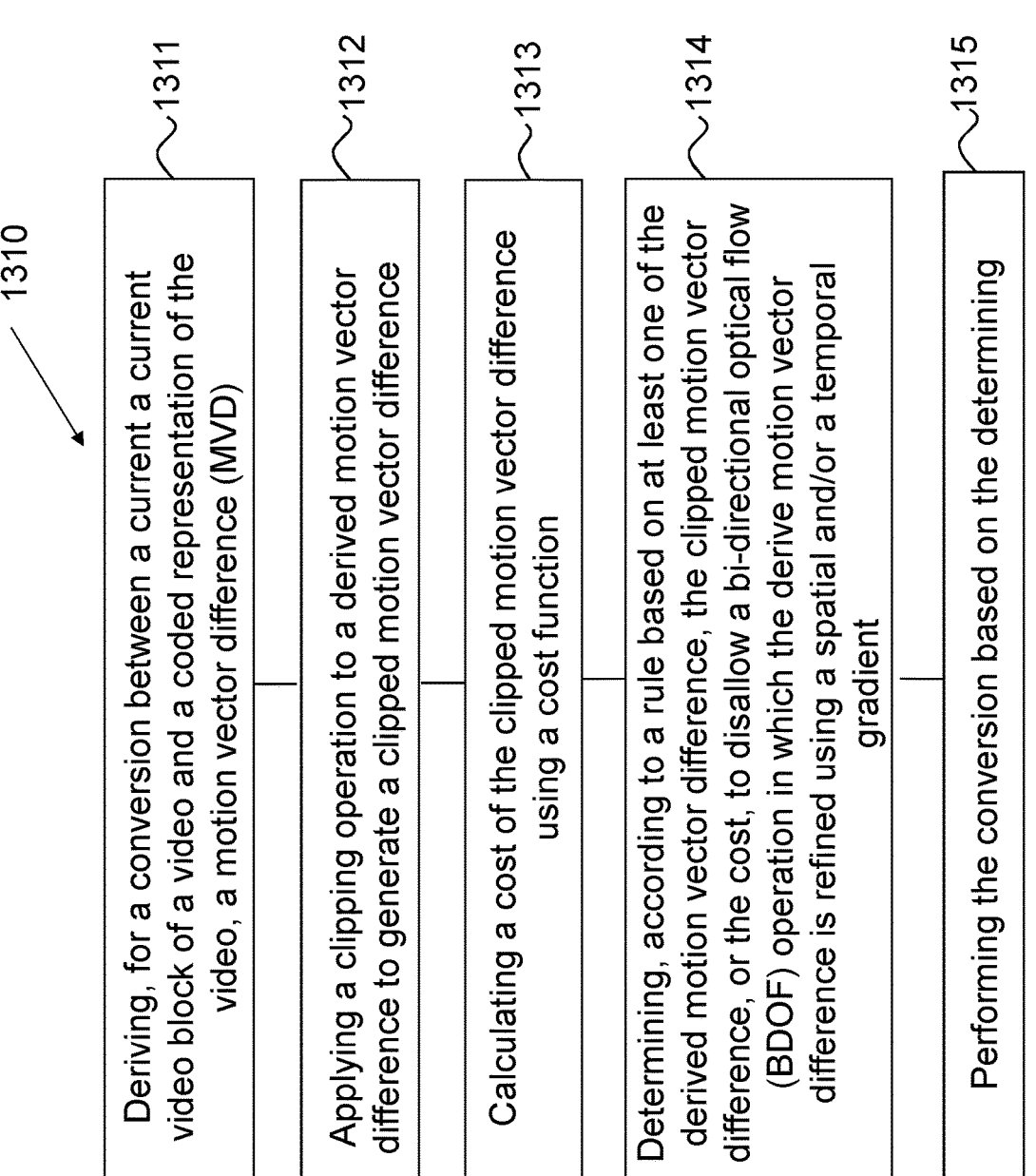

1310

1311 — Deriving, for a conversion between a current a current video block of a video and a coded representation of the video, a motion vector difference (MVD)

1312 — Applying a clipping operation to a derived motion vector difference to generate a clipped motion vector difference 1313 — Calculating a cost of the clipped motion vector difference using a cost function 1314 — Determining, according to a rule based on at least one of the derived motion vector difference, the clipped motion vector difference, or the cost, to disallow a bi-directional optical flow (BDOF) operation in which the derive motion vector difference is refined using a spatial and/or a temporal gradient 1315 — Performing the conversion based on the determining

Deriving, for a conversion between a current video block of a video and a coded representation of the video, a motion vector difference

1324

Refining a derived motion vector difference based on one or more motion vector refinement tools and candidate motion vector differences (MVDs)

1326

Performing the conversion using refined motion vector difference

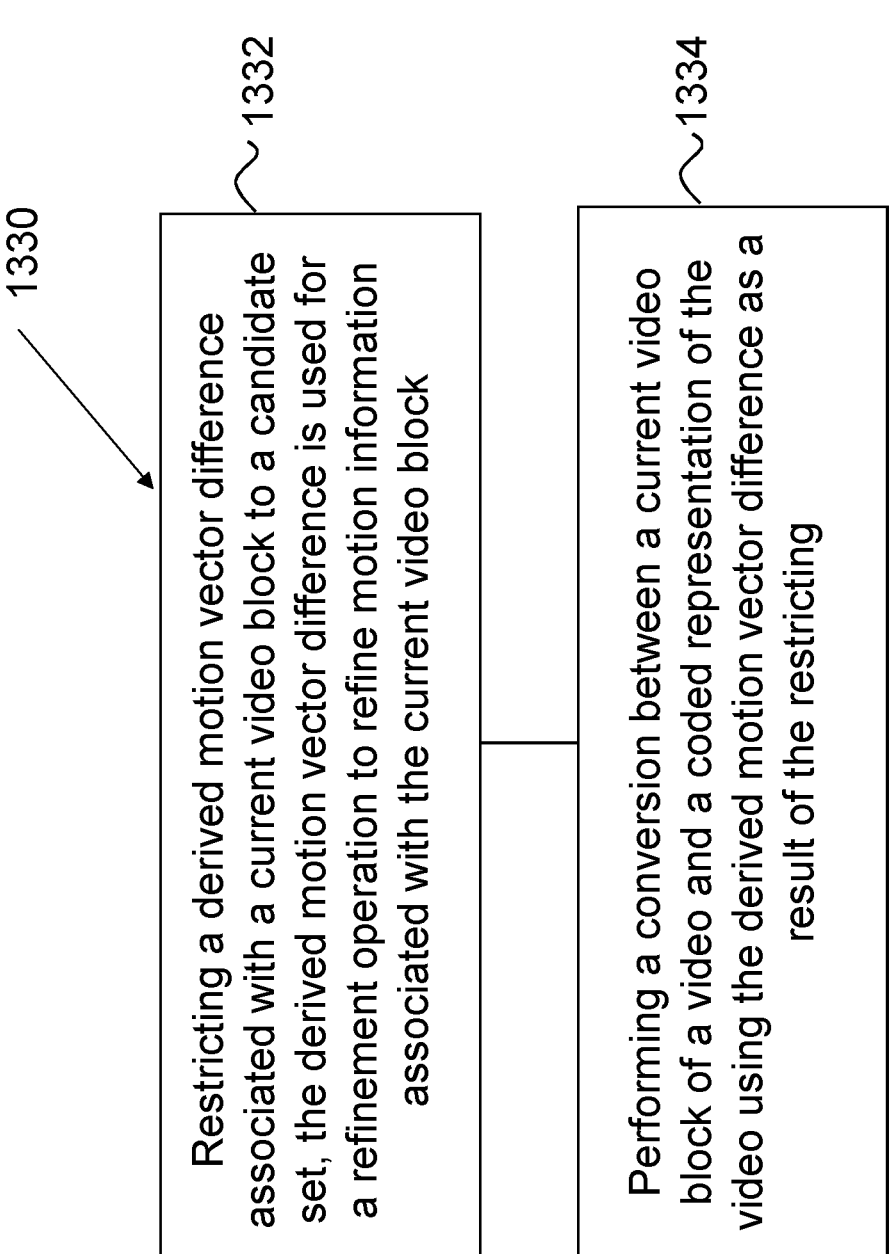

1330

1332

Restricting a derived motion vector difference associated with a current video block to a candidate set, the derived motion vector difference is used for a refinement operation to refine motion information associated with the current video block

1334

Performing a conversion between a current video block of a video and a coded representation of the video using the derived motion vector difference as a result of the restricting

FIG. 13C

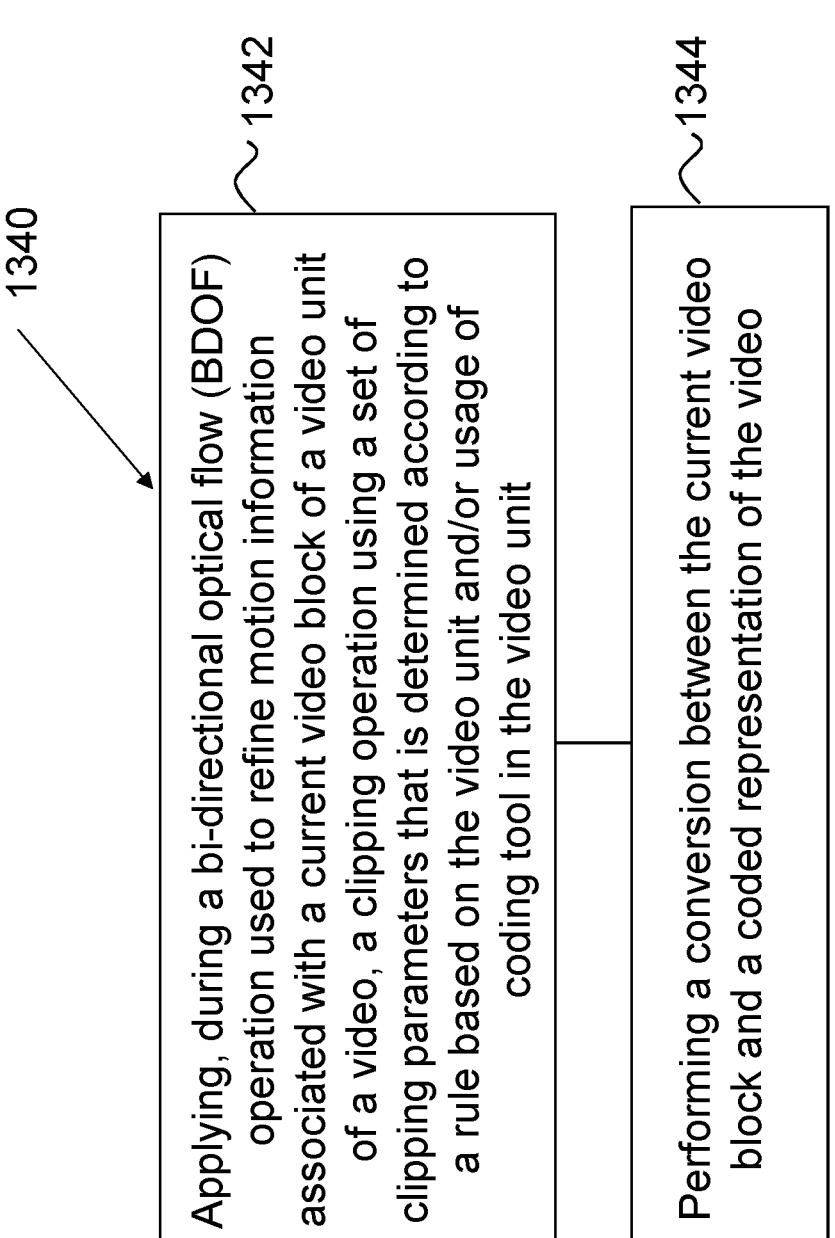

1340

1342

Applying, during a bi-directional optical flow (BDOF) operation used to refine motion information associated with a current video block of a video unit of a video, a clipping operation using a set of clipping parameters that is determined according to a rule based on the video unit and/or usage of coding tool in the video unit

1344

Performing a conversion between the current video block and a coded representation of the video

FIG. 13D

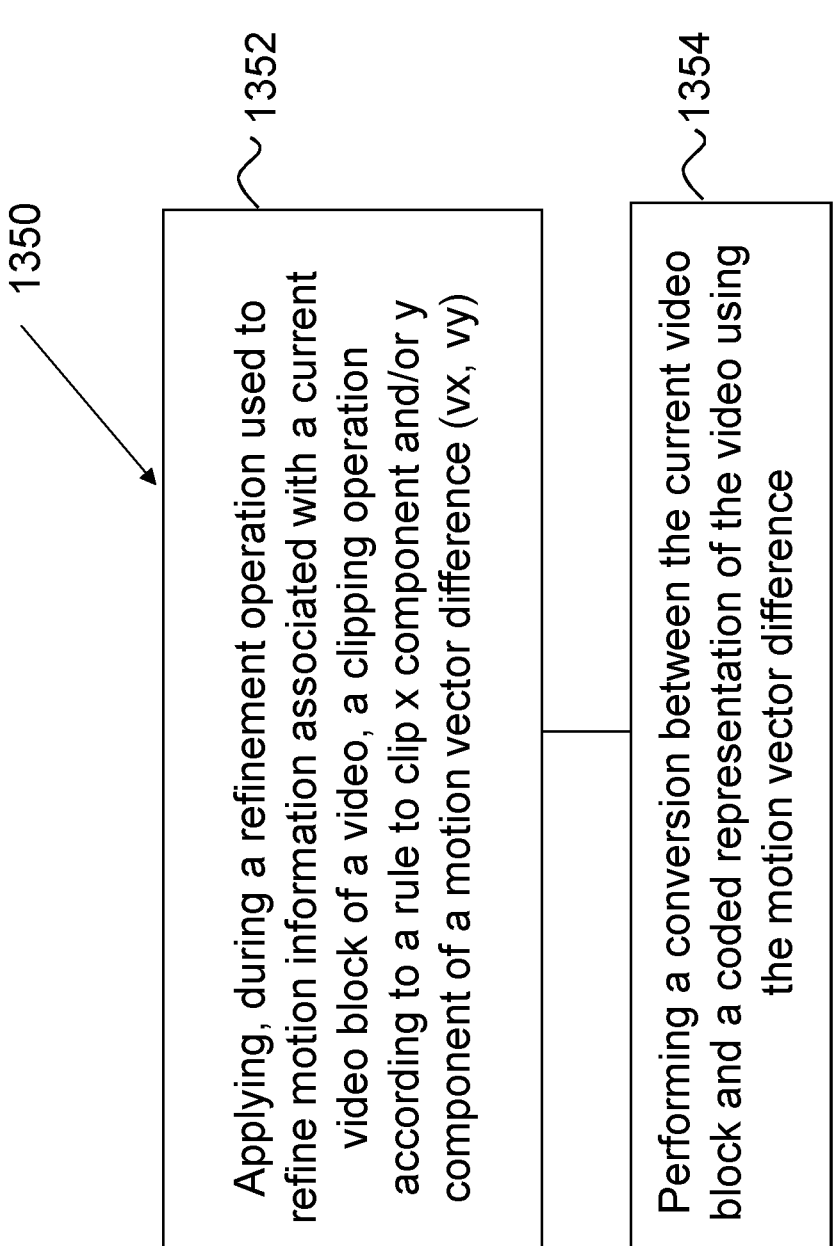

1350

1352 — Applying, during a refinement operation used to refine motion information associated with a current video block of a video, a clipping operation according to a rule to clip x component and/or y component of a motion vector difference (vx, vy)

1354 — Performing a conversion between the current video block and a coded representation of the video using the motion vector difference

FIG. 13E

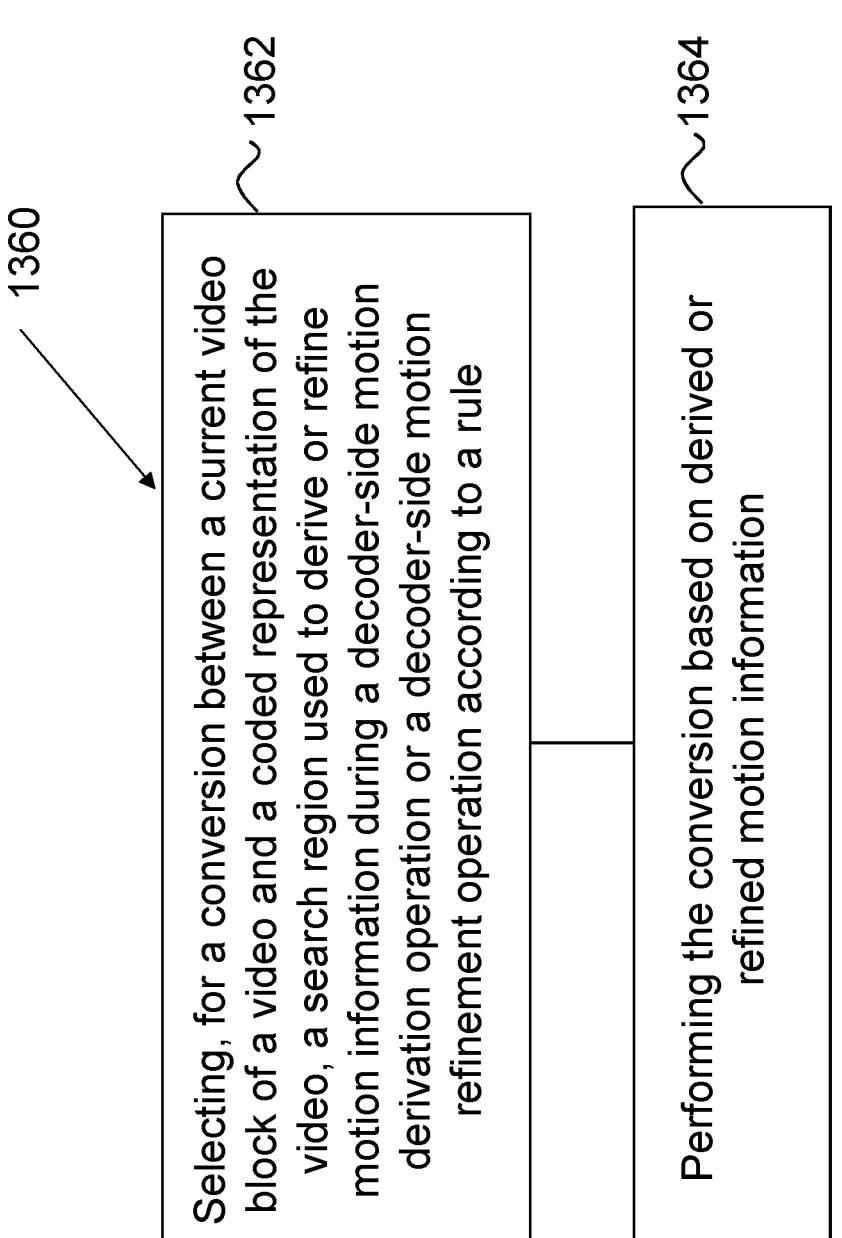

1360

1362

Selecting, for a conversion between a current video block of a video and a coded representation of the video, a search region used to derive or refine motion information during a decoder-side motion derivation operation or a decoder-side motion refinement operation according to a rule

1364

Performing the conversion based on derived or refined motion information

FIG. 13F

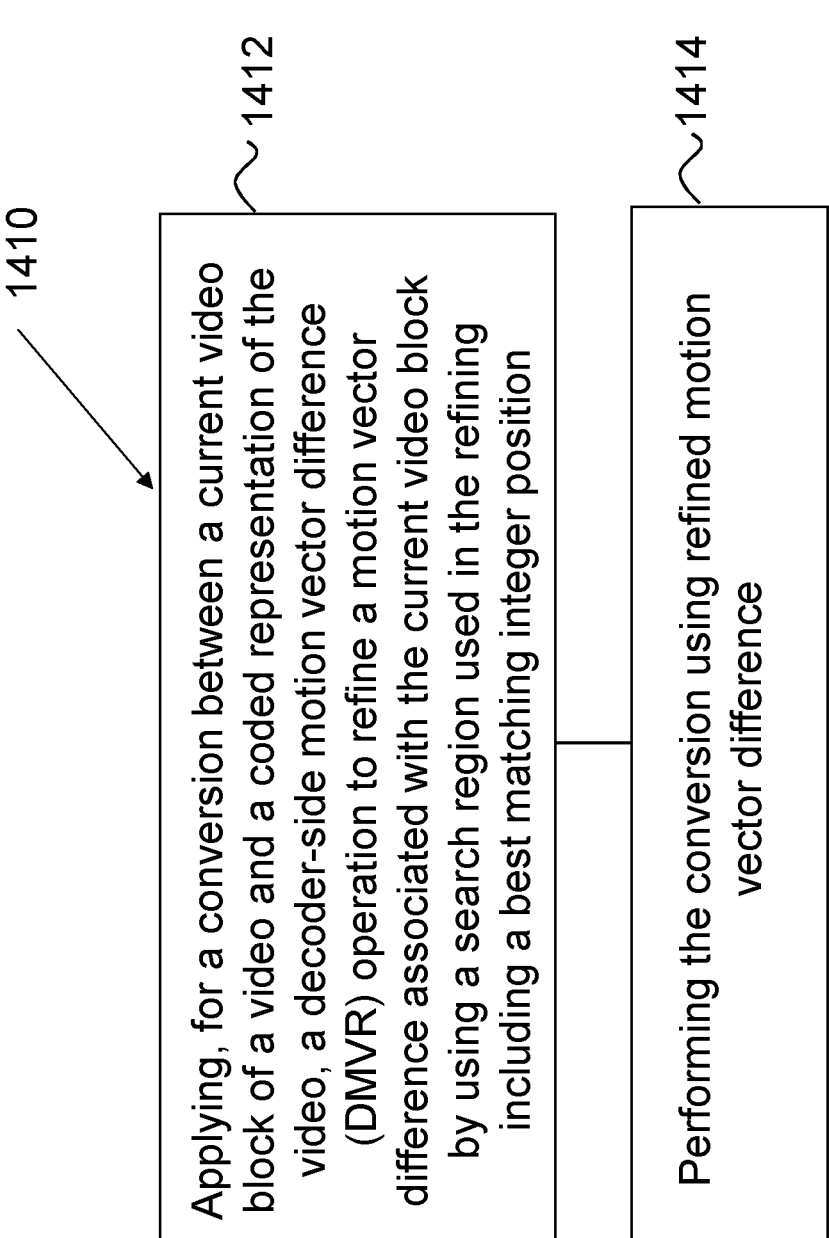

1410

1412

Applying, for a conversion between a current video block of a video and a coded representation of the video, a decoder-side motion vector difference (DMVR) operation to refine a motion vector difference associated with the current video block by using a search region used in the refining including a best matching integer position

1414

Performing the conversion using refined motion vector difference

Applying, for a current video block of a video unit of a video, a decoder-side motion vector difference (DMVR) operation to refine a motion vector difference associated with the current video block

1422

Performing a conversion between the current video block and a coded representation of the video using refined motion vector difference

1424

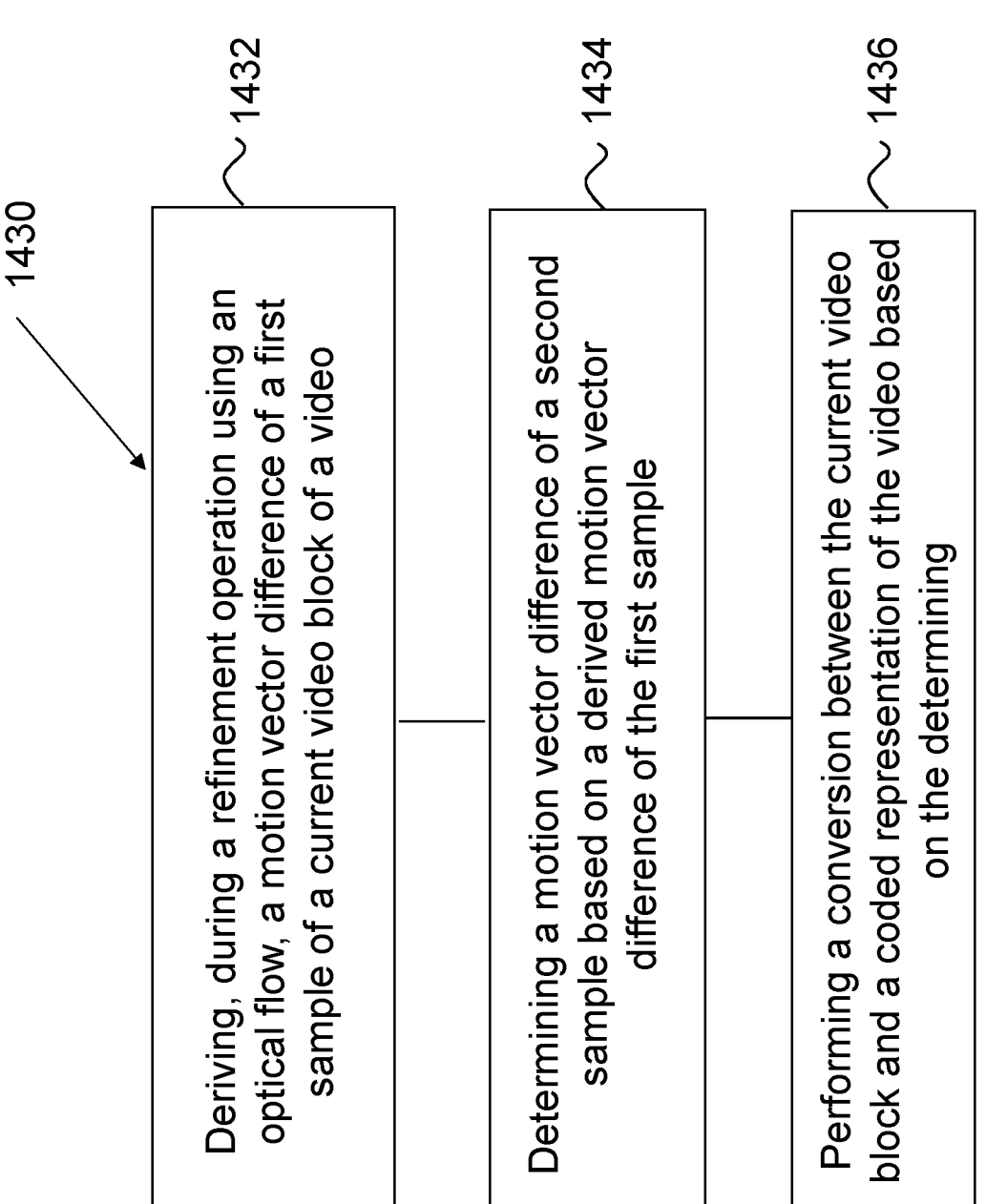

1430

Deriving, during a refinement operation using an optical flow, a motion vector difference of a first sample of a current video block of a video

1432

Determining a motion vector difference of a second sample based on a derived motion vector difference of the first sample

1434

Performing a conversion between the current video block and a coded representation of the video based on the determining

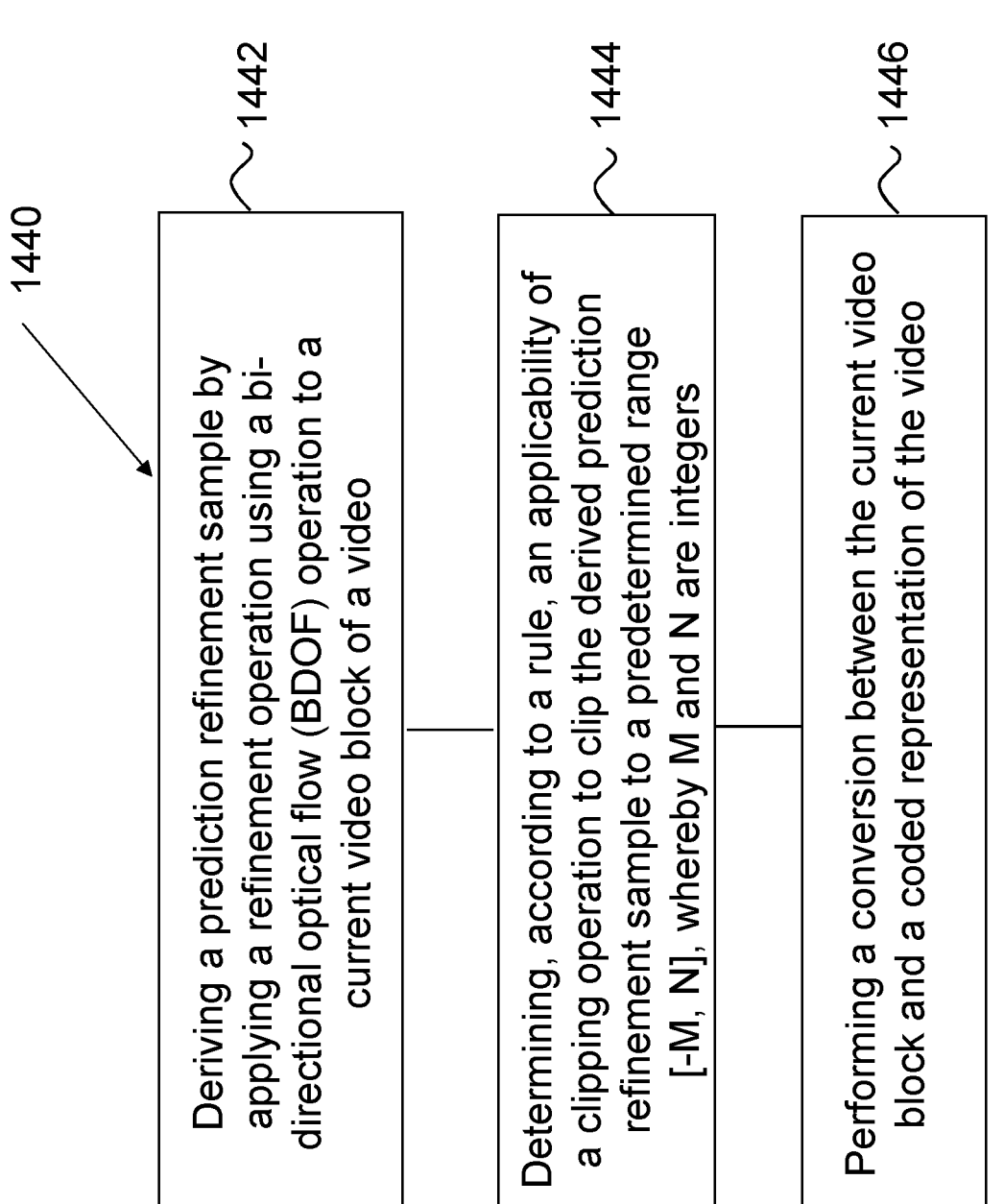

1440

Deriving a prediction refinement sample by applying a refinement operation using a bi-directional optical flow (BDOF) operation to a current video block of a video

1442

Determining, according to a rule, an applicability of a clipping operation to clip the derived prediction refinement sample to a predetermined range [-M, N], whereby M and N are integers

1444

Performing a conversion between the current video block and a coded representation of the video

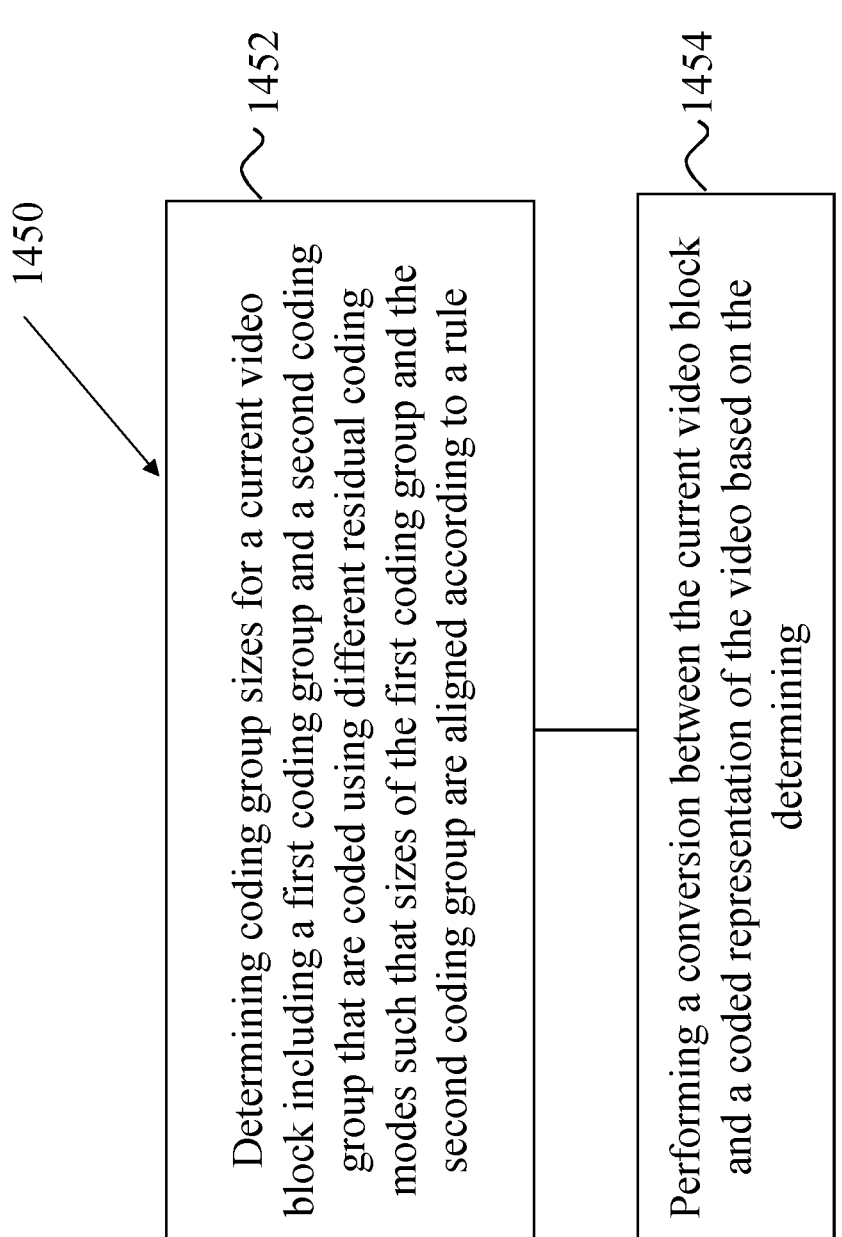

1450

1452

Determining coding group sizes for a current video block including a first coding group and a second coding group that are coded using different residual coding modes such that sizes of the first coding group and the second coding group are aligned according to a rule

1454

Performing a conversion between the current video block and a coded representation of the video based on the determining

FIG. 14E

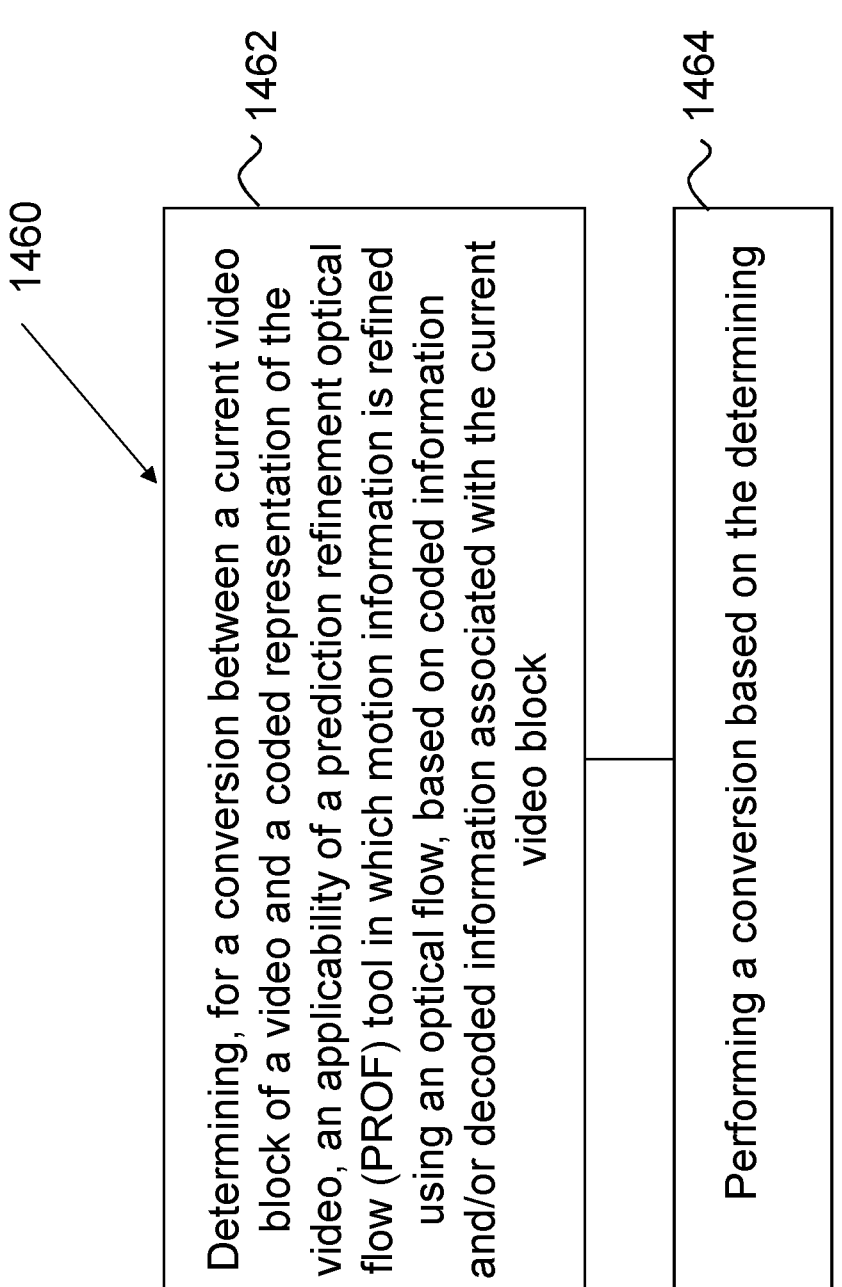

1460

1462

Determining, for a conversion between a current video block of a video and a coded representation of the video, an applicability of a prediction refinement optical flow (PROF) tool in which motion information is refined using an optical flow, based on coded information and/or decoded information associated with the current video block

1464

Performing a conversion based on the determining

FIG. 14F

SUB-REGION BASED DETERMINATION OF MOTION INFORMATION REFINEMENT

CROSS REFERENCE TO RELATED APPLICATIONS

This application is a continuation application of U.S. patent application Ser. No. 17/506,578 filed on Oct. 20, 2021 which is a continuation of International Patent Application No. PCT/CN2020/090802, filed on May 18, 2020, which claims the priority to and benefits of International Patent Application No. PCT/CN2019/087193, filed on May 16, 2019, International Patent Application No. PCT/CN2019/090037, filed on Jun. 4, 2019, International Patent Application No. PCT/CN2019/090903, filed on Jun. 12, 2019, International Patent Application No. PCT/CN2019/093616, filed on Jun. 28, 2019, International Patent Application No. PCT/CN2019/093973, filed on Jun. 29, 2019, International Patent Application No. PCT/CN2019/094282, filed on Jul. 1, 2019, International Patent Application No. PCT/CN2019/104489, filed on Sep. 5, 2019, and International Patent Application No. PCT/CN2019/116757, filed on Nov. 8, 2019. All the aforementioned patent applications are hereby incorporated by reference in their entireties.

TECHNICAL FIELD

The present disclosure relates to video processing techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding including a sub-region based motion information refinement are described. The described methods may be applied to both the existing video coding standards (e.g., High Efficiency Video Coding (HEVC)) and future video coding standards (e.g., Versatile Video Coding (VVC)) or codecs.

In one representative aspect, the disclosed technology may be used to provide a method for video processing which includes determining, for a conversion between a current video block of a video and a coded representation of the video, that a motion information of the current video block is refined using an optical flow-based method in which at least one motion vector offset is derived for a region within the current video block; clipping the at least one motion vector offset to a range [−N,M], wherein N and M are integers based on a rule; and performing the conversion based on at least one clipped motion vector off.

In another aspect, the disclosed technology may be used to provide a method for video processing, comprising: selecting, as a refined motion vector during a decoder-side motion vector refinement (DMVR) operation used to refine motion information, a motion information that is equal to a result of applying a similarity matching function using one or more motion vector differences associated with a current video block of a video; and performing a conversion between the current video block and a coded representation of the video using the refined motion vector.

In yet another example aspect, a method of video processing is disclosed. The method includes deriving, for a conversion between a current video block of a video and a coded representation of the video, motion information associated with the current video block; applying a refinement operation to the current video block including a first sub-region and a second sub-region according to a rule, such that the rule permits the first sub-region and the second sub-region to have different motion information from each other due to the refinement operation; and performing the conversion using refined motion information of the current video block.

In yet another example aspect, another method of video processing is disclosed. The method includes deriving, for a conversion between a current video block of a video and a coded representation of the video, motion information associated with the current video block; determining, for a sub-region of the current video block, an applicability of a refinement operation using a bi-directional optical flow (BIO) based on an output of a decoder-side motion vector refinement (DMVR) used to refine the motion information; and performing the conversion based on the determining.

In yet another example aspect, another method of video processing is disclosed. The method includes deriving motion information associated with a current video block coded with a merge mode with motion vector difference (MMVD) that includes a motion vector expression including a distance table specifying a distance between two motion candidates; applying a decoder-side motion vector refinement (DMVR) to the current video block to refine the motion information according to a rule specifying how to refine the distance used for the MMVD; and performing a conversion between the current video block and a coded representation of the video. In yet another example aspect, another method of video processing is disclosed. The method includes determining, for a sample or a sub-block of the current video block, according to a rule based on derived motion information, an applicability of a bi-directional optical flow (BDOF) in which derived motion information is refined using a spatial and/or a temporal gradient; and performing the conversion based on the determining.

In yet another example aspect, another method of video processing is disclosed. The method includes deriving, for a conversion between a current a current video block of a video and a coded representation of the video, a motion vector difference (MVD); applying a clipping operation to a derived motion vector difference to generate a clipped motion vector difference; calculating a cost of the clipped motion vector difference using a cost function; determining, according to a rule based on at least one of the derived motion vector difference, the clipped motion vector difference, or the cost, to disallow a bi-directional optical flow (BDOF) operation in which the derive motion vector difference is refined using a spatial and/or a temporal gradient; and performing the conversion based on the determining.

In yet another example aspect, another method of video processing is disclosed. The method includes deriving, for a conversion between a current video block of a video and a coded representation of the video, a motion vector difference; refining a derived motion vector difference based on one or more motion vector refinement tools and candidate motion vector differences (MVDs); and performing the conversion using refined motion vector difference.

In yet another example aspect, another method of video processing is disclosed. The method includes restricting a derived motion vector difference associated with a current video block to a candidate set, the derived motion vector difference is used for a refinement operation to refine motion information associated with the current video block; and performing a conversion between a current video block of a video and a coded representation of the video using the derived motion vector difference as a result of the restricting.

In yet another example aspect, another method of video processing is disclosed. The method includes applying, during a bi-directional optical flow (BDOF) operation used to refine motion information associated with a current video block of a video unit of a video, a clipping operation using a set of clipping parameters that is determined according to a rule based on the video unit and/or usage of coding tool in the video unit; and performing a conversion between the current video block and a coded representation of the video.

In yet another example aspect, another method of video processing is disclosed. The method includes applying, during a refinement operation used to refine motion information associated with a current video block of a video, a clipping operation according to a rule to clip x component and/or y component of a motion vector difference (vx, vy); and performing a conversion between the current video block and a coded representation of the video using the motion vector difference, wherein the rule specifies to convert the motion vector difference to zero or a value in a form of $K^{-m}$ before or after the clipping operation, whereby m is an integer.

In yet another example aspect, another method of video processing is disclosed. The method includes selecting, for a conversion between a current video block of a video and a coded representation of the video, a search region used to derive or refine motion information during a decoder-side motion derivation operation or a decoder-side motion refinement operation according to a rule; and performing the conversion based on derived or refined motion information.

In yet another example aspect, another method of video processing is disclosed. The method includes applying, for a conversion between a current video block of a video and a coded representation of the video, a decoder-side motion vector difference (DMVR) operation to refine a motion vector difference associated with the current video block by using a search region used in the refining including a best matching integer position; and performing the conversion using refined motion vector difference, wherein the applying of the DMVR operation includes deriving a sub-pel motion vector difference (MVD) according to a rule.

In yet another example aspect, another method of video processing is disclosed. The method includes applying, for a current video block of a video unit of a video, a decoder-side motion vector difference (DMVR) operation to refine a motion vector difference associated with the current video block; and performing a conversion between the current video block and a coded representation of the video using refined motion vector difference, wherein the applying of the DMVR operation includes determining to allow or disallow a sub-pel motion vector difference (MVD) derivation depending on use of a bi-directional optical flow (BDOF) for the video unit.

In yet another example aspect, another method of video processing is disclosed. The method includes deriving, during a refinement operation using an optical flow, a motion vector difference of a first sample of a current video block of a video; determining a motion vector difference of a second sample based on a derived motion vector difference of the first sample; and performing a conversion between the current video block and a coded representation of the video based on the determining.

In yet another example aspect, another method of video processing is disclosed. The method includes deriving a prediction refinement sample by applying a refinement operation using a bi-directional optical flow (BDOF) operation to a current video block of a video; determining, according to a rule, an applicability of a clipping operation to clip the derived prediction refinement sample to a predetermined range [−M, N], whereby M and N are integers; and performing a conversion between the current video block and a coded representation of the video.

In yet another example aspect, another method of video processing is disclosed. The method includes determining coding group sizes for a current video block including a first coding group and a second coding group that are coded using different residual coding modes such that sizes of the first coding group and the second coding group are aligned according to a rule; and performing a conversion between the current video block and a coded representation of the video based on the determining.

In yet another example aspect, another method of video processing is disclosed. The method includes determining, for a conversion between a current video block of a video and a coded representation of the video, an applicability of a prediction refinement optical flow (PROF) tool in which motion information is refined using an optical flow, based on coded information and/or decoded information associated with the current video block; and performing the conversion based on the determining.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIGS. 12A to 12F show flowcharts of example methods for video processing in accordance with the disclosed technology.

FIGS. 13A to 13F show flowcharts of example methods for video processing in accordance with the disclosed technology.

FIGS. 14A to 14F show flowcharts of example methods for video processing in accordance with the disclosed technology.

DETAILED DESCRIPTION

Figures 1, 2:
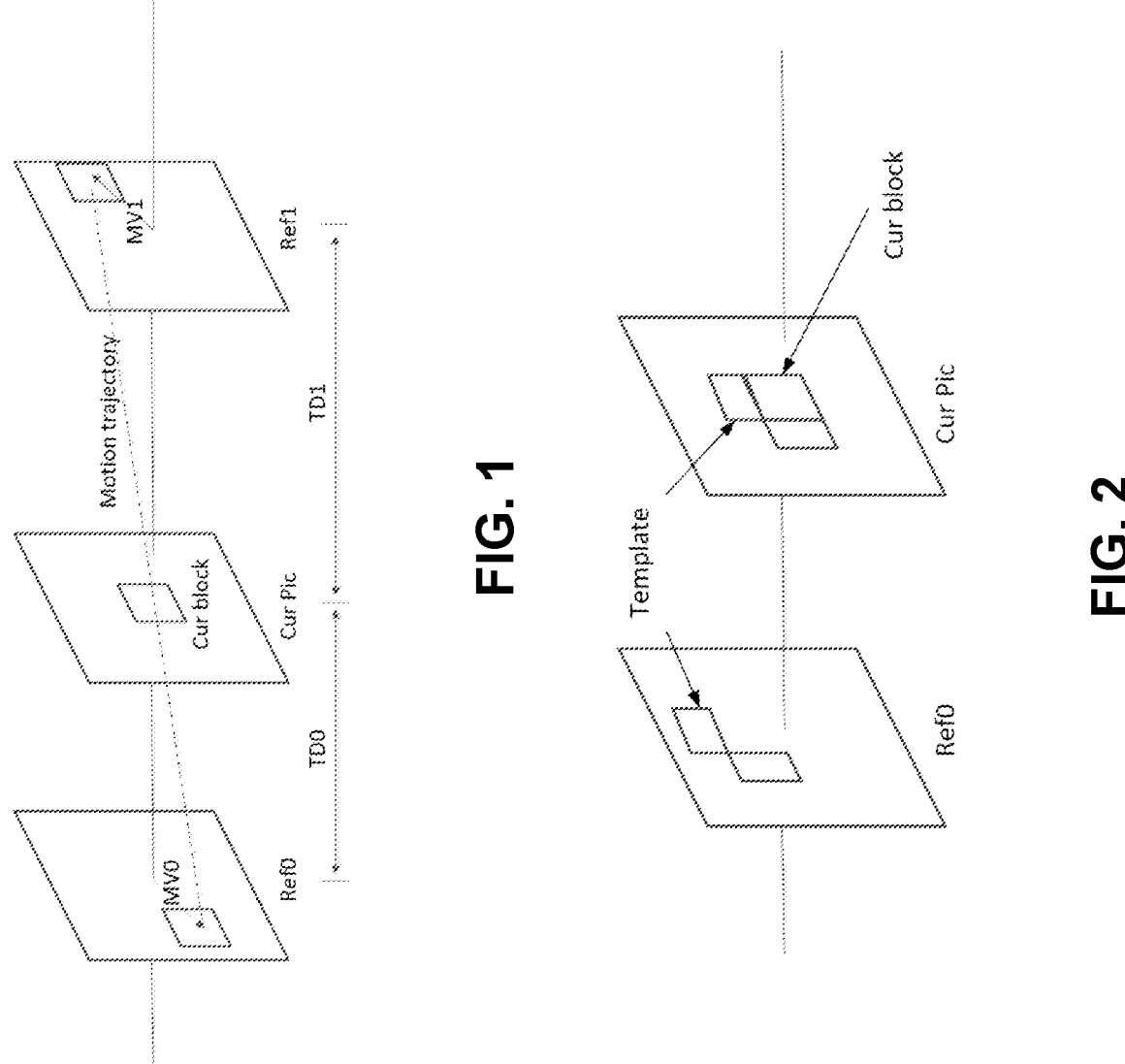
FIG. 1 shows an example of a bilateral matching.
FIG. 2 shows an example of a template matching.

The techniques and devices disclosed in this disclosure provide motion information refinement. Some implementations of the disclosed technology are related to sub-region based motion information refinement. Some implementations of the disclosed technology can be applied to motion compensation in video coding and decoding.

Video coding standards have evolved primarily through the development of the well-known International Telecommunication Union (ITU) telecommunication standardization sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/ MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC Joint Technical Committee (JTC1) SC29/WG11 (MPEG) was created to work on the VVC standard targeting at 50% bitrate reduction compared to HEVC.

1.1. Pattern Matched Motion Vector Derivation

Pattern matched motion vector derivation (PMMVD) mode is a special merge mode based on Frame-Rate Up Conversion (FRUC) techniques. With this mode, motion information of a block is not signaled but derived at decoder side.

A FRUC flag is signaled for a coding unit (CU) when its merge flag is true. When the FRUC flag is false, a merge index is signaled and the regular merge mode is used. When the FRUC flag is true, an additional FRUC mode flag is signaled to indicate which method (bilateral matching or template matching) is to be used to derive motion information for the block.

At encoder side, the decision on whether using FRUC merge mode for a CU is based on RD cost selection as done for normal merge candidate. That is the two matching modes (bilateral matching and template matching) are both checked for a CU by using rate distortion (RD) cost selection. The one leading to the minimal cost is further compared to other CU modes. If a FRUC matching mode is the most efficient one, FRUC flag is set to true for the CU and the related matching mode is used.

Motion derivation process in FRUC merge mode has two steps. A CU-level motion search is first performed, then followed by a Sub-CU level motion refinement. At CU level, an initial motion vector is derived for the whole CU based on bilateral matching or template matching. First, a list of motion vector (MV) candidates is generated and the candidate which leads to the minimum matching cost is selected as the starting point for further CU level refinement. Then a local search based on bilateral matching or template matching around the starting point is performed and the MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in (16), D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\} \qquad (1)$$

As shown in the FIG. 1, the bilateral matching is used to derive motion information of the current CU by finding the closest match between two blocks along the motion trajectory of the current CU in two different reference pictures. Under the assumption of continuous motion trajectory, the motion vectors MV0 and MV1 pointing to the two reference blocks shall be proportional to the temporal distances (TDs), i.e., TD0 and TD1, between the current picture and the two reference pictures. As a special case, when the current picture is temporally between the two reference pictures and the temporal distance from the current picture to the two reference pictures is the same, the bilateral matching becomes mirror based bi-directional MV.

As shown in FIG. 2, template matching is used to derive motion information of the current CU by finding the closest match between a template (top and/or left neighbouring blocks of the current CU) in the current picture and a block (same size to the template) in a reference picture. Except the aforementioned FRUC merge mode, the template matching is also applied to advanced motion vector prediction (AMVP) mode. In the JEM, as done in HEVC, AMVP has two candidates. With template matching method, a new candidate is derived. If the newly derived candidate by template matching is different to the first existing AMVP candidate, it is inserted at the very beginning of the AMVP candidate list and then the list size is set to two (meaning remove the second existing AMVP candidate). When applied to AMVP mode, only CU level search is applied.

CU Level MV Candidate Set

The MV candidate set at CU level consists of:
i) Original AMVP candidates if the current CU is in AMVP mode
ii) all merge candidates,
iii) several MVs in the interpolated MV field, which is introduced in section 2.1.1.3.
iv) top and left neighbouring motion vectors When using bilateral matching, each valid MV of a merge candidate is used as an input to generate a MV pair with the assumption of bilateral matching. For example, one valid MV of a merge candidate is (MVa, refa) at reference list A. Then the reference picture refb of its paired bilateral MV is found in the other reference list B so that refa and refb are temporally at different sides of the current picture. If such a refb is not available in reference list B, refb is determined as a reference which is different from refa and its temporal distance to the current picture is the minimal one in list B. After refb is determined, MVb is derived by scaling MVa based on the temporal distance between the current picture and refa, refb.

Four MVs from the interpolated MV field are also added to the CU level candidate list. More specifically, the interpolated MVs at the position (0, 0), (W/2, 0), (0, H/2) and (W/2, H/2) of the current CU are added.

When FRUC is applied in AMVP mode, the original AMVP candidates are also added to CU level MV candidate set.

At the CU level, up to 15 MVs for AMVP CUs and up to 13 MVs for merge CUs are added to the candidate list.

Sub-CU Level MV Candidate Set

The MV candidate set at sub-CU level consists of:

i) an MV determined from a CU-level search, ii) top, left, top-left and top-right neighbouring MVs, iii) scaled versions of collocated MVs from reference pictures, iv) up to 4 ATMVP candidates, v) up to 4 spatial-temporal motion vector prediction (STMVP) candidates The scaled MVs from reference pictures are derived as follows. All the reference pictures in both lists are traversed. The MVs at a collocated position of the sub-CU in a reference picture are scaled to the reference of the starting CU-level MV.

ATMVP and STMVP candidates are limited to the four first ones.

At the sub-CU level, up to 17 MVs are added to the candidate list.

Generation of Interpolated MV Field

Before coding a frame, interpolated motion field is generated for the whole picture based on unilateral ME. Then the motion field may be used later as CU level or sub-CU level MV candidates.

Figures 3, 4:
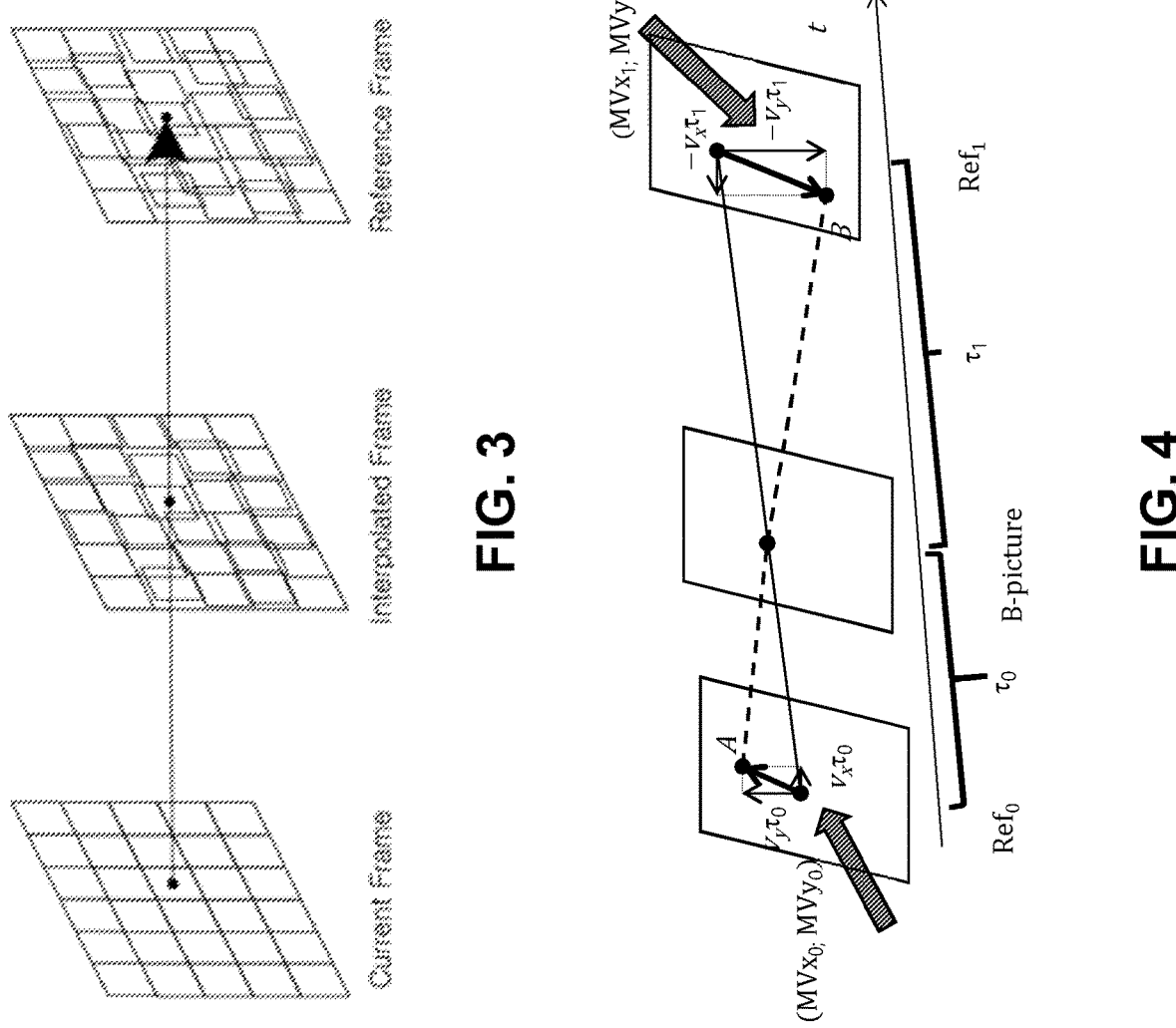
FIG. 3 shows an example of unilateral motion estimation (ME) in frame-rate up conversion (FRUC).
FIG. 4 shows an example of an optical flow trajectory.

First, the motion field of each reference pictures in both reference lists is traversed at 4×4 block level. For each 4×4 block, if the motion associated to the block passing through a 4×4 block in the current picture (as shown in FIG. 3 which shows an example of a unilateral ME in FRUC) and the block has not been assigned any interpolated motion, the motion of the reference block is scaled to the current picture according to the temporal distance TD0 and TD1 (the same way as that of MV scaling of temporal motion vector prediction (TMVP) in HEVC) and the scaled motion is assigned to the block in the current frame. If no scaled MV is assigned to a 4×4 block, the block's motion is marked as unavailable in the interpolated motion field.

Interpolation and Matching Cost

When a motion vector points to a fractional sample position, motion compensated interpolation is needed. To reduce complexity, bi-linear interpolation instead of regular 8-tap HEVC interpolation is used for both bilateral matching and template matching.

The calculation of matching cost is a bit different at different steps. When selecting the candidate from the candidate set at the CU level, the matching cost is the absolute sum difference (SAD) of bilateral matching or template matching. After the starting MV is determined, the matching cost C of bilateral matching at sub-CU level search is calculated as follows:

$$C = SAD + w \cdot \left( |MV_x - MV_x^s| + |MV_y - MV_y^s| \right) \qquad (2)$$

where w is a weighting factor which is empirically set to 4, MV and MV$^s$ indicate the current MV and the starting MV, respectively. SAD is still used as the matching cost of template matching at sub-CU level search.

In FRUC mode, MV is derived by using luma samples only. The derived motion will be used for both luma and chroma for motion compensation (MC) inter prediction. After MV is decided, final MC is performed using 8-taps interpolation filter for luma and 4-taps interpolation filter for chroma.

MV Refinement

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

Selection of Prediction Direction in Template Matching FRUC Merge Mode

In the bilateral matching merge mode, bi-prediction is always applied since the motion information of a CU is derived based on the closest match between two blocks along the motion trajectory of the current CU in two different reference pictures. There is no such limitation for the template matching merge mode. In the template matching merge mode, the encoder can choose among uni-prediction from list0, uni-prediction from list1 or bi-prediction for a CU. The selection is based on a template matching cost as follows:

```
If costBi <= factor * min (cost0, cost1)
    bi-prediction is used;
Otherwise, if cost0 <= cost1
    uni-prediction from list0 is used;
Otherwise,
    uni-prediction from list1 is used;
``` where cost0 is the SAD of list0 template matching, cost1 is the SAD of list1 template matching and costBi is the SAD of bi-prediction template matching. The value of factor is equal to 1.25, which means that the selection process is biased toward bi-prediction.

The inter prediction direction selection is only applied to the CU-level template matching process.

1.2 Hybrid Intra and Inter Prediction

In JVET-L0100, multi-hypothesis prediction is proposed, wherein hybrid intra and inter prediction is one way to generate multiple hypotheses.

When the multi-hypothesis prediction is applied to improve intra mode, multi-hypothesis prediction combines one intra prediction and one merge indexed prediction. In a merge CU, one flag is signaled for merge mode to select an intra mode from an intra candidate list when the flag is true. For luma component, the intra candidate list is derived from 4 intra prediction modes including direct current (DC), planar, horizontal, and vertical modes, and the size of the intra candidate list can be 3 or 4 depending on the block shape. When the CU width is larger than the double of CU height, horizontal mode is exclusive of the intra mode list and when the CU height is larger than the double of CU width, vertical mode is removed from the intra mode list. One intra prediction mode selected by the intra mode index and one merge indexed prediction selected by the merge index are combined using weighted average. For chroma component, DM is always applied without extra signaling. The weights for combining predictions are described as follow. When DC or planar mode is selected, or the coding block (CB) width or height is smaller than 4, equal weights are applied. For those CBs with CB width and height larger than or equal to 4, when horizontal/vertical mode is selected, one CB is first vertically/horizontally split into four equal-area regions. Each weight set, denoted as $(w\_intra_i, w\_inter_i)$, where i is from 1 to 4 and $(w\_intra_1, w\_inter_1)=(6, 2)$, $(w\_intra_2, w\_inter_2)=(5, 3)$, $(w\_intra_3, w\_inter_3)=(3, 5)$, and $(w\_intra_4, w\_inter_4)=(2, 6)$, will be applied to a corresponding region. $(w\_intra_1, w\_inter_1)$ is for the region closest to the reference samples and $(w\_intra_4, w\_inter_4)$ is for the region farthest away from the reference samples. Then, the combined prediction can be calculated by summing up the two weighted predictions and right-shifting 3 bits. Moreover, the intra prediction mode for the intra hypothesis of predictors can be saved for reference of the following neighboring CUs.

1.3 Bi-Directional Optical Flow

BIO is also known as BDOF (Bi Directional Optical Flow) In BIO, motion compensation is first performed to generate the first predictions (in each prediction direction) of the current block. The first predictions are used to derive the spatial gradient, the temporal gradient and the optical flow of each subblock/pixel within the block, which are then used to generate the second prediction, i.e., the final prediction of the subblock/pixel. The details are described as follows.

Bi-directional Optical flow (BIO) is sample-wise motion refinement which is performed on top of block-wise motion compensation for bi-prediction. The sample-level motion refinement doesn't use signalling.

Let $I^{(k)}$ be the luma value from reference k (k=0, 1) after block motion compensation, and $\partial I^{(k)}/\partial x$, $\partial I^{(k)}/\partial y$ are horizontal and vertical components of the $I^{(k)}$ gradient, respectively. Assuming the optical flow is valid, the motion vector field $(v_x, v_y)$ is given by an equation $$\partial I^{(k)}/\partial t + v_x \partial I^{(k)}/\partial x + v_y \partial I^{(k)}/\partial y = 0. \qquad (3)$$

Combining this optical flow equation with Hermite interpolation for the motion trajectory of each sample results in a unique third-order polynomial that matches both the function values $I^{(k)}$ and derivatives $\partial I^{(k)}/\partial x$, $\partial I^{(k)}/\partial y$ at the ends. The value of this polynomial at t=0 is the BIO prediction:

$$\text{pred}_{BIO} = \frac{1}{2} \cdot (I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)). \qquad (4)$$

Here, $\tau_0$ and $\tau_1$ denote the distances to the reference frames as shown in FIG. 4 which shows an example of an optical flow trajectory. Distances $\tau_0$ and $\tau_1$ are calculated based on picture order count (POC) for Ref0 and Ref1: $\tau_0$=POC(current)−POC(Ref0), $\tau_1$=POC(Ref1)−POC(current). If both predictions come from the same time direction (either both from the past or both from the future) then the signs are different (i.e., $\tau_0 \cdot \tau_1 < 0$). In this case, BIO is applied only if the prediction is not from the same time moment (i.e., $\tau_0 \neq \tau_1$), both referenced regions have non-zero motion ($MVx_0$, $MVy_0$, $MVx_1$, $MVy_1 \neq 0$) and the block motion vectors are proportional to the time distance ($MVx_0/MVx_1 = MVy_0/MVy_1 = -\tau_0/\tau_1$).

The motion vector field $(v_x, v_y)$ is determined by minimizing the difference $\Delta$ between values in points A and B (intersection of motion trajectory and reference frame planes on FIG. 4). Model uses only first linear term of a local Taylor expansion for $\Delta$:

$$\Delta = (I^{(0)} - I^{(1)}_0 + v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y)) \qquad (5)$$

All values in Equation 5 depend on the sample location (i', j'), which was omitted from the notation so far. Assuming the motion is consistent in the local surrounding area, we minimize $\Delta$ inside the $(2M+1) \times (2M+1)$ square window $\Omega$ centered on the currently predicted point (i,j), where M is equal to 2:

$$(v_x, v_y) = \arg\min_{v_x, v_y} \sum_{[i',j'] \in \Omega} \Delta^2[i', j'] \qquad (6)$$

For this optimization problem, the JEM uses a simplified approach making first a minimization in the vertical direction and then in the horizontal direction. This results in $$v_x = (s_1 + r) > m? \ \text{clip3}\left(-thBIO, thBIO, -\frac{s_3}{(s_1 + r)}\right):0 \qquad (7)$$

$$v_y = (s_5 + r) > m? \ \text{clip3}\left(-thBIO, thBIO, -\frac{s_6 - v_x s_2/2}{(s_5 + r)}\right):0 \ \text{where,} \qquad (8)$$

$$s_1 = \sum_{[i',j] \in \Omega} \left(\tau_1 \partial I^{(1)}/\partial x + \tau_0 \ \partial I^{(0)}/\partial x\right)^2; \qquad (9)$$

$$s_3 = \sum_{[i',j] \in \Omega} \left(I^{(1)} - I^{(0)}\right)\left(\tau_1 \partial I^{(1)}/\partial x + \tau_0 \partial I^{(0)}/\partial x\right);$$

$$s_2 = \sum_{[i',j] \in \Omega} \left(\tau_1 \partial I^{(1)}/\partial x + \tau_0 \partial I^{(0)}/\partial x\right)\left(\tau_1 \partial I^{(1)}/\partial y + \tau_0 \partial I^{(0)}/\partial y\right);$$

$$s_5 = \sum_{[i',j] \in \Omega} \left(\tau_1 \partial I^{(1)}/\partial y + \tau_0 \ \partial I^{(0)}/\partial y\right)^2;$$

$$s_6 = \sum_{[i',j] \in \Omega} \left(I^{(1)} - I^{(0)}\right)\left(\tau_1 \partial I^{(1)}/\partial y + \tau_0 \partial I^{(0)}/\partial y\right)$$

In order to avoid division by zero or a very small value, regularization parameters r and m are introduced in Equations 7 and 8.

$$r = 500 \cdot 4^{d-8} \qquad (10)$$

$$m = 700 \cdot 4^{d-8} \qquad (11)$$

Here d is bit depth of the video samples.

Figure 5B:
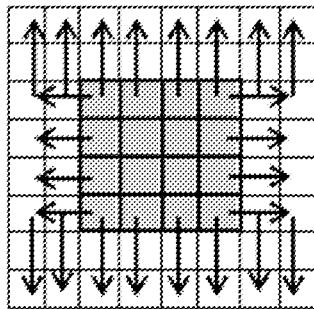
FIG. 5A shows example of access positions outside of a block and FIG. 5B shows an example of padding used in order to avoid extra memory access and calculation.
Figure 5A:
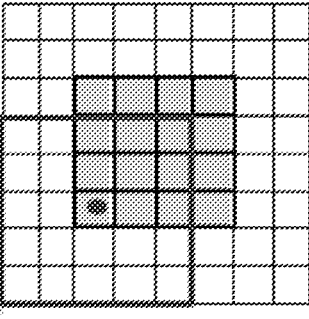

In order to keep the memory access for BIO the same as for regular bi-predictive motion compensation, all prediction and gradients values, $I^{(k)}$, $\partial I^{(k)}/\partial x$, $\partial I^{(k)}/\partial y$, are calculated only for positions inside the current block. In Equation (9), $(2M+1) \times (2M+1)$ square window $\Omega$ centered in currently predicted point on a boundary of predicted block needs to accesses positions outside of the block as shown in FIG. 5A. In the JEM, values of $I^{(k)}$, $\partial I^{(k)}/\partial x$, $\partial I^{(k)}/\partial y$ outside of the block are set to be equal to the nearest available value inside the block. For example, this can be implemented as padding, as shown in FIG. 5B. FIGS. 5A and 5B show examples of BIO without a block extension. FIG. 5A shows examples of access positions outside of the block and FIG. 5B shows an example of padding used to avoid extra memory access and calculation.

With BIO, it's possible that the motion field can be refined for each sample. To reduce the computational complexity, a block-based design of BIO is used in the JEM. The motion refinement is calculated based on 4×4 block. In the block-based BIO, the values of $s_n$ in Equation 9 of all samples in a 4×4 block are aggregated, and then the aggregated values of $s_n$ in are used to derived BIO motion vectors offset for the 4×4 block. More specifically, the following formula is used for block-based BIO derivation:

$$s_{1,b_k} = \sum_{(x,y)\in b_k} \sum_{[i',j]\in\Omega} \left(\tau_1 \partial I^{(1)}/\partial x + \tau_0 \partial I^{(0)}/\partial x\right)^2; \quad (12)$$

$$s_{3,b_k} = \sum_{(x,y)\in b_k} \sum_{[i',j]\in\Omega} \left(I^{(1)} - I^{(0)}\right)\left(\tau_1 \partial I^{(1)}/\partial x + \tau_0 \partial I^{(0)}/\partial x\right);$$

$$s_{2,b_k} = \sum_{(x,y)\in b_k} \sum_{[i',j]\in\Omega} \left(\tau_1 \partial I^{(1)}/\partial x + \tau_0 \partial I^{(0)}/\partial x\right)\left(\tau_1 \partial I^{(1)}/\partial y + \tau_0 \partial I^{(0)}/\partial y\right);$$

$$s_{5,b_k} = \sum_{(x,y)\in b_k} \sum_{[i',j]\in\Omega} \left(\tau_1 \partial I^{(1)}/\partial y + \tau_0 \partial I^{(0)}/\partial y\right)^2;$$

$$s_{6,b_k} = \sum_{(x,y)\in b_k} \sum_{[i',j]\in\Omega} \left(I^{(1)} - I^{(0)}\right)\left(\tau_1 \partial I^{(1)}/\partial y + \tau_0 \partial I^{(0)}/\partial y\right)$$

where $b_k$ denotes the set of samples belonging to the k-th 4×4 block of the predicted block. $s_n$ in Equations 7 and 8 are replaced by $((s_{n,bk})\gg4)$ to derive the associated motion vector offsets.

In some cases, MV regiment of BIO might be unreliable due to noise or irregular motion. Therefore, in BIO, the magnitude of MV regiment is clipped to a threshold value thBIO. The threshold value is determined based on whether the reference pictures of the current picture are all from one direction. If all the reference pictures of the current picture are from one direction, the value of the threshold is set to $12\times2^{14-d}$; otherwise, it is set to $12\times2^{13-d}$.

Gradients for BIO are calculated at the same time with motion compensation interpolation using operations consistent with HEVC motion compensation process (two dimensional (2D) separable Finite Impulse Response (FIR). The input for this 2D separable FIR is the same reference frame sample as for motion compensation process and fractional position (fracX,fracY) according to the fractional part of block motion vector. In case of horizontal gradient di fax signal first interpolated vertically using BIOfilterS corresponding to the fractional position fracY with de-scaling shift d−8, then gradient filter BIOfilterG is applied in horizontal direction corresponding to the fractional position fracX with de-scaling shift by 18-d. In case of vertical gradient allay first gradient filter is applied vertically using BIOfilterG corresponding to the fractional position fracY with de-scaling shift d−8, then signal displacement is performed using BIOfilterS in horizontal direction corresponding to the fractional position fracX with de-scaling shift by 18-d. The length of interpolation filter for gradients calculation BIOfilterG and signal displacement BIOfilterF is shorter (6-tap) in order to maintain reasonable complexity. Table 1 shows the filters used for gradients calculation for different fractional positions of block motion vector in BIO. Table 2 shows the interpolation filters used for prediction signal generation in BIO.

TABLE 1

| Filters for gradients calculation in BIO | |
| --- | --- |
| Fractional pel position | Interpolation filter for gradient (BIOfilterG) |
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {−1, 4, −57, 57, −4, 1} |

TABLE 2

| Interpolation filters for prediction signal generation in BIO | |
| --- | --- |
| Fractional pel position | Interpolation filter for prediction signal (BIOfilterS) |
| 0 | { 0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {3, −10, 35, 44, −11, 3} |

In the JEM, BIO is applied to all bi-predicted blocks when the two predictions are from different reference pictures. When local illumination compensation (LIC) is enabled for a CU, BIO is disabled.

In the JEM, overlapped block motion compensation (OBMC) is applied for a block after normal MC process. To reduce the computational complexity, BIO is not applied during the OBMC process. This means that BIO is only applied in the MC process for a block when using its own MV and is not applied in the MC process when the MV of a neighboring block is used during the OBMC process.

A two-stage early termination method is used to conditionally disable the BIO operations depending on the similarity between the two prediction signals. The early termination is first applied at the CU-level and then at the sub-CU-level. Specifically, the proposed method first calculates the SAD between the L0 and L1 prediction signals at the CU level. Given that the BIO is only applied to luma, only the luma samples need to be considered for the SAD calculation. If the CU-level SAD is no larger than a predefined threshold, the BIO process is completely disabled for the whole CU. The CU-level threshold is set to $2^{(BDepth-9)}$ per sample. If the BIO process is not disabled at the CU level, and if the current CU contains multiple sub-CUs, the SAD of each sub-CU inside the CU will be calculated. Then, the decision on whether to enable or disable the BIO process is made at the sub-CU-level based on a predefined sub-CU-level SAD threshold, which is set to $3*2^{(BDepth-10)}$ per sample.

1.4 Spec for BDOF (Bidirectional Optical Flow) in VVC
   Spec of BDOF (in JVET-N1001-v2) is as follows:
8.5.7.4 Bidirectional Optical Flow Prediction Process
   Inputs to this process are:
   two variables nCbW and nCbH specifying the width and the height of the current coding block,
   two (nCbW+2)×(nCbH+2) luma prediction sample arrays predSamplesL0 and predSamplesL1, the prediction list utilization flags predFlagL0 and pred-
FlagL1,
the reference indices refIdxL0 and refIdxL1,
the bidirectional optical flow utilization flags bdofUtiliza-
tionFlag[xIdx][yIdx] with xIdx=0 . . . (nCbW>>2)−1,
yIdx=0 . . . (nCbH>>2)−1.

Output of this process is the (nCbW)×(nCbH) array
pbSamples of luma prediction sample values.

Variables bitDepth, shift1, shift2, shift3, shift4, offset4,
and mvRefineThres are derived as follows:

The variable bitDepth is set equal to $BitDepth_Y$.

The variable shift1 is set to equal to Max(2, 14−bitDepth).

The variable shift2 is set to equal to Max(8, bitDepth−4).

The variable shift3 is set to equal to Max(5, bitDepth−7).

The variable shift4 is set equal to Max(3, 15−bitDepth)
and the variable offset4 is set equal to 1<<(shift4−1).

The variable mvRefineThres is set equal to Max(2, 1<<<
(13−bitDepth)).

For xIdx=0 . . . (nCbW>>2)−1 and yIdx=0 . . .
(nCbH>>2)−1, the following applies:

The variable xSb is set equal to (xIdx<<2)+1 and ySb is
set equal to (yIdx<<2)+1.

If bdofUtilizationFlag[xSbIdx][yIdx] is equal to FALSE,
for x=xSb−1 . . . xSb+2, y=ySb−1 . . . ySb+2, the
prediction sample values of the current subblock are
derived as follows:

$$pbSamples[x][y]=Clip3(0,(2^{bitDepth})-1,(predSam-$$
$$plesL0[x+1][y+1]+offset2+predSamplesL1[x+1]$$
$$[y+1])>>shift1) \quad (8-852)$$

Otherwise (bdofUtilizationFlag[xSbIdx][yIdx] is equal to
TRUE), the prediction sample values of the current
subblock are derived as follows:

For x=xSb−1 . . . xSb+4, y=ySb−1 . . . ySb+4, the
following ordered steps apply:

1. The locations $(h_x, v_y)$ for each of the corresponding
sample locations (x,y) inside the prediction sample
arrays are derived as follows:

$$h_x=Clip3(1,nCbW,x) \quad (8-853)$$

$$v_y=Clip3(1,nCbH,y) \quad (8-854)$$

2. The variables gradientHL0[x][y], gradientVL0[x]
[y], gradientHL1[x][y] and gradientVL1[x][y] are
derived as follows:

$$gradientHL0[x][y]=(predSamplesL0[h_x+1][v_y]-pred-$$
$$SampleL0[h_x-1][v_y])>>shift1 \quad (8-855)$$

$$gradientVL0[x][y]=(predSampleL0[h_x][v_y+1]-pred-$$
$$SampleL0[h_x][v_y-1])>>shift1 \quad (8-856)$$

$$gradientHL1[x][y]=(predSamplesL1[h_x+1][v_y]-pred-$$
$$SampleL1[h_x-1][v_y])>>shift1 \quad (8-857)$$

$$gradientVL1[x][y]=(predSampleL1[h_x][v_y+1]-pred-$$
$$SampleL1[h_x][v_y-1])>>shift1 \quad (8-858)$$

3. The variables temp[x][y], tempH[x][y] and tempV
[x][y] are derived as follows:

$$diff[x][y]=(predSamplesL0[h_x][v_y]>>shift2)-(pred-$$
$$SamplesL1[h_x][v_y]>>shift2) \quad (8-859)$$

$$tempH[x][y]=(gradientHL0[x][y]+gradientHL1[x][y])$$
$$>>shift3 \quad (8-860)$$

$$tempV[x][y]=(gradientVL0[x][y]+gradientVL1[x][y])$$
$$>>shift3 \quad (8-861)$$

The variables sGx2, sGy2, sGxGy, sGxdI and sGydI
are derived as follows:

$$sGx2=\Sigma_i\Sigma_j(tempH[xSb+i][ySb+j]*tempH[xSb+i]$$
$$[ySb+j]) \text{ with } i,j=-1 . . . 4 \quad (8-862)$$

$$sGy2=\Sigma_i\Sigma_j(tempV[xSb+i][ySb+j]*tempV[xSb+i][ySb+$$
$$j]) \text{ with } i,j=-1 . . . 4 \quad (8-863)$$

$$sGxGy=\Sigma_i\Sigma_j(tempH[xSb+i][ySb+j]*tempV[xSb+i]$$
$$[ySb+j]) \text{ with } i,j-1 . . . 4 \quad (8-864)$$

$$sGxdI=\Sigma_i\Sigma_j(-tempH[xSb+i][ySb+j]*diff[xSb+i][ySb+$$
$$j]) \text{ with } i,j=-1 . . . 4 \quad (8-865)$$

$$sGydI=\Sigma_i\Sigma_j(-tempV[xSb+i][ySb+j]*diff[xSb+i][ySb+$$
$$j]) \text{ with } i,j=-1 . . . 4 \quad (8-866)$$

The horizontal and vertical motion offset of the current
subblock are derived as:

$$v_x=sGx2>0?Clip3(-mvRefineThres,mvRefineThres,-$$
$$(sGxdI<<3)>>Floor(Log 2(sGx2))):0 \quad (8-867)$$

$$v_y=sGy2>0?Clip3(-mvRefineThres,mvRefineThres,$$
$$((sGydI<<3)-((v_x*sGxGy_m)<<12+v_x*sGxGy_s)$$
$$>>1)>>Floor(Log 2(sGx2))):0 \quad (8-868)$$

For x=xSb−1 . . . xSb+2, y=ySb−1 . . . ySb+2, the
prediction sample values of the current sub-block are
derived as follows:

$$bdofOffset=Round((v_x*(gradientHL1[x+1][y+1]-gra-$$
$$dientHL0[x+1][y+1]))>>1)+Round((v_y*(gradi-$$
$$entVL1[x+1][y+1]-gradientVL0[x+1][y+1]))>>1) \quad (8-869)$$

[Ed. (JC): Round( ) operation is defined for float input.
The Round( ) operation seems redundant here since the input
is an integer value. To be confirmed by the proponent]

$$pbSamples[x][y]=Clip3(0,(2^{bitDepth})-1,(predSam-$$
$$plesL0[x+1][y+1]+offset4+predSamplesL1[x+1]$$
$$[y+1]+bdofOffset)>>shift4) \quad (8-870)$$

The spatial gradient is calculated as follows:

$$gradientHL0[x][y]=(predSamplesL0[h_x+1l][v_y]-pred-$$
$$SampleL0[h_x-1][v_y])>>shift1 \quad (8-855)$$

On the other hand, temporal gradient is calculated as
follows:

$$diff[x][y]=(predSamplesL0[h_x][v_y]>>shift2)-(pred-$$
$$SamplesL1[h_x][v_y]>>shift2) \quad (8-859)$$

The calculation of spatial gradient and temporal gradient
is not aligned.

1.5 Decoder-Side Motion Vector Refinement

In bi-prediction operation, for the prediction of one block
region, two prediction blocks, formed using a motion vector
(MV) of list0 and a MV of list1, respectively, are combined
to form a single prediction signal. In JVET-K0217, the
decoder-side motion vector refinement (DMVR) method,
the two motion vectors of the bi-prediction are further
refined by a bilateral matching process.

In the proposed method DMVR is applied only in Merge
and Skip modes, if the following condition is true:

(POC−POC0)*(POC−POC1)<0, where POC—picture order count of current to be encoded
picture, POC0 and POC1—picture order counts of the
references for the current picture.

The signaled merge candidate pair is used as input to
DMVR process and are denoted initial motion vectors
(MV0, MV1). The search points that are searched by DMVR
obey the motion vector difference mirroring condition. In other words any point that is checked by DMVR, denoted by candidate motion vector pair (MV0', MV1') obey the following two equations:

$$MV0'=MV0+MV_{diff}$$

$$MV1'=MV1-MV_{diff}$$

Where $MV_{diff}$ represents the points in the search space in one of the reference pictures.

Figure 6:
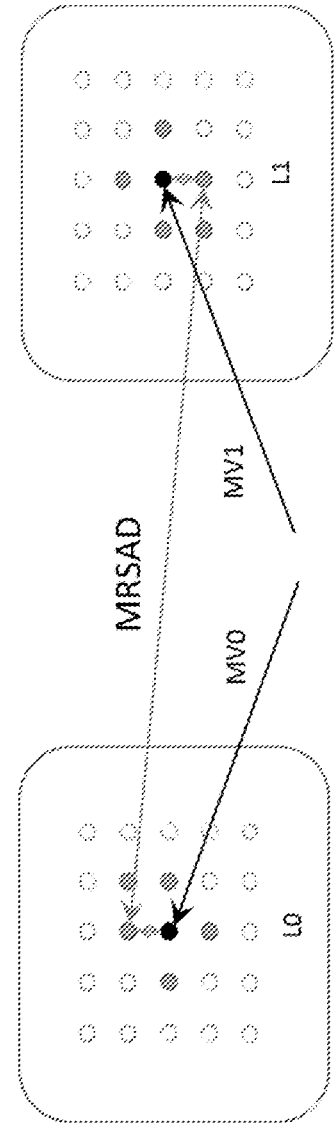
FIG. 6 shows an example of bilateral matching with six points search.

After the construction of the search space the uni-lateral predictions are constructed using regular 8-tap DCTIF interpolation filter. Bilateral matching cost function is calculated by using mean removed sum of absolute differences (MR-SAD) between the two predictions (see FIG. 6 which shows an example of a bilateral matching with 6 points search) and the search point resulting in the minimum cost is selected as the refined MV pair. For the MRSAD calculation 16 bit precision of samples is used (which is the output of the interpolation filtering), and no clipping and no rounding operations are applied before MRSAD calculation. The reason for not applying rounding and clipping is to reduce internal buffer requirement.

Figures 7A, 7B:
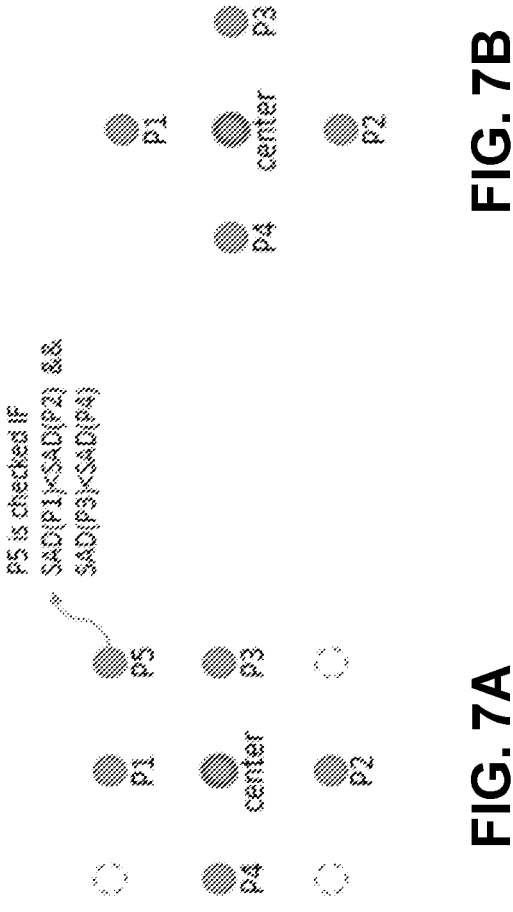
FIG. 7A shows an example of an adaptive integer search pattern and FIG. 7B shows an example of a half sample search pattern.

In the proposed method the integer precision search points are chosen by the Adaptive pattern method. The cost, corresponding to the central points (pointed by the initial motion vectors) is calculated firstly. The other 4 costs (in sign shape) is calculated by the two predictions, located at the opposite sides of each other by the central point. Last $6^{th}$ point at the angle is chosen by the gradient of the previous calculated costs as shown in FIGS. 7A and 7B. FIG. 7A shows an example an adaptive integer search pattern and FIG. 7B shows an example of a half sample search pattern.

The output of the DMVR process is the refined motion vector pair corresponding to the minimal cost.

If after one iteration the minimum cost is achieved at the central point of the search space, i.e. the motion vectors are not changed, and the refinement process is terminated. Otherwise, the best cost further is regarded as center, and the process continues, while the minimal cost does not correspond to the central point and the search range is not exceeded.

Half sample precision search is applied only if application of half-pel search does not exceed the search range. In this case only 4 MRSAD calculations are performed, corresponding to plus shape points around the central one, which is chosen as the best during the integer precision search. At the end the refined motion vector pair is output that correspond to the minimal cost point.

Some simplifications and improvements are further proposed in JVET-L0163.

Reference Sample Padding

Reference sample padding is applied in order to extend the reference sample block that is pointed by the initial motion vector. If the size of the coding block is given by "w" and "h", then it is assumed that a block of size w+7 and h+7 is retrieved from the reference picture buffer. The retrieved buffer is then extended by 2 samples in each direction by repetitive sample padding using the nearest sample. Afterwards the extended reference sample block is used to generate the final prediction once the refined motion vector is obtained (which can deviate from the initial motion vector 2 samples in each direction).

It is noted that this modification eliminates the external memory access requirement of DMVR completely without any coding loss.

Bilinear Interpolation Instead of 8-Tap DCTIF

According to the proposal bilinear interpolation is applied during the DMVR search process, which means that the predictions used in MRSAD computation are generated using bilinear interpolation. Once the final refined motion vectors are obtained regular 8-tap Discrete Cosine Transform (DCT-based) interpolation filter (DCTIF) is applied to generate final predictions.

Disabling of DMVR for Small Blocks

DMVR is disabled for blocks 4×4, 4×8 and 8×4.

Early Termination Based on MV Difference Between Merge Candidates

An additional condition is imposed on DMVR to confine the MV refinement process. With it, DMVR is conditionally disabled when the below condition is satisfied.

The MV difference between the selected merge candidate and any of the previous ones in the same merge list is less than a pre-defined threshold (that is, ¼-, ½- and 1-pixel-wide intervals for CUs with less than 64 pixels, less than 256 pixels and at least 256 pixels, respectively).

Early Termination Based on SAD Cost at the Center Search Coordinate

The sum of absolute difference (SAD) between the two prediction signals (L0 and L1 prediction) using the initial motion vectors of the current CU is calculated. If the SAD is no larger than a predefined threshold, i.e., $2^{(BDepth-9)}$ per sample, the DMVR is skipped; otherwise, the DMVR is still applied to refine the two motion vectors of the current block.

DMVR Application Condition

The DMVR application condition is (POC−POC1)× (POC−POC2)<0 as it is implemented in BMS2.1 is replaced by the new condition (POC−POC1)==(POC2−POC). This means that DMVR is applied only if reference pictures are in opposite time directions and are equidistant to current picture.

MRSAD Computation Using Every Second Row

The MRSAD cost is computed only for odd numbered rows of a block, the even numbered samples rows are not considered. Accordingly, the number of operations for the MRSAD calculation is halved.

Parametric Error Surface Based Sub-Pixel Offsets Estimation

In JVET-K0041, a parametric error surface fitted using integer distance position evaluated costs to determine $\frac{1}{16}^{th}$-pel accurate sub-pixel offsets with very minimal computational complexity was proposed.

This method is adopted into VVC and is summarized below:

1. The parametric error surface fit is computed only if the minimum matching cost of integer MVD is not equal to 0, and the matching cost of zero MVD is larger than a threshold.

2. The best integer position is taken as the center position, cost of the center position and cost of positions (−1,0), (0,−1), (1,0) and (0,1) (in unit of integer pixel) relative to the center position are used to fit a 2-D parabolic error surface equation of the form:

$$E(x,y)=A(x-x_0)^2+B(y-y_0)^2+C$$

where $(x_0,y_0)$ corresponds to the position with the least cost and C corresponds to the minimum cost value. By solving the 5 equations in 5 unknowns, $(x_0,y_0)$ is computed as:

$$x_0=(E(-1,0)-E(1,0))/(2(E(-1,0)+E(1,0)-2E(0,0)))$$

$$y_0=(E(0,-1)-E(0,1))/(2((E(0,-1)+E(0,1)-2E(0,0)))$$

$(x_0,y_0)$ can be computed to any required sub-pixel precision by adjusting the precision at which the division is performed (i.e. how many bits of quotient are computed). For $\frac{1}{16}^{th}$-pel accuracy, just 4-bits in the absolute value of the quotient needs to be computed, which lends itself to a fast shifted subtraction based implementation of the 2 divisions required per CU.

3. The computed $(x_0, y_0)$ are added to the integer distance refinement MV to get the sub-pixel accurate refinement delta MV.

Figures 8, 9:
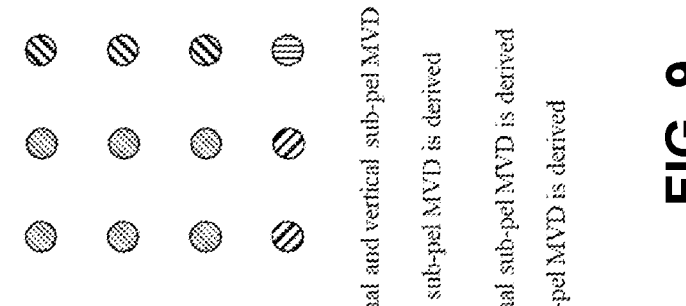
FIG. 8 shows an example of integer positions where parametric error surface fit will be performed.
FIG. 9 shows an example of positions wherein sub-pel motion vector difference (MVD) are derived in DMVR.

Meanwhile, for the 5*5 search space, parametric error surface fit is performed only when one of the center 9 positions is the best integer position, as shown in FIG. 8.

JVET-N0236: Prediction Refinement with Optical Flow

This contribution proposes a method to refine the sub-block based affine motion compensated prediction with optical flow. After the sub-block based affine motion compensation is performed, prediction sample is refined by adding a difference derived by the optical flow equation, which is referred as prediction refinement with optical flow (PROF). The proposed method can achieve inter prediction in pixel level granularity without increasing the memory access bandwidth.

To achieve a finer granularity of motion compensation, this contribution proposes a method to refine the sub-block based affine motion compensated prediction with optical flow. After the sub-block based affine motion compensation is performed, luma prediction sample is refined by adding a difference derived by the optical flow equation. The proposed PROF (prediction refinement with optical flow) is described as following four steps.

Step 1) The sub-block-based affine motion compensation is performed to generate sub-block prediction $I(i,j)$.

Step 2) The spatial gradients $g_x(i,j)$ and $g_y(i,j)$ of the sub-block prediction are calculated at each sample location using a 3-tap filter $[-1, 0, 1]$.

$$g_x(i,j)=I(i+1,j)-I(i-1,j)$$

$$g_y(i,j)=I(i,j+1)-I(i,j-1)$$

The sub-block prediction is extended by one pixel on each side for the gradient calculation. To reduce the memory bandwidth and complexity, the pixels on the extended borders are copied from the nearest integer pixel position in the reference picture. Therefore, additional interpolation for padding region is avoided.

Figure 10:
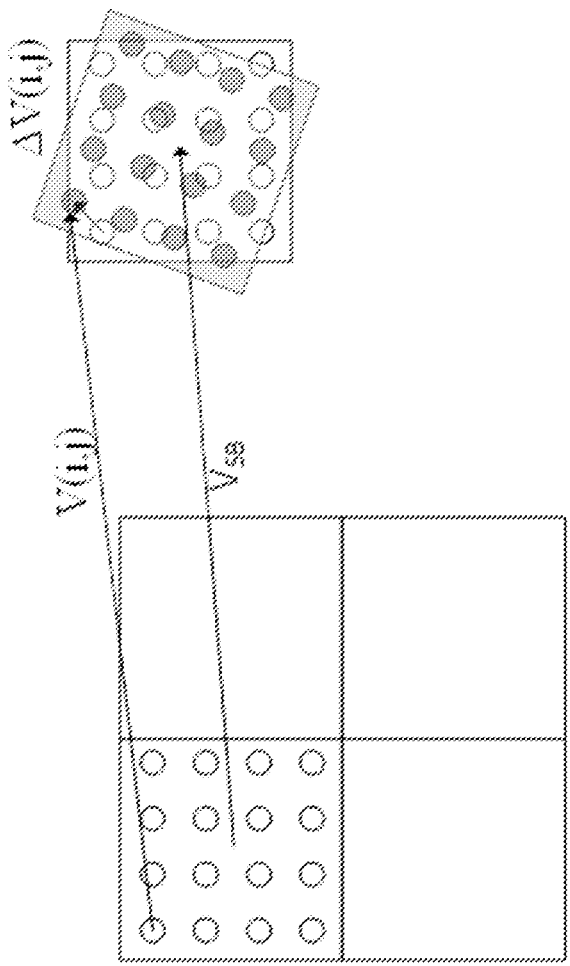
FIG. 10 shows an example of a Sub-block motion vector ($V_{SB}$) and pixel $\Delta v(i,j)$.

Step 3) The luma prediction refinement (denoted $\Delta I$) as is calculated by the optical flow equation.

$$\Delta I(i,j)=g_x(i,j)*\Delta v_x(i,j)+g_y(i,j)*\Delta v_y(i,j)$$

where the delta MV (denoted as $\Delta v(i,j)$) is the difference between pixel MV computed for sample location $(i,j)$, denoted by $v(i,j)$, and the sub-block MV of the sub-block to which pixel $(i,j)$ belongs, as shown in FIG. 10.

Since the affine model parameters and the pixel location relative to the sub-block center are not changed from sub-block to sub-block, $\Delta v(i,j)$ can be calculated for the first sub-block, and reused for other sub-blocks in the same CU. Let x and y be the horizontal and vertical offset from the pixel location to the center of the sub-block, $\Delta v(x,y)$ can be derived by the following equation, $$\begin{cases} \Delta v_x(x, y) = c*x + d*y \\ \Delta v_y(x, y) = e*x + f*y \end{cases} \quad \text{(PROF-eq1)}$$

For 4-parameter affine model, $$\begin{cases} c = f = \dfrac{v_{1x} - v_{0x}}{w} \\ e = -d = \dfrac{v_{1y} - v_{0y}}{w} \end{cases}$$

For 6-parameter affine model, $$\begin{cases} c = \dfrac{v_{1x} - v_{0x}}{w} \\ d = \dfrac{v_{2x} - v_{0x}}{h} \\ e = \dfrac{v_{1y} - v_{0y}}{w} \\ f = \dfrac{v_{2y} - v_{0y}}{h} \end{cases}$$

where $(v_{0x}, v_{0y})$, $(v_{1x}, v_{1y})$, $(v_{2x}, v_{2y})$ are the top-left, top-right and bottom-left control point motion vectors, w and h are the width and height of the CU.

Step 4) Finally, the luma prediction refinement is added to the sub-block prediction $I(i,j)$. The final prediction $I'$ is generated as the following equation.

$$I'(i,j)=I(i,j)+\Delta I(i,j)$$

Some Details in JVET-N0236 a) How to Derive the Gradients for PROF

In JVET-N0263, the gradients are calculated for each sub-block (4×4 sub-block in VTM-4.0) for each reference list. For each sub-block, the nearest integer samples of the reference block are fetched to pad the four side outer lines of samples (refer to previous figure).

Suppose the MV for the current sub-block is (MVx, MVy). Then the fractional part is calculated as (FracX, FracY)=(MVx&15, MVy&15). The integer part is calculated as (IntX, IntY)=(MVx>>4, MVy>>4). The offsets (OffsetX, OffsetY) are derived as:

OffsetX=FracX>7?1:0;

OffsetY=FracY>7?1:0;

Suppose the top-left coordinate of the current sub-block is (xCur, yCur) and the dimensions of the current sub-block is W×H.

Then (xCor0, yCor0), (xCor1, yCor1), (xCor2, yCor2) and (xCor3, yCor3) are calculated as (xCor0,yCor0)=(xCur+IntX+OffsetX−1,yCur+IntY+OffsetY−1);

(xCor1,yCor1)=(xCur+IntX+OffsetX−1,yCur+IntY+OffsetY+H);

(xCor2,yCor2)=(xCur+IntX+OffsetX−1,yCur+IntY+OffsetY);

(xCor3,yCor3)=(xCur+IntX+OffsetX+W,yCur+IntY+OffsetY);

Suppose PredSample[x][y] with x=0 . . . W−1, y=0 . . . H−1 stores the prediction samples for the sub-block. Then the padding samples are derived as PredSample[x][−1]=(Ref(xCor0+x,yCor0)<<Shift0)−Rounding, for x=−1 . . . W;

PredSample[x][H]=(Ref(xCor1+x,yCor1)<<Shift0)−Rounding, for x=−1 . . . W;

PredSample[−1][y]=(Ref(xCor2,yCor2+y)<<Shift0)−
   Rounding, for y=0 . . . H−1;

PredSample[W][y]=(Ref(xCor3,yCor3+y)<<Shift0)−
   Rounding, for y=0 . . . H−1;

where Rec represents the reference picture. Rounding is an integer, which is equal to $2^{13}$ in the exemplary PROF implementation. Shift0=Max(2, (14−BitDepth));

PROF attempts to increase the precision of the gradients, unlike BIO in VTM-4.0, where the gradients are output with the same precision as input luma samples.

The gradients in PROF are calculated as below:

Shift1=Shift0-4.

gradientH[x][y]=(predSamples[x+1][y]−predSample
   [x−1][y])>>Shift1 gradientV[x][y]=(predSample[x][y+1]−predSample[x]
   [y−1])>>Shift1

It should be noted that predSamples[x][y] keeps the precision after interpolation.

b) How to Derive Δv for PROF

The derivation of Δv (denoted as dMvH[posX][posY] and dMvV[posX][posY] with posX=0 . . . W−1, pos Y=0 . . . H−1) can be described as below Suppose the dimensions of the current block is cbWidth× cbHeight, the number of control point motion vectors is numCpMv, and the control point motion vectors are cpMvLX[cpIdx], with cpIdx=0 . . . numCpMv−1 and X being 0 or 1 representing the two reference lists.

The variables log 2CbW and log 2CbH are derived as follows:

log 2CbW=Log 2(cbWidth)

log 2CbH=Log 2(cbHeight)

The variables mvScaleHor, mvScaleVer, dHorX and dVerX are derived as follows:

mvScaleHor=cpMvLX[0][0]<<7 mvScaleVer=cpMvLX[0][1]<<7 dHorX=(cpMvLX[1][0]−cpMvLX[0][0])<<(7−log
   2CbW)

dVerX=(cpMvLX[1][1]−cpMvLX[0][1])<<(7−log
   2CbW)

The variables dHorY and dVerY are derived as follows:
If numCpMv is equal to 3, the following applies:

dHorY=(cpMvLX[2][0]−cpMvLX[0][0])<<(7−log
   2CbH)

dVerY=(cpMvLX[2][1]−cpMvLX[0][1])<<(7−log
   2CbH)

Otherwise (numCpMv is equal to 2), the following applies:

dHorY=−dVerX dVerY=dHorX

The variable qHorX, qVerX, qHorY and qVerY are derived as qHorX=dHorX<<2;

qVerX=dVerX<<2;

qHorY=dHorY<<2;

qVerY=dVerY<<2;

dMvH[0][0] and dMvV [0][0] are calculated as dMvH[0][0]=((dHorX+dHorY)<<1)−((qHorX+qHorY)
   <<1);

dMvV[0][0]=((dVerX+dVerY)<<1)−((qVerX+qVerY)
   <<1);

dMvH[xPos][0] and dMvV[xPos][0] for xPos from 1 to W−1 are derived as:

dMvH[xPos][0]=dMvH[xPos−1][0]+qHorX;

dMvV[xPos][0]=dMvV[xPos−1][0]+qVerX;

For yPos from 1 to H−1, the following applies:

dMvH[xPos][yPos]=dMvH[xPos][yPos−1]+qHorY
   with xPos=0 . . . W−1 dMvV[xPos][yPos]=dMvV[xPos][yPos−1]+qVerY
   with xPos=0 . . . W−1

Finally, dMvH[xPos][yPos] and dMvV [xPos][yPos] with posX=0 . . . W−1, posY=0 . . . H−1 are right shifted as dMvH[xPos][yPos]=SatShift(dMvH[xPos][yPos],7+
   2−1);

dMvV[xPos][yPos]=SatShift(dMvV[xPos][yPos],7+2−
   1);

where SatShift(x, n) and Shift (x,n) is defined as $$SatShift(x, n) = \begin{cases} (x + offsset0) \gg n & \text{if } x \geq 0 \\ -((-x + \text{offset1}) \gg n) & \text{if } x < 0 \end{cases}$$

Shift(x,n)=(x+offset0)>>n

In one example, offset0 and/or offset1 are set to (1<<n) >>1.

c) How to Derive ΔI for PROF

For a position (posX, posY) inside a sub-block, its corresponding Δv(i,j) is denoted as (dMvH[posX][posY], dMvV[posX][posY]). Its corresponding gradients are denoted as (gradientH[posX][posY], gradientV[posX] [posY]).

Then ΔI(posX, posY) is derived as follows. (dMvH[posX][posY], dMvV[posX][posY]) are clipped as dMvH[posX][posY]=Clip3(−32768,32767,dMvH
   [posX][posY]);

dMvV[posX][posY]=Clip3(−32768,32767,dMvV
   [posX][posY]);

ΔI(posX,posY)=dMvH[posX][posY]×gradientH[posX]
   [posY]+dMvV[posX][posY]×gradientV[posX]
   [posY];

ΔI(posX,posY)=Shift(ΔI(posX,posY),1+1+4);

ΔI(posX,posY)=Clip3(−($2^{13}$−1),$2^{13}$−1,ΔI(posX,posY));   (PROF-eq2)

d) How to Derive I' for PROF

If the current block is not coded as bi-prediction or weighted-prediction,

I'(posX,posY)=Shift(((I(posX,posY)+ΔI(posX,posY)),
   Shift0),

I'(posX,posY)=ClipSample(I'(posX,posY)), where ClipSample clips a sample value to a valid output sample value.

Then I'(posX, posY) is output as the inter-prediction value.

Otherwise (the current block is coded as bi-prediction or weighted-prediction) I'(posX, posY) will be stored and used to generate the inter-prediction value according to other prediction values and/or weighting values.

Related Methods

In the prior filings, PCT Application Nos. PCT/CN2018/096384, PCT/CN2018/098691, PCT/CN2018/104301, PCT/CN2018/106920, PCT/CN2018/109250, and PCT/CN2018/109425, a MV update method and a two-step inter prediction method are proposed. The derived MV between reference block 0 and reference block 1 in BIO are scaled and added to the original motion vector of list 0 and list 1. Meanwhile, the updated MV is used to perform motion compensation and a second inter prediction is generated as the final prediction.

Meanwhile, in those prior PCT filings, the temporal gradient is modified by removing the mean difference between reference block 0 and reference block 1.

In another prior filing, PCT Application No. PCT/CN2018/092118, for several sub-blocks with different, only one set of MVs is generate for chrome component.

In JVET-N0145, DMVR is harmonized with MMVD (merge with MVD). DMVR is applied to the motion vectors derived by MMVD when the distance of MMVD is larger than 2 pel.

1.7 DMVR in VVC Draft 4

The usage of DMVR in JVET-M1001_v7 (VVC working draft 4, version 7) is defined as follows:

When all of the following conditions are true, dmvrFlag is set equal to 1:

sps_dmvr_enabled_flag is equal to 1

Current block is not coded with triangular prediction mode, AMVR affine mode, sub-block mode (including merge affine mode, and ATMVP mode)

merge_flag[xCb][yCb] is equal to 1 both predFlagL0[0][0] and predFlagL1[0][0] are equal to 1 mmvd_flag[xCb][yCb] is equal to 0

DiffPicOrderCnt(currPic, RefPicList[0][refldxL0]) is equal to DiffPicOrderCnt(RefPicList[1][refldxL1], currPic)

cbHeight is greater than or equal to 8 cbHeight*cbWidth is greater than or equal to 64

Drawbacks of Existing Implementations

The current design of DMVR/BIO has the following problems:

1) When DMVR is applied to one block or one unit for processing DMVR (e.g., 16×16), the whole unit/block will share the same refinement motion information. However, it is possible that the refined motion information is not beneficial for partial of samples within the whole unit/block.

2) In JVET-N0145, DMVR could also be applied to MMVD coded blocks. However, it is restricted that DMVR is only applied when the distance of MMVD is larger than 2 pel. The selected MMVD distance is firstly used to derive the $1^{st}$ refined motion vectors for current block. If DMVR is further applied, the $2^{nd}$ refined MMVD distance due to DMVR may be included in MMVD distance table, which is unreasonable.

3) DMVR/BIO is always applied to blocks which satisfy conditions of block dimensions and POC distances.

However, it doesn't fully consider the decoded information of one block which may result in worse performance after refinement.

4) 5*5 square MVD space is searched in DMVR, which is computationally complex. The horizontal MVD can range from −2 to 2, and the vertical MVD can range from −2 to 2.

5) Parametric error surface fit is only performed for center 9 integer positions, which may be inefficient.

6) The MVD values (i.e., the difference between the decoded MV and refined MV) in BDOF/PROF, i.e., $v_x$ and $v_y$ derived in 8.5.7.4 Eq. 8-867 and 8-868 in BDOF, or $\Delta v_x(x,y)$ and $\Delta v_y(x,y)$ in PROF, could be in a large range, therefore, it is not possible to replace the multiplications by shifts in the BDOF/PROF process.

7) The derived sample prediction refinement (e.g., the offset to be added to the prediction sample) for BDOF is not clipped, therefore, it may be unfriendly for storage. On the other hand, PROF is using the same OF flow as BDOF while PROF invokes a clipping operation for the derived offset.

Problem in Residual Coding

1) The coding group (CG) size used in transform skip mode and regular residual coding mode (e.g., transform mode) are misaligned. In regular residual coding, 2*2 CG size is used for 2*2, 2*4 and 4*2 residual blocks, and 2*8 and 8*2 CG sizes are used for 2*N and N*2 residual blocks (N>=8) respectively. On the other hand, in transform skip mode, 2*2 CG size is always used for 2*N and N*2 (N>=2) residual blocks.

Exemplary Methods for Coding Tools with Adaptive Resolution Conversion

Embodiments of the disclosed technology overcome the drawbacks of existing implementations. The examples of the disclosed technology provided below are discussed to facilitate the understanding of the disclosed technology and should be interpreted in a way to limit the disclosed technology. Unless explicitly indicated to the contrary, the various features described in these examples can be combined.

Denote MV0 and MV1 as the MV of the block in prediction direction 0 and 1 respectively. For MVX (x=0 or 1), MVX[0] and MVX[1] represent the horizontal and vertical component of MVX respectively. If MV' is equal to (MV0+MV1), then MV'[0]=MV0[0]+MV1[0], and MV'[1]=MV0[1]+MV1[1]. If MV' is equal to a*MV0, then MV'[0]=a*MV0[0] and MV'[1]=a*MV0[1]. Suppose the reference picture in list 0 and list 1 are Ref0 and Ref1 respectively, the POC distance between the current picture and Ref0 is PocDist0 (i.e., absolute value of (POC of current picture minus POC of Ref0)), and the POC distance between Ref1 and the current picture is PocDist1 (i.e., absolute value of (POC of Ref1 minus POC of current picture)). Denote width and height of the block as W and H respectively. Suppose function abs(x) returns the absolute value of x.

Suppose the horizontal MVD in DMVR can range from −MVD_Hor_TH1 to MVD_Hor_TH2, the vertical MVD can range from −MVD_Ver_TH1 to MVD_Ver_TH2. Denote width and height of the block as W and H respectively. Suppose abs(X) returns the absolute value of X, Max(X, Y) returns the larger value of X and Y. Suppose sumAbsHorMv=abs(MV0[0])+abs(MV1[0]), sumAbsVerMv=abs(MV0[1])+abs(MV1[1]), maxHorVerMv=Max(abs(MV0[0], abs(MV1[0])), maxAbsVerMv=Max(abs(MV0[1], abs(MV1[1])). Denote the clipped vx and vy as clipVx and clipVy respectively.

In the disclosure below, the term "absolute MV" of a MV=(MVx, MVy) may refer to abs(MVx), or abs(MVy), or abs(MVx)+abs(MVy), or Max(abs(MVx), abs(MVy)). The term "absolute horizontal MV" refers to abs(MVx) and "absolute vertical MV" refers to abs(MVy).

Suppose function log K(x) returns the logarithm of x in base K, function ceil(y) returns the smallest integer greater than or equal to y (e.g., the integer value inty wherein y<=inty<y+1), floor(y) returns the largest integer less than or equal to y (e.g., the integer value inty wherein y−1<inty<=y). Function sign(x) returns sign of x, e.g., returns 0 if x>=0 and 1 if x<0. Suppose x^y is equal to $x^y$. Suppose function $$esp(x, y) = \begin{cases} 0 & x < y \text{ or } x = 0 \\ 2^{x-y} & x \geq y \text{ and } x \neq 0 \end{cases}, \text{ and } esp2(x) = \begin{cases} 0 & x < 0 \\ 2^x & x \geq 0 \end{cases}$$

Note that the proposed methods may be also applicable to other kinds of decoder side motion vector derivation/refinement, prediction/reconstruction samples refinement methods.

DMVR is applied to one block or one unit for processing DMVR (e.g., 16×16), in the following descriptions, a sub-region could be a part smaller than the processing unit.

BIO is also known as BDOF (Bi-Directional Optical Flow).

In the following discussion, the MVD utilized in the decoder side motion derivation process (e.g., BDOF, PROF) may be denoted by $v_x$, $v_y$, $\Delta v_x(x,y)$ and $\Delta v_y(x,y)$. In one example, $v_x$ and $v_y$ may refer to "$v_x$ and $v_y$" derived in 8.5.7.4 Eq. 8-867 and 8-868 in BDOF, or "$\Delta v_x(x,y)$ and $\Delta v_y(x,y)$" in PROF). In one example, $\Delta v_x(x,y)$ and $\Delta v_y(x,y)$ may refer to "$v_x$ and $v_y$" derived in 8.5.7.4 Eq. 8-867 and 8-868 in BDOF, or "$\Delta v_x(x,y)$ and $\Delta v_y(x,y)$" in PROF).

The proposed methods regarding PROF/BDOF may be applied to other kinds of coding methods that uses optical flow.

1. The results of MRSAD or other rules (e.g., SAD, sum of absolute transformed differences (SATD)) using a given MVD (or a given MVD pair for two lists) may be further modified before being used to select the refined motion vectors in the decoder side motion derivation process.
   a. In one example, the results may be modified via being multiplied by a scaling factor.
   i. Alternatively, the results may be modified via being divided by a scaling factor.
   ii. Alternatively, the results may be modified via being added/subtracted by a scaling factor.
   iii. In one example, the scaling factor may be dependent on the values of MVD.
      1. In one example, the scaling factor may be increased for a larger MVD (e.g., a larger absolute value of horizontal and/or vertical component of MVD).
      2. In one example, the scaling factor may be dependent on the sub-pel position of a candidate MV with initialized MV plus the tested MVD.
   iv. In one example, the scaling factors may be dependent on the allowed MVD sets (e.g., the horizontal or vertical component of a candidate in the allowed MVD set is within the range [−M, N] wherein M and N are non-negative values).

2. It is proposed that whether and/or how to apply DMVR or/and BIO may depend on the coding information of the block.
   a. In one example the coding information may include the motion vectors and POC values of reference pictures.
      i. In one example, the coding information may include whether the block is coded with AMVP mode or merge mode.
         1. In one example, for the AMVP coded blocks, BIO may be disabled.
      ii. In one example, whether to enable DMVR/BIO may depend on the sum of two motion vectors (denoted by MV0' and MV1' which are dependent on MV0 and MV1) or the absolute values of MV components.
         1. In one example, if abs(MV0'[0]+MV1'[0])>T1 or abs(MV0'[1]+MV1'[1])>T1, DMVR or/and BIO may be disabled. For example, T1=10 integer pixel.
         2. In one example, if abs(MV0'[0]+MV1'[0])>T1 and abs(MV0'[1]+MV1'[1])>T1, DMVR or/and BIO may be disabled.
         3. In one example, if abs(MV0'[0]+MV1'[0])+abs(MV0'[1]+MV1'[1])>T2, DMVR or/and BIO may be disabled. For example, T2=15 integer pixel.
         4. In one example, if abs(MV0'[0]+MV1'[0])<T1 or abs(MV0'[1]+MV1'[1])<T1, DMVR or/and BIO may be disabled. For example, T1=10 integer pixel.
         5. In one example, if abs(MV0'[0]+MV1'[0])<T1 and abs(MV0'[1]+MV1'[1])<T1, DMVR or/and BIO may be disabled.
         6. In one example, if abs(MV0'[0]+MV1'[0])+abs(MV0'[1]+MV1'[1])<T2, DMVR or/and BIO may be disabled. For example, T2=15 integer pixel.
         7. In one example, MV0' is set equal to MV0 and MV1' is set equal to MV1.
         8. In one example, MV0' is set equal to MV0 and MV1 may be scaled to generate MV1'.
            a. In one example, MV1'=MV1*PocDist0/PocDist1.
            b. In one example, MV1'=−MV1.
         9. In one example, MV1' is set equal to MV1 and MV0 may be scaled to generate MV0'.
            a. In one example, MV0'=MV0*PocDist1/PocDist0.
            b. In one example, MV0'=−MV0.
         10. In one example, MV0' may be set equal to MV0*(POCRef1−POCcur) and MV1' may be set equal to MV1*(POCcur−POCRef0), wherein POCcur, POCRef0 and POCRef1 may represent the POC value of the current picture, the reference picture of MV0 and the reference picture of MV1, respectively.
   b. In one example, the information may include the merge index or and MVP index.
      i. For example, DMVR or/and BDOF may be allowed only for certain merge index.
         1. For example, DMVR or/and BDOF may be allowed only for even merge index.
         2. For example, DMVR or/and BDOF may be allowed only for odd merge index.
         3. For example, DMVR or/and BDOF may be allowed only for merge index smaller than a threshold T1.
         4. example, DMVR or/and BDOF may be allowed only for merge index larger than a threshold T1.

ii. For example, BDOF may be allowed only for certain MVP index, e.g., even or odd MVP index.

c. In one example, the information may include whether sub-block transform (SBT) mode is employed by the block or not.

i. In one example, DMVR or/and BDOF may be disallowed when SBT mode is employed.

ii. In one example, DMVR or/and BDOF may be allowed only for the sub-partitions with non-zero residual in SBT mode.

iii. In one example, DMVR or/and BDOF may be disallowed for the sub-partition with non-zero residual in SBT mode.

3. It is proposed that whether and/or how to apply DMVR or/and BIO may depend on the relationship between the MV before refinement referring to a first reference list (e.g. denoted as MV0 in section 2.5) and the MV before refinement referring to a second reference list (e.g. denoted as MV1 in section 2.5).

a. In one example, if MV0 and MV1 are symmetric in a block, DMVR or/and BIO may be disabled.

i. For example, if the block has symmetric motion vectors (such as (MV0+MV1) has only zero components), BIO may be disabled. In one example, the block may be coded with AMVP mode. In an alternative example, the block may be coded with merge mode.

ii. Whether MV0 and MV1 are symmetric may depend on POCs.

1. For example, MV0 and MV1 are symmetric if $MV1*(POCcur-POC0)+MV0*(POC1-POCcur)$ is equal to zero motion vector. POCcur, POC0 and POC1 represent the POC of the current picture, the reference picture of MV0 and the reference picture of MV1, respectively.

b. In one example, if MV0 and MV1 are nearly symmetric in a block, DMVR or/and BIO may be disabled.

i. For example, MV0 and MV1 are nearly symmetric if $abs(MV0+MV1)<Th1$, where Th1 is an number such as 1 integer pixel.

ii. Whether MV0 and MV1 are symmetric may depend on POCs.

1. For example, MV0 and MV1 are nearly symmetric if $abs(MV1*(POCcur-POC0)+MV0*(POC1-POCcur))<Th2$, where Th2 is an number which may rely on POCs.

c. In one example, if MV0 and MV1 are far from symmetric in a block, DMVR or/and BIO may be disabled.

i. For example, MV0 and MV1 are far from symmetric if $abs(MV0+MV1)>Th1$, where Th1 is an number such as 16 integer pixels.

ii. Whether MV0 and MV1 are symmetric may depend on POCs.

1. For example, MV0 and MV1 are far from symmetric if $abs(MV1*(POCcur-POC0)+MV0*(POC1-POCcur))>Th2$, where Th2 is an number which may rely on POCs.

4. Multiple-step refinement may be applied, with smaller refined regions when increasing step size.

a. In one example, the k-th step is to refine one or multiple Mk*Nk units, and the j-th step is to refine one or multiple Mj*Nj units wherein k>j, Mk*Nk is unequal to Mj*Nj, and at least one of the two conditions is true: Mk<=Mj, Nk<=Mj.

5. Refined motion information within one block may be different from one K×L sub-region to another K×L sub-region.

a. In one example, a first K×L sub-region may use the decoded motion information, and a second K×L sub-region may use the refined motion information which is derived in the DMVR process applied to a unit covering the $2^{nd}$ sub-region.

6. Whether to apply BIG for a sub-region may depend on the output of DMVR process.

a. In one example, for a sub-region within a block/unit that DMVR applies to, if the motion information is unchanged after the DMVR process, BIO may be disabled for the sub-region.

7. It is proposed that N (N>1) pairs of MVDs (such as ($MV_{diff}-MV_{diff}$) in Section 2.5) may be selected in DMVR to generate the final prediction sample wherein one pair includes two motion vector differences with one for list 0 and one for list 1.

a. In one example, N=2, including the selected MVD pair in the DMVR process and the all zero MVD pair.

b. In one example, N=2. The 2 best pairs of MVDs (e.g., the 2 MVDs with minimum cost) in the DMVR process may be used.

c. In one example, each K×L sub-region within the block may decide its own MVD pairs.

d. In one example, with each pair of MVDs, two reference blocks can be identified. Cost (e.g., SAD/sum of squared error (SSE)) between each sample or sub-block (e.g., 2*2 block or 4*4 block etc.) within the two reference blocks may be calculated. Then, the final prediction sample may be generated as a combination of all reference block pairs according to the cost value. Denote predKLX (K=1, 2, . . . , N) as the reference sample in list X (X=0 or 1) identified by the Kth pair of MVDs and denote the costK as the cost of the Kth pair of MVDs. Both predKLX and costK may be the function of (x,y) (e.g., the position of the sample).

e. In one example, weighting of each sample may be inversely proportional to the cost.

i. In one example, $$Pred(x, y) = \frac{\sum_{k=1}^{N} (predKL0(x, y) + predKL1(x, y))/costK(x, y)}{2 * \sum_{k=1}^{N} 1/costK(x, y)}$$

ii. In one example, $$Pred(x, y) = \frac{\begin{array}{l}(pred1L0(x, y) + pred1L1(x, y)) * cost2(x, y) + \\ (pred2L0(x, y) + pred2L1(x, y)) * cost1(x, y)\end{array}}{2(cost1(x, y) + cost2(x, y))}$$

f. In one example, for each sample or sub-block, the MVD achieving the minimum cost is used for generating the final prediction.

8. It is proposed that when DMVR and MMVD are used together, DMVR may not be allowed to refine the MMVD distance to certain values.

a. In one example, the refined MMVD distance by DMVR shall not be included in the MMVD distance table.

i. Alternatively, furthermore, when the refined MMVD distance by DMVR is included in the MMVD distance table, DMVR is disallowed and the original MMVD (e.g., the signaled MMVD distance) distance is used.

b. In one example, after generating the best integer MVD in DMVR, it is added to the original MMVD distance to generate a rough refined MMVD distance. DMVR may be disallowed if the rough refined MMVD distance is included in the MMVD distance table.

c. In one example, DMVR may be allowed for all MMVD distances with above constraints.

i. For example, DMVR may be allowed for 2-pel MMVD distance.

9. It is proposed that BDOF may be disallowed for a sample or sub-block depending on the derived MVD, and/or the spatial gradients, and/or the temporal gradients etc.

a. In one example, BDOF may be disallowed for a sample if the derived part makes difference between the prediction sample in reference list 0 and the prediction sample in reference list 1 larger.

i. For example, if $I^{(0)}(x, y) - I^{(1)}(x, y) < 0$ and $v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y) > 0$ (as shown in Eq. (5) in section 2.3), BDOF may be disallowed for position (x,y).

ii. For example, if $I^{(0)}(x, y) - I^{(1)}(x, y) > 0$ and $v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y) < 0$, BDOF may be disallowed for position (x,y).

iii. For example, if $I^{(0)}(x, y) - I^{(1)}(x, y) > 0$ and $v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y) > 0$ (as shown in Eq. (5) in section 2.3), BDOF may be disallowed for position (x, y).

iv. For example, if $I^{(0)}(x, y) - I^{(1)}(x, y) < 0$ and $v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y) < 0$, BDOF may be disallowed for position (x, y).

v. Alternatively, the derived offset may be scaled by a factor denoted as fbdof (fbdof<1.0) if the derived part makes difference between the prediction sample in reference list 0 and the prediction sample in reference list 1 larger.

1. For example, $pred_{BIO} = \frac{1}{2} \cdot (I^{(0)} + I^{(1)} + fbdof \times (v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)))$.

b. In one example, BDOF may be disallowed for a sample or K*L (e.g., 2*2, 1*1) sub-block if the derived part makes difference between the prediction sub-block in reference list 0 and the prediction sub-block in reference list 1 larger.

i. For example, BDOF may be disallowed when $\Delta_1 > \Delta_2$ wherein $$\Delta_1 = \sum_\Omega \left| I^{(0)} - I^{(1)}{}_0 + v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y) \right|$$

$$\Delta_2 = \sum_\Omega \left| I^{(0)} - I^{(1)}{}_0 \right|$$

and $\Omega$ represents samples belong to the sub-block.

ii. In one example, BDOF may be disallowed when $\Delta_1 \geq \Delta_2$.

iii. In one example, the difference may be measured by SSE (sum of squared error) or mean-removed SSE or SATD (Sum of Absolute Transformed Difference). For example, $$\Delta_1 = \sum_\Omega \left( I^{(0)} - I^{(1)}{}_0 + v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y) \right)^2$$

$$\Delta_2 = \sum_\Omega \left( I^{(0)} - I^{(1)}{}_0 \right)^2$$

iv. In one example, the difference may be calculated on certain samples of the sub-block.

1. For example, the difference may be calculated on even or odd rows of the sub-block.

v. Alternatively, the derived offset or/and $v_x$ or/and $v_y$ may be scaled by a factor denoted as fbdof (fbdof<1.0) if the derived part makes difference between the prediction sub-block in reference list 0 and the prediction sub-block in reference list 1 larger.

c. In one example, the derived offset (e.g., $v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y)$) or/and $v_x$ or/and $v_y$ may be scaled by a factor denoted as fbdof (fbdof>=1.0) if the derived part makes difference between the prediction sub-block (or sample) in reference list 0 and the prediction sub-block (or sample) in reference list 1 smaller.

10. It is proposed that when the derived MVD (e.g., $v_x$ and $v_y$) in BDOF is changed after the clipping operation, the cost, e.g., $$\sum_{[i', j'] \in \Omega} \Delta^2[i', j'],$$

wherein $\Delta$ is defined in Eq. (5) and $\Omega$ represents samples belong to the sub-block, may be calculated for the clipped MVD. Denote cost of the originally derived MVD as costDerivedMvd, cost of the clipped MVD as costClipMvd and cost of all zero MVD as costZeroMvd.

a. In one example, if costClipMvd>Th*costZeroMvd, BDOF may be disallowed.

b. In one example, if costClipMvd>Th*costDerivedMvd, BDOF may be disallowed.

c. In one example, if costClipMvd>Th*costZeroMvd or costClipMvd>Th*costDerivedMvd, the derived offset (e.g., $v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y)$) may be scaled by a factor smaller than 1.0.

d. Alternatively, if both $v_x$ and $v_y$ are changed after the clipping operation, BDOF may be disallowed.

e. Alternatively, if either $v_x$ or $v_y$ is changed after the clipping operation, BDOF may be disallowed.

f. Alternatively, if the absolute difference between $v_x$ and the clipped $v_x$ is larger than a threshold T, BDOF may be disallowed.

g. Alternatively, if the absolute difference between $v_y$ and the clipped $v_y$ is larger than a threshold T, BDOF may be disallowed.

h. Alternatively, if the absolute difference between $v_x$ and the clipped $v_x$ is larger than a threshold T1 and the absolute difference between $v_y$ and the clipped $v_y$ is larger than a threshold T2, BDOF may be disallowed.

i. In one example, T/T1/T2 may be 1 or 2 or 3 or 4 integer pixels.

j. In one example, when vx is not equal to clipVx, the cost may be calculated for some specific MVDs, e.g., (0, 0), (clipVx/2, 0), (clipVx*2, 0). The MVD achieving the minimum cost may be selected as the final MVD.

k. In one example, when vy is not equal to clipVy, the cost may be calculated for some specific MVDs, e.g., (clipVx, 0), (clipVx, clipVy/2), (clipVx, clipVy*2). The MVD achieving the minimum cost may be selected as the final MVD.

l. In one example, when vx is not equal to clipVx and vy is not equal to clipVy, the cost may be calculated for some specific MVDs, e.g., (0, 0), (clipVx/2, 0), (clipVx*2, 0), (0, clipVy), (clipVx/2, clipVy), (clipVx*2, clipVy), (0, 2*clipVy), (clipVx/2, 2*clipVy), (clipVx*2, 2*clipVy). The MVD achieving the minimum cost may be selected as the final MVD.

m. In one example, when vx is not equal to clipVx and vy is not equal to clipVy. Horizontal MVD and vertical MVD may be determined sequentially.

i. For example, horizontal MVD may be determined first assuming vertical MVD is equal to certain value (e.g. 0). Then vertical MVD may be determined based on the determined horizontal MVD.

1. In one example, the cost may be first calculated for some specific horizontal MVD assuming the vertical MVD is equal to zero, e.g., MVDs (0, 0), (clipVx/2, 0), (clipVx*2, 0), the horizontal MVD achieving the minimum cost may be selected as the final horizontal MVD, denoted as finalVx. Then, the cost may be calculated for some specific vertical MVDs, e.g., MVDs (finalVx, 0), (finalVx, clipVy/2), (finalVx, clipVy*2). the vertical MVD achieving the minimum cost may be selected as the final vertical MVD.

ii. For example, vertical MVD may be determined first assuming horizontal MVD is equal to certain value (e.g. 0). Then horizontal MVD may be determined based on the determined vertical MVD.

1. In one example, the cost may be first calculated for some specific vertical MVD assuming the horizontal MVD is equal to zero, e.g., MVDs (0, 0), (0, clipVy/2), (0, clipVy*2), the vertical MVD achieving the minimum cost may be selected as the final vertical MVD, denoted as finalVy. Then, the cost may be calculated for some specific horizontal MVD, e.g., MVDs (0, finalVy), (clipVx/2, finalVy), (clipVx*2, finalVy). the horizontal MVD achieving the minimum cost may be selected as the final horizontal MVD.

n. In one example, different MVDs may have some common parts in the cost function, which may not be recalculated in the comparison.

i. Alternatively, the common part is removed from the cost function for all MVDs.

11. Derived motion vector differences (i.e., MVD) in BDOF and other decoder refinement tools (e.g., PROF) may be further refined based on a or multiple sets of candidate MVDs which is dependent on the derived MVDs. And a block may be reconstructed based on the signaled motion vectors and the refined MVDs. Denote the derived MVD by $(v_x, v_y)$, and the refined MVD by (refinedVx, refinedVy).

a. In one example, two-step refinements may be applied wherein a first set of candidate MVDs used in the first step are based on the unmodified $v_y$ and modified $v_x$; and a second set of candidate MVDs are based on the unmodified $v_x$ and modified vy or vice versa.

b. In one example, a set of candidate MVDs is defined to include $(v_x+\text{offsetX}, v_y)$ wherein offsetX being in the range [−ThX1, ThX2] wherein ThX1 and ThX2 are non-negative integer values. In one example, ThX1=ThX2=ThX wherein ThX is a non-negative integer. In another example, ThX1=ThX2+1=ThX wherein ThX is a non-negative integer.

i. In one example, ThX=2. In one example, MVDs including $(v_x-2, v_y)$, $(v_x-1, v_y)$, $(vx, v_y)$, $(v_x+1, v_y)$ and $(v_x+2, v_y)$ may be checked after deriving $v_x$.

ii. Alternatively, ThX=1. In one example, MVDs including $(v_x-1, v_y)$, $(v_x, v_y)$ and $(v_x+1, v_y)$ may be checked after deriving $v_x$.

iii. In one example, only partial of values (e.g., offsetX) in the range [−ThX, ThX] may be allowed.

iv. Alternatively, $v_y$ is set equal to be 0.

v. Alternatively, $v_x$ is set equal to refinedV$_y$.

c. In one example, a set of candidate MVDs is defined to include $(v_x, v_y+\text{offsetY})$ wherein offsetY being in the [−ThY1, ThY2] wherein ThY1 and ThY2 are non-negative integer values. In another example, ThY1=ThY2+1=ThY wherein ThY is a non-negative integer.

i. In one example, ThY=2. In one example, MVDs including $(v_x, v_y-2)$, $(v_x, v_y-1)$, $(vx, v_y)$, $(vx, v_y+1)$ and $(vx, v_y+2)$ may be checked after deriving vy.

ii. Alternatively, ThY=1. In one example, MVDs including $(v_x, v_y-1)$, $(v_x, v_y)$ and $(v_x, v_y+1)$ may be checked after deriving $v_y$.

iii. In one example, only partial of values (e.g., offsetY) in the range [−ThY, ThY] may be allowed.

iv. Alternatively, $v_x$ is set equal to refinedV$_x$.

v. Alternatively, $v_x$ is set equal to 0.

d. In one example, vx and vy may be refined in order.

i. For example, $v_x$ is refined first, e.g., according to bullet 10. b.

1. Alternatively, furthermore, $v_y$ is assumed to be equal to 0.

ii. For example, vy is refined first, e.g., according to bullet 10. c.

1. Alternatively, furthermore, vx is assumed to be equal to 0.

e. In one example, $v_x$ and $v_y$ may be refined jointly. For example, a set of candidate MVDs is defined to be include $(v_x+\text{offsetX}, v_y+\text{offsetY})$, wherein offsetX being in the range [−ThX1, ThX2] and offsetY being in the range [−ThY1, ThY2].

i. For example, ThX1=ThX2=2 and ThY1=ThY2=2.

ii. For example, ThX1=ThX2=1 and ThY1=ThY2=1.

iii. In one example, only partial values of $(v_x+\text{offsetX}, v_y+\text{offsetY})$ may be included in the candidate MVD set.

f. In one example, the number of candidate MVDs derived from $v_x$ and $v_y$ may be the same, e.g., ThX1=ThY1 and ThX2=ThY2.

i. Alternatively, the number of candidate MVDs derived from $v_x$ and $v_y$ may be different, e.g., ThX1 !=ThY1 or ThX2 !=ThY2.

g. Alternatively, furthermore, the MVD that achieves the minimum cost (e.g., the cost defined in bullet 9) may be selected as the refined MVD.

12. It is proposed that MVDs used in BDOF and other decoder refinement methods (e.g., PROF) may be restricted to be within a given candidate set.

a. Suppose the maximum and minimum value of horizontal MVD are denoted by $\text{MVD}_{maxX}$ and $\text{MVD}_{minX}$, respectively; the maximum and minimum value of vertical MVD are denoted by $\text{MVD}_{maxY}$ and $\text{MVD}_{minY}$, respectively. The number of allowed horizontal MVDs candidates in the given candidate set shall be smaller than $(1+\text{MVD}_{maxX}-\text{MVD}_{minX})$ and/or the number of allowed vertical MVDs candidates in the given candidate set shall be smaller than $(1+MVD_{maxY}-MVD_{minY})$.

b. In one example, the given candidate set may only have candidates with $v_x$ and/or $v_y$ are in the form of $K^m$, wherein m is an integer. E.g., K=2.

i. Alternatively, furthermore, the given candidate set may also include the candidate that $v_x$ and/or $v_y$ are equal to 0.

ii. Alternatively, the given candidate set for $\Delta v_x(x,y)$ or/and $\Delta v_y(x,y)$ may only have candidates with $\Delta v_x(x,y)$ or/and $\Delta v_y(x,y)$ be zero or in the form of $K^m$, wherein m is an integer. E.g., K=2.

c. In one example, the given candidate set may only have candidates with $v_x$ and/or $v_y$ or/and $\Delta v_x(x,y)$ or/and $\Delta v_y(x,y)$ whose absolute values are zero or in the form of $K^m$, wherein m is an integer. E.g., K=2.

d. In one example, the given candidate set may only have candidates with $v_x$ and/or $v_y$ or/and $\Delta v_x(x,y)$ or/and $\Delta v_y(x,y)$ are zero or in the form of $K^m$ or $-K^m$ wherein m is an integer. E.g., K=2.

e. In one example, the MVD may be firstly derived using prior art (e.g., $v_x$ and $v_y$ derived in 8.5.7.4 Eq. 8-867 and 8-868 in BDOF) and then may be modified to be one of allowed candidate in the given candidate set.

i. In one example, X is set equal to $abs(v_x)$ or $abs(v_y)$, X' is derived from X and $v_x$ or $v_y$ is modified to $sign(v_x)*X'$ or $sign(v_y)*X'$.

1. For example, X' may be set equal to $K^{\lceil \log_K(X) \rceil}$.

2. For example, X' may be set equal to $K^{\lfloor \log_K(X) \rfloor}$.

3. For example, X' may be set equal to 0 if X is smaller than a threshold T.

4. For example, X' may be set equal to $K^{\lceil \log_K(X) \rceil}$ if $\lceil \log_K(X) \rceil - X <= X - \lfloor \log_K(X) \rfloor$.

a. Alternatively, furthermore, X' may be set equal to $K^{\lfloor \log_K(X) \rfloor}$, otherwise.

5. For example, X' may be set equal to $K^{ceil(log\ K(X))}$ if $K^{ceil(log\ K(X))} - X <= X - K^{floor(log\ K(X))}$.

a. Alternatively, furthermore, if $K^{ceil(log\ K(X))} - X > X - K^{floor(log\ K(X))}$, X' may be set equal to $K^{floor(log\ K(X))}$.

6. For example, X' may be set equal to $K^{ceil(log\ K(X))}$ if $K^{ceil(log\ K(X))} - X < X - K^{floor(log\ K(X))}$.

a. Alternatively, furthermore, if $K^{ceil(log\ K(X))} - X >= X - K^{floor(log\ K(X))}$, X' may be set equal to $K^{floor(log\ K(X))}$.

7. In one example, K is set to 2.

8. In one example, X' may be set equal to $K^{ceil(log\ K(X+offset))}$, where offset is an integer. For example, offset may be equal to X−1 or X>>1.

a. In one example, offset may depend on X. For example, offset may be equal to $K^{ceil(log\ K(X))}$/2+P, where P is an integer such as 0, 1, −1.

9. In one example, X' may be set equal to $K^{floor(log\ K(X+offset))}$, where offset is an integer. For example, offset may be equal to X−1 or X>>1.

a. In one example, offset may depend on X. For example, offset may be equal to $K^{floor(log\ K(X))}$/2+P, where P is an integer such as 0, 1, −1.

10. In one example, conversion from X to X' may be implemented by a predefined look-up table.

a. In one example, the look-up table may be derived from above methods.

b. In one example, the look-up table may not be derived from above methods.

c. In one example, when converting from X to X', X may be used as the index for accessing the look-up table.

d. In one example, when converting from X to X', the first N (e.g., N=3) most significant bits of X may be used as the index for accessing the look-up table.

e. In one example, when converting from X to X', the first N (e.g., N=3) least significant bits of X may be used as the index for accessing the look-up table.

f. In one example, when converting from X to X', certain N (e.g., N=3) consecutive bits of X may be used as the index for accessing the look-up table.

11. The above method may be also applicable to $\Delta v_x(x,y)$ by replacing $v_x$ with $\Delta v_x(x,y)$.

12. The above method may be also applicable to $\Delta v_y(x,y)$ by replacing $v_y$ with $\Delta v_y(x,y)$.

ii. In one example, a set of candidate values that are power of K may be selected dependent on vx or vy for calculating the cost (e.g., the cost defined in bullet 9). The value achieving the minimum cost is selected as the final $v_x$ or $v_y$. Denote lgKZ=floor(log K(abs($v_Z$))), where Z=x or y.

1. For example, the set of values may be $sign(v_Z)*\{K^{lgKZ}, K^{(lgKZ+1)}\}$.

2. For example, the set of values may be $sign(v_Z)*\{K^{lgKZ}, K^{(lgKZ+1)}, 0\}$.

3. For example, the set of values may be $sign(v_Z)*\{K^{lgKZ}, 0\}$.

4. For example, the set of values may be $sign(v_Z)*\{K^{(lgKZ-1)}, K^{lgKZ}, K^{(lgKZ+1)}\}$.

5. For example, the set of values may be $sign(v_Z)*\{K^{(lgKZ-1)}, K^{lgKZ}, K^{(lgKZ+1)}, 0\}$.

6. For example, the set of values may be $sign(v_Z)*\{K^{(lgKZ-2)}, K^{(lgKZ-1)}, K^{lgKZ}, K^{(lgKZ+1)}, K^{(lgKZ+2)}, 0\}$.

7. For example, the set of values may be $sign(v_Z)*\{K^{(lgKZ-2)}, K^{(lgKZ-1)}, K^{lgKZ}, K^{(lgKZ+1)}, K^{(lgKZ+2)}\}$.

iii. In one example, vx and vy may be modified in order.

1. In one example, $v_x$ may be first modified assuming $v_y$ is equal to zero.

a. Alternatively, furthermore, $v_y$ is derived based on the modified $v_x$.

2. In one example, $v_y$ may be first modified assuming $v_x$ is equal to zero.

a. Alternatively, furthermore, $v_x$ is derived based on the modified $v_y$.

f. Alternatively, only allowed candidates in the given candidate set may be checked to derive the MVD.

i. In one example, in BDOF, instead of deriving MVD (e.g., $v_x$ and $v_y$ derived in 8.5.7.4 Eq. 8-867 and 8-868) explicitly from Eq. 7 and 8, $v_x$ and $v_y$ may be selected from a set of candidate MVD values directly.

ii. In one example, $v_x$ and $v_y$ may be determined in order.

1. In one example, $v_x$ may be first determined assuming $v_y$ is equal to zero.

a. Alternatively, furthermore, $v_y$ is derived based on the determined vx.

2. In one example, $v_y$ may be first determined assuming $v_x$ is equal to zero.

a. Alternatively, furthermore, $v_x$ is derived based on the determined $v_y$.

iii. In one example, $v_x$ and $v_y$ are determined jointly.

iv. In one example, the candidate MVD value set may only include values in the form of K^N or –K^N or zero, N is an integer, K>0, e.g., K=2.

1. In one example, the candidate MVD value set may include values in the form of M/(K^N), M is an integer, and N>=0, K>0, e.g., K=2.

2. In one example, the candidate value set may include values in the form of M/(K^N), M and N are integers, K>0, e.g., K=2.

3. In one example, the candidate value set may include values zero or values in the form of (K^M)/(K^N), M and N are integers, K>0, e.g., K=2.

g. Alternatively, only allowed MVD values may be derived for $v_x$ and $v_y$.

i. In one example, $v_x$ is derived as follows, wherein function F1( ) and F2( ) may be floor( ) or ceil( ).

$$v_x = sGx2 > 0 ? \text{Clip3}(-mvRefineThres, mvRefineThres, \text{sign}(-sGxdI) * esp(F1(\text{Log } 2(\text{abs}(sGxdI) << 3)), F2(\text{Log } 2(sGx2)))) : 0 \quad (8\text{-}867)$$

ii. In one example, $v_x$ is derived as sign(–sGxdI)*esp2 (M) wherein M is the integer that achieves the minimum cost(sGxdI<<3, sGx2) and function cost( ) is defined as follows.

$$\text{cost}(x,y) = \text{Abs}(\text{abs}(x) * 2^M - y)$$

1. Alternatively, cost(x, y, M)=Abs(abs(x)*$2^M$–abs (y)).

2. Alternatively, cost(x, y, M)=Abs(abs(x)*$2^M$–y).

iii. In one example, $v_y$ is derived as follows, wherein function F1( ) and F2( ) may be floor( ) or ceil( ).

$$tmp = (sGydI << 3) - ((v_x * sGxGy_m) << 12 + v_x * sGxGy_s) >> 1$$

$$v_y = sGy2 > 0 ? \text{Clip3}(-mvRefineThres, mvRefineThres, \text{sign}(tmp) * esp(F1(\text{Log } 2(\text{abs}(tmp))), F2(\text{Log } 2(sGx2)))) : 0 \quad (8\text{-}868)$$

iv. In one example, $v_y$ is derived as sign(tmp)*esp2(M) wherein M is the integer that achieves the minimum cost(tmp, sGy2) and tmp is defined as follows and function cost( ) is defined above.

$$tmp = (sGydI << 3) - ((v_x * sGxGy_m) << 12 + v_x * sGxGy_s) >> 1$$

v. Suppose the numerator and denominator used for deriving $v_x$ are numX and denoX respectively (e.g., $v_x$ is expected to be approximately numX/denoX). $v_x$ may be derived as follows:

1. In one example, vx may be derived as sign (numX*denoX)*esp2(M) wherein M is the integer that achieves the minimum value of cost(numX, denoX, M).

2. In one example, $v_x$ may be set equal to zero or sign(numX*denoX)*$K^{F1(\log\ K(\text{abs}(numX)+ \text{offset}1)) - F2(\log\ K(\text{abs}(denoX) + \text{offset}2))}$, where offset1 and offset2 are integers.

a. For example, $v_x$ may be set equal to zero if abs(numX)<abs(denoX)*T1+T2. For example, T1=½, T2=0.

b. For example, $v_x$ may be set equal to zero if abs(numX)<=abs(denoX)*T1+T2. For example, T1=½, T2=0.

c. For example, $v_x$ may be set equal to zero if abs(numX)<(abs(denoX)>>T1)+T2. For example, T1=1, T2=0.

d. For example, $v_x$ may be set equal to zero if abs(numX)<=(abs(denoX)>>T1)+T2. For example, T1=1, T2=0.

e. For example, vx may be set equal to zero if denoX is equal to zero.

f. For example, vx may be set equal to zero if numX is equal to zero.

g. For example, vx may be set equal to zero if numX is equal to zero or denoX is equal to zero.

h. For example, vx may be set equal to zero if denoX is less than T1.

i. For example, vx may be set equal to zero if numX is less than T1.

j. For example, vx may be set equal to zero if numX is less than T1 or denoX is less than T2.

k. For example, offset1 may be set equal to numX–1 or numX>>1 or 0.

l. For example, offset2 may be set equal to denoX–1 or denoX>>1 or 0.

m. For example, offset1 may depend on numX. For example, offset1 may be equal to $K^{ceil(\log\ K(numX))}/2+P$, where P is an integer such as 0, 1, –1.

n. For example, offset1 may depend on numX. For example, offset1 may be equal to Kceil(log K(abs(numX)))/2+P, where P is an integer such as 0, 1, –1.

o. For example, offset1 may be equal to $K^{floor(\log\ K(numX))}/2+P$, where P is an integer such as 0, 1, –1.

p. For example, offset1 may be equal to Kfloor(log K(abs(numX)))/2+P, where P is an integer such as 0, 1, –1.

q. For example, offset2 may depend on denoX. For example, offset2 may be equal to $K^{ceil(\log\ K(denoX))}/2+P$, where P is an integer such as 0, 1, –1.

r. For example, offset2 may depend on denoX. For example, offset2 may be equal to Kceil(log K(abs(denoX)))/2+P, where P is an integer such as 0, 1, –1.

s. For example, offset2 may be equal to $K^{floor(\log\ K(denoX))}/2+P$, where P is an integer such as 0, 1, –1.

t. t) For example, offset2 may be equal to Kfloor (log K(abs(denoX)))/2+P, where P is an integer such as 0, 1, –1.

u. For example, F1( ) and F2( ) may be function floor( ) or ceil( ).

3. In one example, delta=floor(log 2(abs(numX)))–floor(log 2(abs(denoX))), vx may be derived as follows.

a. For example, vx=abs(numX)<(T1*abs(denoX)+T2)?T3: sign(numX*denoX)*(1<<delta).

i. In one example, T1=1, T2=0, T3=0.

ii. In one example, T 1=½, T2=0, T3=0.

iii. In one example, T3=numX.

b. For example, vx=abs(numX)<=(T1*abs(denoX)+T2)?T3: sign(numX*denoX)*(1<<delta).

i. In one example, T1=1, T2=0, T3=0.

ii. In one example, T 1=½, T2=0, T3=0.

iii. In one example, T3=numX.

c. For example, vx=((denoX==0)||(abs(numX)<(T1*abs(denoX)+T2)))?T3: sign (numX*denoX)*(1<<delta).

d. For example, vx=((denoX==0)||(abs(numX)<= (T1*abs(denoX)+T2)))?T3: sign (numX*denoX)*(1<<delta).

e. For example, vx=((numX==0)||(abs(numX)< (T1*abs(denoX)+T2)))?T3: sign (numX*denoX)*(1<<delta).

f. For example, vx=((numX==0)||(abs(numX)<= (T1*abs(denoX)+T2)))?T3: sign (numX*denoX)*(1<<delta).

g. For example, vx=((numX==0)||(denoX==0)|| (abs(numX)<(T1*abs(denoX)+T2)))?T3: sign (numX*denoX)*(1<<delta).

h. For example, vx=((numX==0)||(denoX=0)||(abs (numX)<=(T1*abs(denoX)+T2)))?T3: sign (numX*denoX)*(1<<delta).

i. For example, vx=(delta<T1)?T3: sign (numX*denoX)*(1<<delta).
  i. In one example, T 1=0, T3=0.

j. For example, vx=(delta<=T1)?T3: sign (numX*denoX)*(1<<delta).
  i. In one example, T 1=0, T3=0.

k. For example, vx=((delta<T1)||(denoX==0))?T3 sign(numX*denoX)*(1<<delta).

l. For example, vx=((delta<=T1)||(denoX==0))? T3 sign(numX*denoX)*(1<<delta).

m. For example, vx=((delta<T1)||(numX==0))?T3 sign(numX*denoX)*(1<<delta).

n. For example, vx=((delta<=T1)||(numX==0))? T3 sign(numX*denoX)*(1<<delta).

o. For example, vx=((delta<=T1)||(numX==0)|| (denoX==0))?T3: sign(numX*denoX)* (1<<delta).

p. For example, vx=((delta<T1)||(numX==0)||(de-noX==0))?T3: sign(numX*denoX)* (1<<delta).

q. In one example, delta may be further modified as follows.
  i. For example, if floor(log 2(abs(numX))) is greater than 0, and abs(numX) & (1<<(floor(log 2(abs(numX)))−1)) is not equal to zero, delta may be increased by 1.
  ii. For example, if floor(log 2(abs(denoX))) is greater than 0, and abs(denoX) & (1<<(floor (log 2(abs(denoX)))−1)) is not equal to zero, delta may be decreased by 1.

r. Alternatively, furthermore, when delta is less than 0, vx is set to 0.

4. Such method is applicable to $v_y$ (e.g., replacing $v_x$ with $v_y$ in the above methods) by replacing numX and denoX with numY and denoY respectively, wherein numY and denoY are the numerator and denominator used for deriving $v_y$.

5. In the above examples, $v_x$ may refer to "$v_x$" used to derive bdofOffset in BDOF, or "$\Delta v_x(x,y)$" used to derive ΔI in PROF (e.g in PROF-eq2).
  a. For example, numX and/or denoX may be set depending on whether $v_x$ refers to "$v_x$" used to derive bdofOffset in BDOF, or "$\Delta v_x(x,y)$" used to derive ΔI in PROF.
  b. For example, if "$\Delta v_x(x,y)$" used to derive ΔI in PROF, numX may be set equal to $\Delta v_x(x,y)$ derived from the affine parameters in PROF (e.g. in PROF-eq1).
  c. For example, if "$\Delta v_x(x,y)$" used to derive ΔI in PROF, denoX may be set equal to a fixed number such as 1.

6. In the above examples, $v_y$ may refer to "$v_y$" used to derive bdofOffset in BDOF, or "$\Delta v_y(x,y)$" used to derive ΔI in PROF (e.g in PROF-eq2).
  a. For example, numY and/or denoY may be set depending on whether $v_y$ refers to "$v_y$" used to derive bdofOffset in BDOF, or "$\Delta v_y(x,y)$" used to derive ΔI in PROF.
  b. For example, if "$\Delta v_y(x,y)$" used to derive ΔI in PROF, numY may be set equal to $\Delta v_y(x,y)$ derived from the affine parameters in PROF (e.g. in PROF-eq1).
  c. For example, if "$\Delta v_y(x,y)$" used to derive ΔI in PROF, denoY may be set equal to a fixed number such as 1.

h. In one example, horizontal and/vertical component of MVD used in different tools (e.g., BDOF and PROF) may be firstly derived using prior art, and further modified to be belonging the given candidate set associated with the tool. The modification process may be unified.
  i. Alternatively, the derivation process of MVDs used in different tools may be directly unified.
  ii. In one example, horizontal and/vertical component of MVD used in BDOF and PROF may be firstly derived using prior art, and further modified to be belonging the given candidate set associated with the tool.
    1. Alternatively, furthermore, different inputs may be used to invoke the unified modification process.
    2. For example, these values may be derived as described in bullet 12.g.v. The input is a numerator and a denominator, and the output is the derived MVD value that is either zero or a value in the form of Km or −Km (K and m are integers, e.g., K=2).
    3. In one example, when deriving the motion vector difference in PROF, the numerators are the original $\Delta v_x(x,y)$ or $\Delta v_y(x,y)$ (e.g., values that are derived in section 2.6) before being modified respectively, and the denominator is 1.
    4. In one example, when modifying the motion vector difference in BDOF, the numerators are the original vx or vy (e.g., values that are derived in 8.5.7.4 Eq. 8-867 and 8-868 in BDOF) before being modified respectively, and the denominator is 1.
    5. In one example, the original $\Delta v_x(x,y)$ or $\Delta v_y(x,y)$ may be left shifted by a number N before being used as numerators, and the denominator is 1<<N. In this case, the output MVD shall be right shifted by N before being used.
    6. In one example, the original vx or vy (e.g., values that are derived in 8.5.7.4 Eq. 8-867 and 8-868 in BDOF) may be left shifted by a number N before being used as numerators, and the denominator is 1<<N. In this case, the output MVD shall be right shifted by N before being used.

i. In one example, when determining $v_x$ or $v_y$ in bullet 11.b or/and 11.c, a cost is calculated for each candidate value, and the value achieving the minimum cost is selected as the $v_x$ or $v_y$.
  i. For example, the cost $$\sum_{[i',j']\in\Omega} \Delta^2[i',j'],$$

wherein $\Delta$ is defined in Eq. (5) and $\Omega$ represents samples belong to the sub-block, may be used.

j. The given candidate set may be pre-defined.

i. In one example, $v_x$ and/or $v_y$ could be only from $-2^x/2^X$ wherein x is in the range $[-(X-1), (X-1)]$.

1. Alternatively, furthermore, the given candidate set may also include the candidate that $v_x$ and/or $v_y$ are equal to 0.

2. Alternatively, furthermore, the given candidate set may also include the values in the form of $2^x/2^X$.

ii. In one example, the horizontal and/or vertical component of a candidate in the given MVD candidate set (e.g., values of $v_x$ and/or $v_y$ used in BDOF, $\Delta v_x(x,y)$ or $\Delta v_y(x,y)$ in PROF) could be only in the form of $$S \times \frac{2^m}{2^N},$$

where S is 1 or −1.

1. In one example, N=6. In other examples, N may be 0, 2, or 4.

2. In one example, m is within the range [a, b], such as a=0 and b=N; or a=0 and b=N−1.

3. Alternatively, furthermore, the given MVD candidate set may also include 0 in addition to $$S \times \frac{2^m}{2^N}.$$

4. Alternatively, furthermore, the given candidate set may include the values in the form of $$(-S) \times \frac{2^n}{2^Q}$$

in addition to $$S \times \frac{2^m}{2^N}$$

and/or 0.

a. In one example, Q=6.

b. In one example, n is within the range [a, b], such as a=0 and b=Q; or a=0 and b=Q−1.

5. In one example, the horizontal and/or vertical component of a candidate in the given MVD candidate set (e.g., values of $v_x$ and/or $v_y$ used in BDOF, $\Delta v_x(x,y)$ or $\Delta v_y(x,y)$ in PROF) could be only from $$\left\{ -\frac{32}{64}, -\frac{16}{64}, -\frac{8}{64}, -\frac{4}{64}, -\frac{2}{64}, -\frac{1}{64}, 0, \frac{1}{64}, \frac{2}{64}, \frac{4}{64}, \frac{8}{64}, \frac{16}{64}, \frac{32}{64} \right\}.$$

iii. In one example, $v_x$ and $v_y$ could be only from {−32, −16, −8, −4, −2, −1, 0, 1, 2, 4, 8, 16, 32}/64.

iv. In one example, $v_x$ or/and $v_y$ or/and $\Delta v_x(x,y)$ or/and $\Delta v_y(x,y)$ could only be from {−32, −16, −8, −4, −2, −1, 0, 1, 2, 4, 8, 16, 32}.

v. In one example, $v_x$ or/and $v_y$ or/and $\Delta v_x(x,y)$ or/and $\Delta v_y(x,y)$ could only be from {−32, −16, −8, −4, −2, −1, 0, 1, 2, 4, 8, 16, 32}/32.

vi. In one example, $\Delta v_x(x,y)$ or/and $\Delta v_y(x,y)$ could only be from {−64, −32, −16, −8, −4, −2, −1, 0, 1, 2, 4, 8, 16, 32, 64}.

vii. In one example, $v_x$ or/and $v_y$ or/and $\Delta v_x(x,y)$ or/and $\Delta v_y(x,y)$ could only be from {−64, −32, −16, −8, −4, −2, −1, 0, 1, 2, 4, 8, 16, 32, 64}/64.

viii. In one example, $v_x$ or/and $v_y$ or/and $\Delta v_x(x,y)$ or/and $\Delta v_y(x,y)$ could only be from {−128, −64, −32, −16, −8, −4, −2, −1, 0, 1, 2, 4, 8, 16, 32, 64, 128}/128.

ix. In one example, $v_x$ or/and $v_y$ or/and $\Delta v_x(x,y)$ or/and $\Delta v_y(x,y)$ could only be from {−128, −64, −32, −16, −8, −4, −2, −1, 0, 1, 2, 4, 8, 16, 32, 64, 128}.

k. The given candidate set may be dependent on the coded information (e.g., block dimension, mode).

i. It may be dependent on the block is coded with BDOF or PROF enabled.

l. The given candidate set may be signaled in sequence/picture/slice/brick/other video unit-level.

m. In one example, the refinement process on a sample in BDOF or PROF exclude multiplications operations.

i. For example, S' is derived as S'=S+((Gx+OffsetX)<<Bx)+((Gy+OffsetY)<<By)+OffsetS, where S and S' are the sample values before and after the refinement. OffsetX, OffsetY and OffsetS are integers such as 0.

1. In one example, S' may be clipped.

2. In one example, S' may be right shifted.

13. $v_x$ or/and $v_y$ in BDOF or/and $\Delta v_x(x,y)$ or/and $\Delta v_y(x,y)$ in PROF may be first clipped to a predefined range (different ranges may be used for $v_x$ or/and $v_y$ or/and $\Delta v_x(x,y)$ or/and $\Delta v_y(x,y)$), and then converted to zero or a value in a form of $K^m$ or $-K^m$ by proposed method.

a. Alternatively, $v_x$ or/and $v_y$ in BDOF or/and $\Delta v_x(x,y)$ or/and $\Delta v_y(x,y)$ in PROF may be first converted to zero or a value in a form of $K^m$ or $-K^m$ by proposed method, then clipped to a predefined range (different ranges may be used for $v_x$ or/and $v_y$ or/and $\Delta v_x(x,y)$ or/and $\Delta v_y(x, y)$).

i. Alternatively, furthermore, the range shall be in a form of $[-K^{m1}, K^n]$ or $[K^{m2}, K^n]$.

b. In one example, the numerator or/and the denominator in above method may be clipped to a predefined range before being used.

14. Clipping parameters (e.g., thBIO in Eq. 7 and 8) in BDOF may be different for different sequence/picture/slice/tile group/tile/CTU/CU.

a. In one example, different thBIO may be used when clipping horizontal MVD and vertical MVD.

b. In one example, thBIO may depend on the picture dimensions. E.g., a larger thBIO may be used for picture with larger dimensions.

c. In one example, thBIO may depend on the decoded motion information of the block.

i. For example, a larger thBIO may be used for a block with a larger absolute MV, e.g., "absolute MV" of MV[0] or "absolute MV" of MV[1] or sumAbsHorMv or sumAbsVerMv or sumAbsHorMv+sumAbsVerMv.

ii. For example, a larger thBIO may be used for clipping horizontal MVD for block with a larger absolute horizontal MV, e.g., "absolute horizontal MV" of MV[0] or "absolute horizontal MV" of MV[1] or sumAbsHorMv or maxHorVerMv.

iii. For example, a larger thBIO may be used for clipping vertical MVD for block with a larger absolute vertical MV, e.g., "absolute vertical MV" of MV[0] or "absolute vertical MV" of MV[1] or sumAbsVerMv or maxAbsVerMv.

d. Clipping parameters may be decided at encoder and signaled to the decoder in sequence parameter set (SPS), or/and video parameter set (VPS), or/and adaptation parameter set (APS), or/and picture parameter set (PPS), or/and slice header, or/and tile group header.

15. Clipping parameters in BDOF may be dependent on whether coding tool X is enabled or not.

a. In one example, X is DMVR.

b. In one example, X is affine inter mode.

c. In one example, larger clipping parameters, e.g., the threshold thBIO in Eq. 7 an 8, may be employed when X is disabled for the sequence/video/picture/slice/tile group/tile/brick/coding unit/CTB/CU/block.

i. Alternatively, furthermore, smaller clipping parameters may be employed when X is enabled for the sequence/video/picture/slice/tile group/tile/brick/coding unit/CTB/CU/block.

16. The MVD (such as (dMvH, dMvV) in section 2.6 for PROF or/and ($v_x$, $v_y$) in section 2.3 for BDOF) derived in BDOF and PROF may be clipped to a same range [−N, M] wherein N and M are integers.

d. In one example, N=M=31.

e. In one example, N=M=63.

f. In one example, N=M=15.

g. In one example, N=M=7.

h. In one example, N=M=3.

i. In one example, N=M=127.

j. In one example, N=M=255.

k. In one example, M=N, and 2*M is not equal to a value of $2^K$ (K is an integer).

l. In one example, M is not equal to N, and (M+N) is not equal to a value of $2^K$ (K is an integer).

m. Alternatively, MVD derived in BDOF and PROF may be clipped to different ranges.

i. For example, MVD derived in BDOF may be clipped to [−31, 31].

ii. For example, MVD derived in BDOF may be clipped to [−15, 15].

iii. For example, MVD derived in BDOF may be clipped to [−63, 63].

iv. For example, MVD derived in BDOF may be clipped to [−127, 127].

v. For example, MVD derived in PROF may be clipped to [−63, 63].

vi. For example, MVD derived in PROF may be clipped to [−31, 31].

vii. For example, MVD derived in BDOF may be clipped to [−15, 15].

viii. For example, MVD derived in BDOF may be clipped to [−127, 127].

Figure 11:
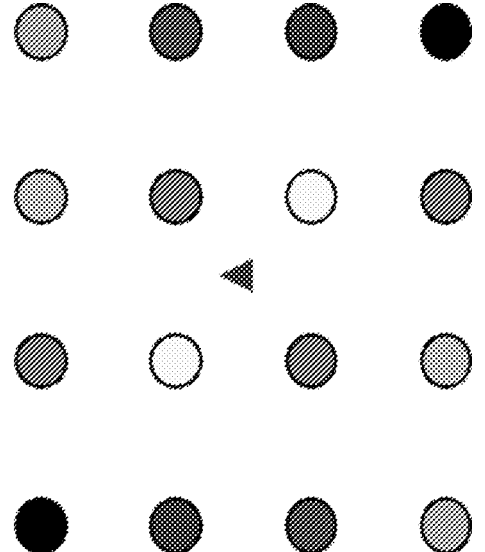
FIG. 11 shows an example of MVD derived at size 4*4 in prediction refinement with optical flow (PROF). Position pair with same color (shading) have opposite MVD value.

17. MVD (such as (dMvH, dMvV) in section 2.6) associated with one sample may be used to derive the MVD of another sample in the optical flow based methods (e.g., PROF).

n. In one example, the MVD in RPOF may be only derived using the affine model (e.g., according to the PROF-eq1 in section 2.6) for certain positions and such MVD may be used to derive the MVD of other positions. Suppose the MVD is derived at size W*H in PROF.

o. In one example, the MVD may be only derived using the affine model for the upper W*H/2 part, and the MVD of the lower W*H/2 part may be derived from the MVD of the upper W*H/2 part. An example is shown in FIG. 11.

p. In one example, the MVD may be only derived using the affine model for the lower W*H/2 part, and the MVD of the upper W*H/2 part may be derived from the MVD of the lower W*H/2 part.

q. In one example, the MVD may be only derived using the affine model for the left W/2*H part, and the MVD of the right W/2*H part may be derived from the MVD of the left W/2*H part.

r. In one example, the MVD may be only derived using the affine model for the right W/2*H part, and the MVD of the left W/2*H part may be derived from the MVD of the right W/2*H part.

s. In one example, furthermore, the MVD derived using the affine model may be rounded to a predefined precision or/and clipped to a predefined range, before being used to derive the MVD of other positions.

i. For example, when MVD of the upper W*H/2 part is derived using the affine model, such MVD may be rounded to a predefined precision or/and clipped to a predefined range, before being used to derive the MVD of the lower W*H/2 part.

t. In one example, for x=0, . . . , W−1, y=H/2, . . . , H−1, the MVD of position (x, y) is derived as follows, wherein $MVD_h$ and $MVD_v$ are the horizontal and vertical MVD respectively.

$$MVD_h(x,y)=-MVD_h(W-1-x,H-1-y) \qquad \text{i.}$$

$$MVD_v(x,y)=-MVD_v(W-1-x,H-1-y) \qquad \text{ii.}$$

18. The derived sample prediction refinement (e.g., the offset to be added to the prediction sample) in BDOF may be clipped to a predefined range [−M, N] (M and N are integers).

a. In one example, N may be equal to M−1.

i. In one example, M is equal to $2^K$. For example, K may be equal to 11, 12, 13, 14, or 15.

ii. Alternatively, N may be equal to M.

b. In one example, the predefined range may depend on the bit depth of the current color component.

i. In one example, M is equal to $2^K$, K=Max(K1, BitDepth+K2), wherein BitDepth is the bit depth of the current color component (e.g., luma, Cb or Cr, or R, G or B). Max(X, Y) returns the larger value of X and Y.

ii. In one example, M is equal to $2^K$, K=Min(K1, BitDepth+K2), wherein BitDepth is the bit depth of the current color component (e.g., luma, Cb or Cr, or R, G or B). Min(X, Y) returns the smaller value of X and Y.

iii. For example, K1 may be equal to 11, 12, 13, 14, or 15.

iv. For example, K2 may be equal to −2, −1, 0, 1, 2, or 3.

v. In one example, the three color component share the same bitdepth, therefore, the range is purely dependent on the internal bit-depth or input bit-depth of samples in a block.

c. In one example, the predefined range is the same as that used in PROF d. Alternatively, furthermore, the refined sample in BDOF (e.g., the offset plus the sample before being refined) may not be further clipped.

19. It is proposed to align the coding group (CG) sizes in different residual coding modes (e.g. transform skip (TS) mode and regular residual coding mode (non-TS mode)).
  a. In one example, for a transform skip coded block (wherein transform is bypassed or identify transform is applied) the CG size may depend on whether the block contains more than (2*M) (e.g., M=8) samples and/or the residual block size.
    i. In one example, if a block size is A*N (N>=M), the CG size is set to A*M
    ii. In one example, if a block size is N*A (N>=M), the CG size is set to M*A.
    iii. In one example, if a block size is A*N (N<M), the CG size is set to A*A
    iv. In one example, if a block size is N*A (N<M), the CG size is set to A*A.
    v. In one example, A=2.
  b. In one example, for a non-TS coded block, the CG size may depend on whether the block has either its width or height equal to K.
    i. In one example, if either width or height is equal to K, then CG size is set to K*K (e.g., K=2).
    ii. In one example, if minimum value of width and height is equal to K, then CG size is set to K*K (e.g., K=2).
  c. In one example, 2*2 CG size may be used for 2*N or/and N*2 residual blocks in both transform skip mode and regular residual coding mode.
  d. In one example, 2*8 CG size may be used for 2*N (N>=8) residual blocks in both transform skip mode and regular residual coding mode.
    i. Alternatively, 2*4 CG size may be used for 2*N (N>=8) residual blocks in both transform skip mode and regular residual coding mode.
    ii. Alternatively, 2*4 CG size may be used for 2*N (N>=4) residual blocks in both transform skip mode and regular residual coding mode.
  e. In one example, 8*2 CG size may be used for N*2 (N>=8) residual blocks in both transform skip mode and regular residual coding mode.
    i. 4*2 CG size may be used for N*2 (N>=8) residual blocks in both transform skip mode and regular residual coding mode.
    ii. 4*2 CG size may be used for N*2 (N>=4) residual blocks in both transform skip mode and regular residual coding mode.
20. Whether to enable/disable PROF for affine coded blocks may be dependent on the decoded information associated with current affine coded block.
  a. In one example, PROF may be disabled when one reference picture is associated with different resolution (width or height) as the current picture.
  b. In one example, if current block is uni-predictive coding, PROF may be disabled when the reference picture is associated with different resolution (width or height) as the current picture.
  c. In one example, if current block is bi-predictive coding, PROF may be disabled when at least one of the reference pictures is associated with different resolution (width or height) as the current picture.
  d. In one example, if current block is bi-predictive coding, PROF may be disabled when all reference pictures are associated with different resolution (width or height) as the current picture.
  e. In one example, if current block is bi-predictive coding, PROF may be enabled when all reference pictures are associated with same resolution (width or height), even different from the current picture.
  f. Whether to enable above methods may depend on the coded information of current block, such as control point motion vectors (CPMVs) of current block; resolution ratios between reference picture and current picture.
21. PROF may be disabled when certain conditions are true, such as:
  a. Generalized bi-prediction (GBi, a.k.a., BCW) is enabled
  b. Weighted prediction is enabled
  c. Alternative half pixel interpolation filter is applied.
22. The above methods which are applied to DMVR/BIO may be also applicable to other decoder-side motion vector derivation (DMVD) methods, such as prediction refinement based on optical flow for the affine mode.
23. Whether to use the above methods and/or which method to be used may be signaled in sequence/picture/slice/tile/brick/video unit-level.
24. A non-square MVD region (e.g., Diamond-region, octagon-shape based MVD region) may be searched in DMVR and/or other decoder derived motion methods.
  a. For example, the following 5*5 diamond MVD region may be searched, e.g., the MVD values listed below are in unit of integer pixel.
    (0,−2),
    (−1,−1), (0,−1), (1,−1),
    (−2, 0), (−1, 0), (0, 0), (1, 0), (2, 0),
    (−1, 1), (0, 1), (1, 1),
    (0, 2),
  b. For example, the following 5*5 octagon MVD region may be searched, e.g., the MVD values listed below are in unit of integer pixel.
    (−1,−2), (0,−2), (1,−2),
    (−2, 0), (−1, 0), (0, 0), (1, 0), (2, 0),
    (−2, 1), (−1, 1), (0, 1), (1, 1), (2, 1),
    (−1, 2), (0, 2), (1, 2),
  c. For example, the following 3*3 diamond MVD region may be searched, e.g., the MVD values listed below are in unit of integer pixel.
    (0,−1),
    (−1, 0), (0, 0), (1, 0),
    (0, 1),
  d. In one example, unequal search ranges in the horizontal and vertical directions may be applied, such as (MVD_Hor_TH1+MVD_Hor_TH2+1) is unequal to (MVD_Ver_TH1+MVD_Ver_TH2+1).
25. The MVD region to be searched in DMVR and/or other decoder derived motion methods may depend on the block dimensions and/or the block shape. Suppose the current block dimensions are W×H.
  a. In one example, if W>=H+TH (TH>=0), the horizontal MVD searching range (e.g., MVD_Hor_TH1+MVD_Hor_TH2+1) may be greater than or no smaller than the vertical MVD searching range (e.g., MVD_Ver_TH1+MVD_Ver_TH2+1).
    i. Alternatively, if W+TH<=H, the horizontal MVD searching range may be greater than the vertical MVD searching range.
    ii. For example, MVD_Hor_TH1 and MVD_Hor_TH2 are set equal to 2, and MVD_Ver_TH1 and MVD_Ver_TH1 are set equal to 1.
    iii. For example, following 5*3 MVD region may be searched, wherein the MVD values are in unit of integer pixel (−1,−1), (0,−1), (1,−1),
(−2, 0), (−1, 0), (0, 0), (1, 0), (2, 0),
(−1, 1), (0, 1), (1, 1), b. In one example, if W+TH<=H, the horizontal MVD searching range may be smaller than or no greater than the vertical MVD searching range.

i. Alternatively, if W>=H+TH (TH>=0), horizontal MVD searching range may be smaller than vertical MVD range.

ii. For example, MVD_Hor_TH1 and MVD_Hor_TH2 are set equal to 1, and MVD_Ver_TH1 and MVD_Ver_TH1 are set equal to 2.

iii. For example, following 3*5 MVD region may be searched, wherein the MVD values are in unit of integer pixel
(0,−2),
(−1,−1), (0,−1), (1,−1),
(−1, 0), (0, 0), (1, 0),
(−1, 1), (0, 1), (1, 1),
(0, 2), c. In one example, if W<=H+TH and H<=W+TH, a diamond MVD region may be searched.

i. For example, following 5*5 diamond MVD space may be searched, wherein the MVD values are in unit of integer pixel.
(0,−2),
(−1,−1), (0,−1), (1,−1),
(−2, 0), (−1, 0), (0, 0), (1, 0), (2, 0),
(−1, 1), (0, 1), (1, 1),
(0, 2), 26. The MVD space to be searched in DMVR and/or other decoder derived motion methods may depend on motion information of the block before being refined.

a. In one example, if sumAbsHorMv>=sumAbsVerMv+TH (TH>=0), the horizontal MVD searching range may be greater than the vertical searching MVD range.

i. Alternatively, if sumAbsHorMv+TH<=sumAbsVerMv, the horizontal MVD searching range may be greater than vertical MVD range.

ii. For example, MVD_Hor_TH1 and MVD_Hor_TH2 are set equal to 2, and MVD_Ver_TH1 and MVD_Ver_TH1 are set equal to 1.

iii. For example, following 5*3 MVD space may be searched, wherein the MVD values are in unit of integer pixel
(−1,−1), (0,−1), (1,−1),
(−2, 0), (−1, 0), (0, 0), (1, 0), (2, 0),
(−1, 1), (0, 1), (1, 1), b. In one example, if sumAbsHorMv+TH<=sumAbsVerMv, the horizontal MVD searching range may be smaller than the vertical MVD searching range.

i. Alternatively, if sumAbsVerMv+TH<=sumAbsHorMv, the horizontal MVD searching range may be smaller than the vertical MVD searching range.

ii. For example, MVD_Hor_TH1 and MVD_Hor_TH2 are set equal to 1, and MVD_Ver_TH1 and MVD_Ver_TH1 are set equal to 2.

iii. For example, following 3*5 MVD region may be searched, wherein the MVD values are in unit of integer pixel
(0,−2),
(−1,−1), (0,−1), (1,−1),
(−1, 0), (0, 0), (1, 0),
(−1, 1), (0, 1), (1, 1),
(0, 2), c. In one example, if sumAbsHorMv<=sumAbsVerMv+TH and sumAbsVerMv<=sumAbsHorMv+TH, diamond MVD region may be searched.

i. For example, the following 5*5 diamond MVD space may be searched, wherein the MVD values are in unit of integer pixel.
(0,−2),
(−1,−1), (0,−1), (1,−1),
(−2, 0), (−1, 0), (0, 0), (1, 0), (2, 0),
(−1, 1), (0, 1), (1, 1),
(0, 2), d. In one example, the horizontal and/or vertical search range may depend on the reference pictures.

i. In one example, if the reference pictures are far away from the current picture, larger search ranges may be utilized.

ii. In one example, if a first reference picture has a lower quantization parameter (QP) than a second reference picture, larger search ranges may be utilized for the first reference picture.

e. In one example, the horizontal and/or vertical search range may depend on motion vectors.

i. In one example, if the absolute values of the motion vectors are large, larger search ranges may be utilized.

27. Sub-pel MVD may be derived in DMVR even if the best integer position is at the boundary of the integer search region.

a. In one example, if the left and right positions of the best integer position are both included in the search region, the horizontal sub-pel MVD may be derived, e.g., using parametric error surface fit method. An example is illustrated in FIG. 9.

b. In one example, if the above and below positions of the best integer position are both included in the search region, the vertical sub-pel MVD may be derived, e.g., using parametric error surface fit method. An example is illustrated in FIG. 9.

c. In one example, sub-pel MVD may be derived for any position.

i. For example, cost of the best integer position and its N (e.g., N=4) nearest neighboring positions may be used to derive the horizontal and vertical sub-pel MVD.

ii. For example, cost of the best integer position and its N nearest neighboring positions may be used to derive the horizontal sub-pel MVD.

iii. For example, cost of the best integer position and its N nearest neighboring positions may be used to derive the vertical sub-pel MVD.

iv. Parametric error surface fit may be used for deriving the sub-pel MVD.

d. Alternatively, furthermore, if sub-pel MVD is not derived in certain direction (e.g., horizontal or/and vertical direction), it is set equal to zero.

28. Sub-pel MVD derivation may be disallowed in DMVR when BDOF is allowed for the picture/slice/tile group/CTU/CU.

a. Alternatively, sub-pel MVD derivation may be allowed only when BDOF is disallowed for the picture/slice/tile group/CTU/CU.

29. Which bullet to be applied may depend on the coded information, such as whether BDOF or PROF is applied to one block Embodiment Deleted texts are marked with double brackets (e.g., [[a]] denotes the deletion of the character "a"), and newly added parts are highlighted in bold and italic.

Example

An example of disabling sub-pel MVD derivation in DMVR when BDOF is allowed.

8.5.3.1 General

Inputs to this process are:

a luma location (xSb, ySb) specifying the top-left sample of the current coding subblock relative to the top-left luma sample of the current picture, a variable sbWidth specifying the width of the current coding subblock in luma samples, a variable sbHeight specifying the height of the current coding subblock in luma samples, the luma motion vectors in ¹⁄₁₆ fractional-sample accuracy mvL0 and mvL1, the selected luma reference picture sample arrays refPicL0$_L$ and refPicL1$_L$.

Outputs of this process are:

delta luma motion vectors dMvL0 and dMvL1.

The variable subPelFlag is set equal to 0, the variable srRange is set equal to 2 and the integer sample offset (intOffX, intOffY) is set equal to (0, 0).

Both components of the delta luma motion vectors dMvL0 and dMvL1 are set equal to zero and modified as follows:

For each X being 0 or 1, the (sbWidth+2*srRange)× (sbHeight+2*srRange) array predSamplesLX$_L$ of prediction luma sample values is derived by invoking the fractional sample bilinear interpolation process specified in 8.5.3.2.1 with the luma location (xSb, ySb), the prediction block width set equal to (sbWidth+2*srRange), the prediction block height set equal to (sbHeight+2*srRange), the reference picture sample array refPicLX$_L$, the motion vector mvLX and the refinement search range srRange as inputs.

The variable minSad is derived by invoking the sum of absolute differences calculation process specified in clause 8.5.3.3 with the width sbW and height sbH of the current coding subblock set equal to sbWidth and sbHeight, the prediction sample arrays pL0 and pL1 set equal to predSamplesL0$_L$ and predSamplesL1$_L$, and the offset (dX, dY) set equal to (0, 0) as inputs, and minSad as output.

When minSad is greater than or equal to sbHeight*sbWidth, the following applies:

The 2-D array sadArray[dX+2][dY+2] with dX=−2 . . . 2 and dY=−2 . . . 2 is derived by invoking the sum of absolute differences calculation process specified in clause 8.5.3.3 with the width sbW and height sbH of the current coding subblock set equal to sbWidth and sbHeight, the prediction sample arrays pL0 and pL1 set equal to predSamplesL0$_L$ and predSamplesL1$_L$, and the offset (dX, dY) as inputs, and sadArray[dX+2][dY+2] as output.

The integer sample offset (intOffX, intOffY) is modified by invoking the array entry selection process specified in clause 8.5.3.4 with the 2-D array sadArray[dX+2][dY+2] with dX=−2 . . . 2 and dY=−2 . . . 2, the best integer sample offset (intOffX, intOffY), and minSad as input, and the modified best integer sample offset (intOffX, intOffY) as output.

When intOffX is not equal to −2 or 2, and intOffY is not equal to −2 or 2, subPelFlag is set equal to 1.

The delta luma motion vector dMvL0 is modified as follows:

$$dMvL0[0]+=16*intOffX \qquad (8\text{-}420)$$

$$dMvL0[1]+=16*intOffY \qquad (8\text{-}421)$$

When subPelFlag is equal to 1 *and bdofFlag is equal to 0*, the parametric motion vector refinement process specified in clause 8.5.3.5 is invoked with the 3×3 2-D array sadArray[dX+2] [dY+2] with dX=intOffX−1, intOffX, intOffX+1 and dY=intOffY−1, intOffY, intOffY+1, and the delta motion vector dMvL0 as inputs and the modified dMvL0 as output.

The delta motion vector dMvL1 is derived as follows:

$$dMvL1[0]=-dMvL0[0] \qquad (8\text{-}422)$$

$$dMvL1[1]=-dMvL0[1] \qquad (8\text{-}423)$$

Example

An example of octagon search region in DMVR.

8.5.3.1 General

Inputs to this process are:

a luma location (xSb, ySb) specifying the top-left sample of the current coding subblock relative to the top-left luma sample of the current picture, a variable sbWidth specifying the width of the current coding subblock in luma samples, a variable sbHeight specifying the height of the current coding subblock in luma samples, the luma motion vectors in ¹⁄₁₆ fractional-sample accuracy mvL0 and mvL1, the selected luma reference picture sample arrays refPicL0$_L$ and refPicL1$_L$.

Outputs of this process are:

delta luma motion vectors dMvL0 and dMvL1.

The variable subPelFlag is set equal to 0, the variable srRange is set equal to 2 and the integer sample offset (intOffX, intOffY) is set equal to (0, 0).

Both components of the delta luma motion vectors dMvL0 and dMvL1 are set equal to zero and modified as follows:

For each X being 0 or 1, the (sbWidth+2*srRange)× (sbHeight+2*srRange) array predSamplesLX$_L$ of prediction luma sample values is derived by invoking the fractional sample bilinear interpolation process specified in 8.5.3.2.1 with the luma location (xSb, ySb), the prediction block width set equal to (sbWidth+2*sr-Range), the prediction block height set equal to (sbHeight+2*srRange), the reference picture sample array refPicLX$_L$, the motion vector mvLX and the refinement search range srRange as inputs.

The variable minSad is derived by invoking the sum of absolute differences calculation process specified in clause 8.5.3.3 with the width sbW and height sbH of the current coding subblock set equal to sbWidth and sbHeight, the prediction sample arrays pL0 and pL1 set equal to predSamplesL0$_L$ and predSamplesL1$_L$, and the offset (dX, dY) set equal to (0, 0) as inputs, and minSad as output.

When minSad is greater than or equal to sbHeight*sbWidth, the following applies:

The 2-D array sadArray[dX+2][dY+2] with dX=− 2 . . . 2 and [[dY=−2 . . . 2]] *dY = −1..1*,

*or dX = −1..1 and dY = −2, 2* is derived by invoking the sum of absolute differences calculation process specified in clause 8.5.3.3 with the width sbW and height sbH of the current coding subblock set equal to sbWidth and sbHeight, the prediction sample arrays pL0 and pL1 set equal to predSamplesL0$_L$ and predSamplesL1$_L$, and the offset (dX, dY) as inputs, and sadArray[dX+2][d Y+2] as output.

The integer sample offset (intOffX, intOffY) is modified by invoking the array entry selection process specified in clause 8.5.3.4 with the 2-D array sadArray[dX+2][dY+2] with dX=−2 . . . 2 and [[dY=−2 . . . 2]] *dY = −1..1 or dX = −1..1 and dY = −2, 2*, the best integer sample offset (intOffX, intOffY), and minSad as input, and the modified best integer sample offset (intOffX, intOffY) as output.

When intOffX is not equal to −2 or 2, and intOffY is not equal to −2 or 2, subPelFlag is set equal to 1.

The delta luma motion vector dMvL0 is modified as follows:

$$dMvL0[0] \mathrel{+}= 16*intOffX \qquad (8\text{-}420)$$

$$dMvL0[1] \mathrel{+}= 16*intOffY \qquad (8\text{-}421)$$

When subPelFlag is equal to 1, the parametric motion vector refinement process specified in clause 8.5.3.5 is invoked with the 3×3 2-D array sadArray[dX+2][dY+2] with dX=intOffX−1, intOffX, intOffX+1 and dY=intOffY−1, intOffY, intOffY+1, and the delta motion vector dMvL0 as inputs and the modified dMvL0 as output.

The delta motion vector dMvL1 is derived as follows:

$$dMvL1[0] = -dMvL0[0] \qquad (8\text{-}422)$$

$$dMvL1[1] = -dMvL0[1] \qquad (8\text{-}423)$$

Example

An example of restricting motion vector refinement in BDOF and PROF to be zero or in a form of K$^m$ or −K$^m$.

The proposed changes on top of JVET-O0070-CE4.2.1a-WD-r1.docx are highlighted in bold and italic and the deleted parts are marked with double brackets (e.g., [[a]] denotes the deletion of the character "a").

8.5.1 Derivation Process for Motion Vector Arrays from Affine Control Point Motion Vectors Inputs to this process are:

a luma location (xCb, yCb) of the top-left sample of the current luma coding block relative to the top-left luma sample of the current picture, two variables cbWidth and cbHeight specifying the width and the height of the luma coding block, the number of control point motion vectors numCpMv, the control point motion vectors cpMvLX[cpIdx], with cpIdx=0 . . . numCpMv−1 and X being 0 or 1, the reference index refIdxLX and X being 0 or 1, the number of luma coding subblocks in horizontal direction numSbX and in vertical direction numSbY.

Outputs of this process are:

the luma subblock motion vector array mvLX[xSbIdx][ySbIdx] with xSbIdx=0 . . . numSbX−1, ySbIdx=0 . . . numSbY−1 and X being 0 or 1, the chroma subblock motion vector array mvCLX[xSbIdx][ySbIdx] with xSbIdx=0 . . . numSbX−1, ySbIdx=0 . . . numSbY−1 and X being 0 or 1.

the motion vector difference array diffMv.

The following assignments are made for x=xCb . . . xCb+cbWidth−1 and y=yCb . . . yCb+cbHeight−1:

$$CpMvLX[x][y][0] = cpMvLX[0] \qquad (8\text{-}666)$$

$$CpMvLX[x][y][1] = cpMvLX[1] \qquad (8\text{-}667)$$

$$CpMvLX[x][y][2] = cpMvLX[2] \qquad (8\text{-}668)$$

The variables log 2CbW and log 2CbH are derived as follows:

$$\log 2CbW = Log\ 2(cbWidth) \qquad (8\text{-}669)$$

$$\log 2CbH = Log\ 2(cbHeight) \qquad (8\text{-}670)$$

The variables mvScaleHor, mvScaleVer, dHorX and dVerX are derived as follows:

$$mvScaleHor = cpMvLX[0][0] \ll 7 \qquad (8\text{-}671)$$

$$mvScaleVer = cpMvLX[0][1] \ll 7 \qquad (8\text{-}672)$$

$$dHorX = (cpMvLX[1][0] - cpMvLX[0][0]) \ll (7 - \log 2CbW) \qquad (8\text{-}673)$$

$$dVerX = (cpMvLX[1][1] - cpMvLX[0][1]) \ll (7 - \log 2CbW) \qquad (8\text{-}674)$$

The variables dHorY and dVerY are derived as follows:

If numCpMv is equal to 3, the following applies:

$$dHorY = (cpMvLX[2][0] - cpMvLX[0][0]) \ll (7 - \log 2CbH) \qquad (8\text{-}675)$$

$$dVerY = (cpMvLX[2][1] - cpMvLX[0][1]) \ll (7 - \log 2CbH) \qquad (8\text{-}676)$$

Otherwise (numCpMv is equal to 2), the following applies:

$$dHorY = -dVerX \qquad (8\text{-}677)$$

$$dVerY = dHorX \qquad (8\text{-}678)$$

The variables sbWidth and sbHeight are derived as follows:

$$sbWidth = cbWidth/numSbX \qquad (8\text{-xxx})$$

$$sbHeight = cbHeight/numSbY \qquad (8\text{-xxx})$$

The variable fallbackModeTriggered is set equal to 1 and modified as follows:

The variables bxWX$_4$, bxHX$_4$, bxWX$_h$, bxHX$_h$, bxWX$_v$ and bxHX$_v$ are derived as follows:

$$maxW_4 = Max(0, Max(4*(2048+dHorX), Max(4*dHorY, 4*(2048+dHorX)+4*dHorY))) \qquad (8\text{-}679)$$

$$minW_4 = Min(0, Min(4*(2048+dHorX), Min(4*dHorY, 4*(2048+dHorX)+4*dHorY))) \qquad (8\text{-}680)$$

$$maxH_4 = Max(0, Max(4*dVerX, Max(4*(2048+dVerY), 4*dVerX+4*(2048+dVerY)))) \qquad (8\text{-}681)$$

$$minH_4 = Min(0, Min(4*dVerX, Min(4*(2048+dVerY), 4*dVerX+4*(2048+dVerY)))) \qquad (8\text{-}682)$$

$$bxWX_4 = ((maxW_4 - minW_4) \gg 11) + 9 \qquad (8\text{-}683)$$

$$bxHX_4 = ((maxH_4 - minH_4) \gg 11) + 9 \qquad (8\text{-}684)$$

$$bxWX_h = ((Max(0, 4*(2048+dHorX)) - Min(0, 4*(2048+dHorX))) \gg 11) + 9 \qquad (8\text{-}685)$$

$$bxHX_h = ((Max(0, 4*dVerX) - Min(0, 4*dVerX)) \gg 11) + 9 \qquad (8\text{-}686)$$

$$bxWX_v = ((Max(0, 4*dHorY) - Min(0, 4*dHorY)) \gg 11) + 9 \qquad (8\text{-}687)$$

$$bx\text{HX}_v=((\text{Max}(0,4*(2048+d\text{Ver}Y))-\text{Min}(0,4*(2048+ d\text{Ver}Y)))\!>\!>\!11)+9 \qquad (8\text{-}688)$$

If inter_pred_idc[xCb][yCb] is equal to PRED_BI and $bx\text{WX}_4*bx\text{HX}_4$ is less than or equal to 225, fall-backModeTriggered is set equal to 0.

Otherwise, if both $bx\text{WX}_h*bx\text{HX}_h$ is less than or equal to 165 and $bx\text{WX}_v*bx\text{HX}_v$ is less than or equal to 165, fallbackModeTriggered is set equal to 0.

For xSbIdx=0 . . . numSbX−1 and ySbIdx=0 . . . numSbY−1, the following applies:

The variables xPosCb and yPosCb are derived as follows

If fallbackModeTriggered is equal to 1, the following applies:

$$x\text{PosCb}=(\text{cbWidth}\!>\!>\!1) \qquad (8\text{-}689)$$

$$y\text{PosCb}=(\text{cbHeight}\!>\!>\!1) \qquad (8\text{-}690)$$

Otherwise (fallbackModeTriggered is equal to 0), the following applies:

$$x\text{PosCb}=2+(x\text{SbIdx}\!<\!<\!2) \qquad (8\text{-}691)$$

$$y\text{PosCb}=2+(y\text{SbIdx}\!<\!<\!2) \qquad (8\text{-}692)$$

The luma motion vector mvLX[xSbIdx][ySbIdx] is derived as follows:

$$\text{mvLX}[x\text{SbIdx}][y\text{SbIdx}][0]=(\text{mvScaleHor}+ d\text{Hor}X*x\text{PosCb}+d\text{Hor}Y*y\text{PosCb}) \qquad (8\text{-}693)$$

$$\text{mv}LX[x\text{SbIdx}][y\text{SbIdx}][1]=(\text{mvScaleVer}+ d\text{Ver}X*x\text{PosCb}+d\text{Ver}Y*y\text{PosCb}) \qquad (8\text{-}694)$$

The rounding process for motion vectors as specified in clause 8.5.2.14 is invoked with mvX set equal to mvLX[xSbIdx][ySbIdx], rightShift set equal to 7, and leftShift set equal to 0 as inputs and the rounded mvLX[xSbIdx][ySbIdx] as output.

The motion vectors mvLX[xSbIdx][ySbIdx] are clipped as follows:

$$\text{mvLX}[x\text{SbIdx}][y\text{SbIdx}][0]=\text{Clip3}(-2^{17},2^{17}-1,\text{mvLX} [x\text{SbIdx}][y\text{SbIdx}][0]) \qquad (8\text{-}695)$$

$$\text{mvLX}[x\text{SbIdx}][y\text{SbIdx}][1]=\text{Clip3}(-2^{17},2^{17}-1,\text{mvLX} [x\text{SbIdx}][y\text{SbIdx}][1]) \qquad (8\text{-}696)$$

For xSbIdx=0 . . . numSbX−1 and ySbIdx=0 . . . numSbY−1, the following applies:

The average luma motion vector mvAvgLX is derived as follows:

$$\text{mvAvgLX}=\text{mvLX}[(x\text{SbIdx}\!>\!>\!1\!<\!<\!1)][(y\text{S-} \text{bIdx}\!>\!>\!1\!<\!<\!1)]+\text{mvLX}[(x\text{SbIdx}\!>\!>\!1\!<\!<\!1)+1][(y\text{S-} \text{bIdx}\!<\!<\!1\!<\!<\!1)+1] \qquad (8\text{-}697)$$

$$\text{mvAvgLX}[0]=(\text{mvAvgLX}[0]+1-(\text{mvAvgLX}[0]\!>\!=\!0)) \!>\!>\!1 \qquad (8\text{-}698)$$

$$\text{mvAvgLX}[1]=(\text{mvAvgLX}[1]+1-(\text{mvAvgLX}[1]\!>\!=\!0)) \!>\!>\!1 \qquad (8\text{-}699)$$

The derivation process for chroma motion vectors in clause 8.5.2.13 is invoked with mvAvgLX and refIdxLX as inputs, and the chroma motion vector mvCLX[xSbIdx][ySbIdx] as output.

[Ed. (BB): This way four 2×2 chroma subblocks (4×4 chroma block) share the same motion vector which is derived from the average of two 4×4 luma sub-block motion vectors. In the decoding process motion compensation is still performed on 2×2 chroma blocks which is however a motion compen-sation on a chroma 4×4 block because all chroma MVs inside a 4×4 chroma block are the same. I would prefer an editorial change that makes it more clear that affine chroma MC is performed on 4×4 chroma blocks.]

The motion vector difference array diffMv is derived as follows:

If fallbackModeTriggered is equal to 0, the following applies:

The variable shift1 is set to equal to Max (6, bitDepth−6).

The variable dmvLimit is set to equal to 1<<shift1.

The variable posOffsetX and posOffsetY is derived as follows:

$$\text{posOffset}X=6*d\text{Hor}X+6*d\text{Ver}X$$

$$\text{posOffset}Y=6*d\text{Hor}Y+6*d\text{Ver}Y$$

For x=0 . . . sbWidth−1 and y=0 . . . sbHeight−1, the following applies:

The following applies:

$$\text{diffMv}[x][y][0]=x*(d\text{Hor}X\!<\!<\!2)+y*(d\text{Ver}X\!<\!<\!2)- \text{posOffsetX}$$

$$\text{diffMv}[x][y][1]=x*(d\text{Hor}Y\!<\!<\!2)+y*(d\text{Ver}Y\!<\!<\!2)- \text{posOffsetY}$$

For i=0 . . . 1, the following applies:

The rounding process for motion vectors as speci-fied in clause 8.5.2.14 is invoked with mvX set equal to diffMv[x][y][i], rightShift set equal to 7, and leftShift set equal to 0 as inputs and the rounded diffMv as output.

diffMv[x][y][i] is clipped as followings:

diffMv[x][y][i]=Clip3(−dmvLimit, dmvLimit, diffMv[x][y][i])

*diffMv[ x ][ y ][ i ] is derived by invoking the motion vector refinement derivation process as specified in clause 8.5.6.5 with numer set equal to diffMv[ x ][ y ][ i ] and denom set equal to 1 respectively.*

Otherwise (fallbackModeTriggered is equal to 1), for x=0 . . . sbWidth−1 and y=0 . . . sbHeight−1, the following applies:

$$\text{diffMv}[x][y][0]=0$$

$$\text{diffMv}[x][y][1]=0$$

8.5.6 Decoding Process for Inter Blocks 8.5.6.4 Bidirectional Optical Flow Prediction Process Inputs to this process are:

two variables nCbW and nCbH specifying the width and the height of the current coding block, two (nCbW+2)×(nCbH+2) luma prediction sample arrays predSamplesL0 and predSamplesL1, the prediction list utilization flags predFlagL0 and pred-FlagL1, the reference indices refIdxL0 and refIdxL1, the bidirectional optical flow utilization flags bdofUtiliza-tionFlag[xIdx][yIdx] with xIdx=0 . . . (nCbW>>2)−1, yIdx=0 . . . (nCbH>>2)−1.

Output of this process is the (nCbW)×(nCbH) array pbSamples of luma prediction sample values.

Variables bitDepth, shift1, shift2, shift3, shift4, offset4, and mvRefineThres are derived as follows:

The variable bitDepth is set equal to $\text{BitDepth}_Y$.

The variable shift1 is set to equal to Max(6, bitDepth−6).

The variable shift2 is set to equal to Max(4, bitDepth−8).

The variable shift3 is set to equal to Max(1, bitDepth−11).
The variable shift4 is set equal to Max(3, 15−bitDepth) and the variable offset4 is set equal to 1<<(shift4−1).
The variable mvRefineThres is set equal to 1<<Max(5, bitDepth−7).

For xIdx=0 . . . (nCbW>>2)−1 and yIdx=0 . . . (nCbH>>2)−1, the following applies:

The variable xSb is set equal to (xIdx<<2)+1 and ySb is set equal to (yIdx<<2)+1.

If bdofUtilizationFlag[xIdx][yIdx] is equal to FALSE, for x=xSb−1 . . . xSb+2, y=ySb−1 . . . ySb+2, the prediction sample values of the current subblock are derived as follows:

$$pb\text{Samples}[x][y]=\text{Clip3}(0,(2^{bitDepth})-1,(\text{pred\-Samples}L0[x+1][y+1]+\text{offset4}+\text{predSamples}L1[x+1][y+1]))>>\text{shift4}) \qquad (8\text{-}766)$$

Otherwise (bdofUtilizationFlag[xIdx][yIdx] is equal to TRUE), the prediction sample values of the current subblock are derived as follows:

For x=xSb−1 . . . xSb+4, y=ySb−1 . . . ySb+4, the following ordered steps apply:

1. The locations $(h_x, v_y)$ for each of the corresponding sample locations $(x, y)$ inside the prediction sample arrays are derived as follows:

$$h_x=\text{Clip3}(1,nCbW,x) \qquad (8\text{-}767)$$

$$v_y=\text{Clip3}(1,nCbH,y) \qquad (8\text{-}768)$$

2. The variables gradientHL0[x][y], gradientVL0[x][y], gradientHL1[x][y] and gradientVL1[x][y] are derived as follows:

$$\text{gradient}HL0[x][y]=(\text{predSamples}L0[h_x+1][v_y]-\text{pred\-Sample}L0[h_x-1][v_y])>>\text{shift1} \qquad (8\text{-}769)$$

$$\text{gradient}VL0[x][y]=(\text{predSample}L0[h_x][v_y+1]-\text{Sample}L0[h_x][v_y-1])>>\text{shift1} \qquad (8\text{-}770)$$

$$\text{gradient}HL1[x][y]=(\text{predSamples}L1[h_x+1][v_y]-\text{pred\-Sample}L1[h_x-1][v_y])>>\text{shift1} \qquad (8\text{-}771)$$

$$\text{gradient}VL1[x][y]=(\text{predSample}L1[h_x][v_y+1]-\text{Sample}L1[h_x][v_y-1])>>\text{shift1} \qquad (8\text{-}772)$$

3. The variables diff[x][y], tempH[x][y] and tempV[x][y] are derived as follows:

$$\text{diff}[x][y]=(\text{predSamples}L0[h_x][v_y]>>\text{shift2})-(\text{pred\-Samples}L1[h_x][v_y]>>\text{shift2}) \qquad (8\text{-}773)$$

$$\text{temp}H[x][y]=(\text{gradient}HL0[x][y]+\text{gradient}HL1[x][y])>>\text{shift3} \qquad (8\text{-}774)$$

$$\text{temp}V[x][y]=(\text{gradient}VL0[x][y]+\text{gradient}VL1[x][y])>>\text{shift3} \qquad (8\text{-}775)$$

The variables sGx2, sGy2, sGxGy, sGxdI and sGydI are derived as follows:

$$sGx2=\Sigma_i\Sigma_j(\text{temp}H[xSb+i][ySb+j]*\text{temp}H[xSb+i][ySb+j]) \text{ with } i,j=-1 \ldots 4 \qquad (8\text{-}776)$$

$$sGy2=\Sigma_i\Sigma_j(\text{temp}V[xSb+i][ySb+j]*\text{temp}V[xSb+i][ySb+j]) \text{ with } i,j=-1 \ldots 4 \qquad (8\text{-}777)$$

$$sGxGy=\Sigma_i\Sigma_j(\text{temp}H[xSb+i][ySb+j]*\text{temp}V[xSb+i][ySb+j]) \text{ with } i,j-1 \ldots 4 \qquad (8\text{-}778)$$

$$sGxGy_m=sGxGy>>12 \qquad (8\text{-}779)$$

$$sGxGy_s=sGxGy\&((1<<12)-1) \qquad (8\text{-}780)$$

$$sGxdI=\Sigma_i\Sigma_j(-\text{temp}H[xSb+i][ySb+j]*\text{diff}[xSb+i][ySb+j]) \text{ with } i,j=-1 \ldots 4 \qquad (8\text{-}781)$$

52

$$sGydI=\Sigma_i\Sigma_j(-\text{temp}V[xSb+i][ySb+j]*\text{diff}[xSb+i][ySb+j]) \text{ with } i,j=-1 \ldots 4 \qquad (8\text{-}782)$$

The horizontal and vertical motion offset of the current subblock are derived as:

1. *If sGx2 is larger than zero, $v_x$ is derived by invoking the motion vector refinement derivation process as specified in clause 8.5.6.5 with numer set equal to −( sGxdI << 3 ) and and denom set equal to sGx2 respectively. Then, $v_x$ is clipped as following.*

*following. $v_x = Clip3( -mvRefineThres mvRefineThres, v_x)$*

*(8-783)*

2. *Otherwise (sGx2 is equal to zero), $v_x$ is set equal to 0.*
3. *If sGy2 is larger than zero, $v_y$ is derived by invoking the motion vector refinement derivation process specified in clause 8.5.6.5 with numer set equal to $( ( sGydI << 3) - ( ( v_x * sGxGy_m ) << 12 + v_x* sGxGy_s ) >> 1 )$ and denom set equal to sGy2. Then, $v_y$ is clipped as following.*

*$v_y = Clip3( -mvRefineThres, mvRefineThres, v_y)$*

*(8-784)*

4. *Otherwise, $v_y$ is set equal to 0.*

$$[[v_x=sGx2>0?\text{Clip3}(-\text{mvRefineThres},\text{mvRefineThres},-(sGxdI<<3))>>\text{Floor}(\text{Log }2(sGx2))):0 \qquad (8\text{-}783)$$

$$v_y=sGy2>0?\text{Clip3}(-\text{mvRefineThres},\text{mvRefineThres},((sGydI<<3)-((v_x*sGxGy_m)<<12+v_x*sGxGy_s)>>1)>>\text{Floor}(\text{Log }2(sGx2))):0]] \qquad (8\text{-}784)$$

For x=xSb−1 . . . xSb+2, y=ySb−1 . . . ySb+2, the prediction sample values of the current sub-block are derived as follows:

$$\text{bdofOffset}=\text{Round}((v_x*(\text{gradient}HL1[x+1][y+1]-\text{gra\-dient}HL0[x+1][y+1]))>>1)+\text{Round}((v_y*(\text{gradi\-ent}VL1[x+1][y+1]-\text{gradient}VL0[x+1][y+1]))>>1) \qquad (8\text{-}785)$$

[Ed. (JC): Round( ) operation is defined for float input. The Round( ) operation seems redundant here since the input is an integer value. To be confirmed by the proponent]

$$pb\text{Samples}[x][y]=\text{Clip3}(0,(2^{bitDepth})-1,(\text{predSam\-ples}L0[x+1][y+1]+\text{offset4}+\text{predSamples}L1[x+1][y+1]+\text{bdofOffset})>>\text{shift4}) \qquad (8\text{-}786)$$

8.5.6.5 Motion vector refinement derivation process
*Inputs to this process are:*
  *a variable numer specifying the numerator*
  *a variable denom specifying the denominator.*
*Output of this process is the derived motion vector refinement dMvf.*
*shiftNum is set equal to numer = = 0 ? 0 : floor(log2(Abs(numer))).*
*shiftDenom is set equal to denom = = 0 ? 0 : : floor(log2(Abs(denom))).*
  *If Abs(numer) is smaller than Abs(denom), dMvf is set equal to 0. Otherwise, dMvf is set equal to Sign(numer) * (1 << (ShiftNum − shiftDenom)).*

Example

An example of clipping of MVD in BDOF and PROF to [−31, 31] is described.

The proposed changes on top of JVET-O2001-vE.docx are highlighted in bold and italic and deleted texts are marked with double brackets (e.g., [[a]] denotes the deletion of the character "a").

8.5.5.9 Derivation Process for Motion Vector Arrays from Affine Control Point Motion Vectors Inputs to this process are:

a luma location (xCb, yCb) of the top-left sample of the current luma coding block relative to the top-left luma sample of the current picture, two variables cbWidth and cbHeight specifying the width and the height of the luma coding block, the number of control point motion vectors numCpMv, the control point motion vectors cpMvLX[cpIdx], with cpIdx=0 . . . numCpMv−1 and X being 0 or 1, the reference index refIdxLX and X being 0 or 1, the number of luma coding subblocks in horizontal direction numSbX and in vertical direction numSbY.

Outputs of this process are:

the luma subblock motion vector array mvLX[xSbIdx][ySbIdx] with xSbIdx=0 . . . numSbX−1, ySbIdx=0 . . . numSbY−1 and X being 0 or 1, the chroma subblock motion vector array mvCLX[xSbIdx][ySbIdx] with xSbIdx=0 . . . numSbX−1, ySbIdx=0 . . . numSbY−1 and X being 0 or 1, the prediction refinement utilization flag cbProfFlagLX and X being 0 or 1, the motion vector difference array diffMvLX[xIdx][yIdx] with xIdx=0 . . . cbWidth/numSbX−1, yIdx=0 . . . cbHeight/numSbY−1 and X being 0 or 1.

. . .

The variable cbProfFlagLX is derived as follows:

If one or more of the following conditions are true, cbProfFlagLX is set equal to FALSE.

sps_affine_prof_enabled_flag is equal to 0.

fallbackModeTriggered is equal to 1.

numCpMv is equal to 2 and cpMvLX[1][0] is equal to cpMvLX[0][0] and cpMvLX[1][1] is equal to cpMvLX[0][1].

numCpMv is equal to 3 and cpMvLX[1][0] is equal to cpMvLX[0][0] and cpMvLX[1][1] is equal to cpMvLX[0][1] and cpMvLX[2][0] is equal to cpMvLX[0][0] and cpMvLX[2][1] is equal to cpMvLX[0][1].

Otherwise, cbProfFlagLX set equal to TRUE.

When cbProfFlagLX is 1, the motion vector difference array diffMv is derived as follows:

The variables sbWidth and sbHeight, dmvLimit, posOffsetX and posOffsetY are derived as follows:

$$sbWidth=cbWidth/numSbX \qquad (8\text{-}729)$$

$$sbHeight=cbHeight/numSbY \qquad (8\text{-}730)$$

$$[[dmvLimit=1<<Max(6,BitDepth_Y-6) \qquad (8\text{-}731)]]$$

$$\textit{\textbf{dmvLimit = ( 1 <<}}$$
$$\textit{\textbf{Max( 5, BitDepth}}_Y\textit{\textbf{ − 7 ) ) − 1}}$$

$$\textit{\textbf{(8-731)}}$$

$$posOffsetX=6*dHorX+6*dVerX \qquad (8\text{-}732)$$

$$posOffsetY=6*dHorY+6*dVerY \qquad (8\text{-}733)$$

For x=0 . . . sbWidth−1 and y=0 . . . sbHeight−1, the following applies:

$$diffMv[x][y][0]=x*(dHorX<<2)+y*(dVerX<<2)-posOffsetX \qquad (8\text{-}734)$$

$$diffMv[x][y][1]=x*(dHorY<<2)+y*(dVerY<<2)-posOffsetY \qquad (8\text{-}735)$$

For i=0 . . . 1, the following applies:

The rounding process for motion vectors as specified in clause 8.5.2.14 is invoked with mvX set equal to diffMv[x][y][i], rightShift set equal to 7, and leftShift set equal to 0 as inputs and the rounded diffMv[x][y][i] as output.

The value of diffMv[x][y][i] is clipped as follows:

$$[[diffMv[x][y][i]=Clip3(-dmvLimit,dmvLimit-1, diffMv[x][y][i]) \qquad (8\text{-}736)]]$$

$$\textit{\textbf{diffMv[ x ][ y ][ i ] = Clip3(}}$$
$$\textit{\textbf{−dmvLimit, dmvLimit,}}$$
$$\textit{\textbf{diffMv[ x ][ y ][ i ])}} \quad \textit{\textbf{(8-736)}}$$

8.5.6.5 Bi-Directional Optical Flow Prediction Process

Inputs to this process are:

two variables nCbW and nCbH specifying the width and the height of the current coding block, two (nCbW+2)×(nCbH+2) luma prediction sample arrays predSamplesL0 and predSamplesL1, the prediction list utilization flags predFlagL0 and predFlagL1, the reference indices refIdxL0 and refIdxL1, the bi-directional optical flow utilization flags bdofUtilizationFlag[xIdx][yIdx] with xIdx=0 . . . (nCbW>>2)−1, yIdx=0 . . . (nCbH>>2)−1.

Output of this process is the (nCbW)×(nCbH) array pbSamples of luma prediction sample values.

Variables bitDepth, shift1, shift2, shift3, shift4, offset4, and mvRefineThres are derived as follows:

The variable bitDepth is set equal to $BitDepth_Y$.

The variable shift1 is set to equal to Max(6, bitDepth−6).

The variable shift2 is set to equal to Max(4, bitDepth−8).

The variable shift3 is set to equal to Max(1, bitDepth−11).

The variable shift4 is set to equal to Max(3, 15−bitDepth) and the variable offset4 is set equal to 1<<(shift4−1).

The variable mvRefineThres is set equal to [[1<<Max(5, bitDepth−7)]]*( 1 << Max( 5, bitDepth − 7 ) ) − 1.*

For xIdx=0 . . . (nCbW>>2)−1 and yIdx=0 . . . (nCbH>>2)−1, the following applies:

The variable xSb is set equal to (xIdx<<2)+1 and ySb is set equal to (yIdx<<2)+1.

If bdofUtilizationFlag[xIdx][yIdx] is equal to FALSE, for x=xSb−1 . . . xSb+2, y=ySb−1 . . . ySb+2, the prediction sample values of the current subblock are derived as follows:

$$pbSamples[x][y]=Clip3(0,(2^{bitDepth})-1,(predSamplesL0[x+1][y+1]+offset4+predSamplesL1[x+1][y+1])>>shift4) \qquad (8\text{-}800)$$

Otherwise (bdofUtilizationFlag[xIdx][yIdx] is equal to TRUE), the prediction sample values of the current subblock are derived as follows:

For x=xSb−1 . . . xSb+4, y=ySb−1 . . . ySb+4, the following ordered steps apply:

1. The locations $(h_x, v_y)$ for each of the corresponding sample locations (x, y) inside the prediction sample arrays are derived as follows:

$$h_x=Clip3(1,nCbW,x) \qquad (8\text{-}801)$$

$$v_y=Clip3(1,nCbH,y) \qquad (8\text{-}802)$$

2. The variables gradientHL0[x][y], gradientVL0[x][y], gradientHL1[x][y] and gradientVL1[x][y] are derived as follows:

$$\text{gradient}HL0[x][y]=(\text{predSamples}L0[h_x+1][v_y]\\>>\text{shift1})-(\text{predSample}L0[h_x-1][v_y])>>\text{shift1}) \quad (8\text{-}803)$$

$$\text{gradient}VL0[x][y]=(\text{predSample}L0[h_x][v_y+1]\\>>\text{shift1})-(\text{predSample}L0[h_x][v_y-1])>>\text{shift1}) \quad (8\text{-}804)$$

$$\text{gradient}HL1[x][y]=(\text{predSamples}L1[h_x+1][v_y]\\>>\text{shift1})-(\text{predSample}L1[h_x-1][v_y])>>\text{shift1}) \quad (8\text{-}805)$$

$$\text{gradient}VL1[x][y]=(\text{predSample}L1[h_x][v_y+1]\\>>\text{shift1})-(\text{predSample}L1[h_x][v_y-1])>>\text{shift1}) \quad (8\text{-}806)$$

3. The variables diff[x][y], tempH[x][y] and tempV[x][y] are derived as follows:

$$\text{diff}[x][y]=(\text{predSamples}L0[h_x][v_y]>>\text{shift2})-(\text{predSamples}L1[h_x][v_y]>>\text{shift2}) \quad (8\text{-}807)$$

$$\text{temp}H[x][y]=(\text{gradient}HL0[x][y]+\text{gradient}HL1[x][y])\\>>\text{shift3} \quad (8\text{-}808)$$

$$\text{temp}V[x][y]=(\text{gradient}VL0[x][y]+\text{gradient}VL1[x][y])\\>>\text{shift3} \quad (8\text{-}809)$$

The variables sGx2, sGy2, sGxGy, sGxdI and sGydI are derived as follows:

$$sGx2=\Sigma_i\Sigma_j \text{ Abs}(\text{temp}H[xSb+i][ySb+j]) \text{ with } i,j=-1\ldots4 \quad (8\text{-}810)$$

$$sGy2=\Sigma_i\Sigma_j \text{ Abs}(\text{temp}V[xSb+i][ySb+j]) \text{ with } i,j=-1\ldots4 \quad (8\text{-}811)$$

$$sGxGy=\Sigma_i\Sigma_j(\text{Sign}(\text{temp}V[xSb+i][ySb+j])*\text{temp}H\\{[xSb+i][ySb+j])} \text{ with } i,j=-1\ldots4 \quad (8\text{-}812)$$

$$sGxGy_m=sGxGy>>12 \quad (8\text{-}813)$$

$$sGxGys=sGxGy\&((1<<12)-1) \quad (8\text{-}814)$$

$$sGxdI=\Sigma_i\Sigma_j(-\text{Sign}(\text{temp}H[xSb+i][ySb+j])*\text{diff}[xSb+i]\\{[ySb+j])} \text{ with } i,j=-1\ldots4 \quad (8\text{-}815)$$

$$sGydI=\Sigma_i\Sigma_j(-\text{Sign}(\text{temp}V[xSb+i][ySb+j])*\text{diff}[xSb+i]\\{[ySb+j])} \text{ with } i,j=-1\ldots4 \quad (8\text{-}816)$$

The horizontal and vertical motion offset of the current subblock are derived as:

$$vx=sGx2>0?\text{Clip3}(-\text{mvRefineThres},\text{mvRefineThres},\\-(sGxdI<<3)>>\text{Floor}(\text{Log 2}(sGx2))):0 \quad (8\text{-}817)$$

$$v_y=sGy2>0?\text{Clip3}(-\text{mvRefineThres},\text{mvRefineThres},\\((sGydI<<3)-((v_x*sGxGym)<<12+vx*sGxGys)\\>>1)>>\text{Floor}(\text{Log 2}(sGy2))):0 \quad (8\text{-}818)$$

For x=xSb−1 . . . xSb+2, y=ySb−1 . . . ySb+2, the prediction sample values of the current sub-block are derived as follows:

$$\text{bdofOffset}=(v_x*(\text{gradient}HL0[x+1][y+1]-\text{gradient}HL1\\{[x+1][y+1]))}>>1+(v_y*(\text{gradient}VL0[x+1][y+1]-\\\text{gradient}VL1[x+1][y+1]))>>1 \quad (8\text{-}819)$$

$$pb\text{Samples}[x][y]=\text{Clip3}(0,(2^{bitDepth})-1,(\text{predSam-}\\\text{ples}L0[x+1][y+1]+\text{offset4}+\text{predSamples}L1[x+1]\\{[y+1]}+\text{bdofOffset})>>\text{shift4}) \quad (8\text{-}820)$$

Example

An example of deriving MVD of the lower W*H/2 part from MVD of the upper W*H/2 part in PROF.

The proposed changes on top of JVET-O2001-vE.docx are highlighted in bold and italic and the deleted parts are marked with double brackets (e.g., [[a]] denotes the deletion of the character "a").

8.5.5.9 Derivation Process for Motion Vector Arrays from Affine Control Point Motion Vectors Inputs to this process are:

a luma location (xCb, yCb) of the top-left sample of the current luma coding block relative to the top-left luma sample of the current picture, two variables cbWidth and cbHeight specifying the width and the height of the luma coding block, the number of control point motion vectors numCpMv, the control point motion vectors cpMvLX[cpIdx], with cpIdx=0 . . . numCpMv−1 and X being 0 or 1, the reference index refIdxLX and X being 0 or 1, the number of luma coding subblocks in horizontal direction numSbX and in vertical direction numSbY.

Outputs of this process are:

the luma subblock motion vector array mvLX[xSbIdx][ySbIdx] with xSbIdx=0 . . . numSbX−1, ySbIdx=0 . . . numSbY−1 and X being 0 or 1, the chroma subblock motion vector array mvCLX[xSbIdx][ySbIdx] with xSbIdx=0 . . . numSbX−1, ySbIdx=0 . . . numSbY−1 and X being 0 or 1, the prediction refinement utilization flag cbProfFlagLX and X being 0 or 1, the motion vector difference array diffMvLX[xIdx][yIdx] with xIdx=0 . . . cbWidth/numSbX−1, yIdx=0 . . . cbHeight/numSbY−1 and X being 0 or 1.

. . .

The variable cbProfFlagLX is derived as follows:

If one or more of the following conditions are true, cbProfFlagLX is set equal to FALSE.

sps_affine_prof_enabled_flag is equal to 0.

fallbackModeTriggered is equal to 1.

numCpMv is equal to 2 and cpMvLX[1][0] is equal to cpMvLX[0][0] and cpMvLX[1][1] is equal to cpMvLX[0][1].

numCpMv is equal to 3 and cpMvLX[1][0] is equal to cpMvLX[0][0] and cpMvLX[1][1] is equal to cpMvLX[0][1] and cpMvLX[2][0] is equal to cpMvLX[0][0] and cpMvLX[2][1] is equal to cpMvLX[0][1].

Otherwise, cbProfFlagLX set equal to TRUE.

When cbProfFlagLX is 1, the motion vector difference array diffMv is derived as follows:

The variables sbWidth and sbHeight, dmvLimit, posOffsetX and posOffsetY are derived as follows:

$$\text{sbWidth}=\text{cbWidth}/\text{numSb}X \quad (8\text{-}729)$$

$$\text{sbHeight}=\text{cbHeight}/\text{numSb}Y \quad (8\text{-}730)$$

$$\text{dmvLimit}=1<<\text{Max}(6,\text{BitDepth}_Y-6) \quad (8\text{-}731)$$

$$\text{posOffset}X=6*d\text{Hor}X+6*d\text{Ver}X \quad (8\text{-}732)$$

$$\text{posOffset}Y=6*d\text{Hor}Y+6*d\text{Ver}Y \quad (8\text{-}733)$$

[[For x=0 . . . sbWidth−1 and y=0 . . . sbHeight−1, the following applies:]]

*For x = 0..sbWidth − 1 and y = 0..sbHeight/2 − 1, the following applies:*

$$\text{diffMv}[x][y][0]=x*(d\text{Hor}X<<2)+y*(d\text{Ver}X<<2)-\\\text{posOffset}X \quad (8\text{-}734)$$

$$\text{diffMv}[x][y][1]=x*(d\text{Hor}Y<<2)+y*(d\text{Ver}Y<<2)-\\\text{posOffset}Y \quad (8\text{-}735)$$

For i=0 . . . 1, the following applies:

The rounding process for motion vectors as specified in clause 8.5.2.14 is invoked with mvX set equal to diffMv[x][y][i], rightShift set equal to 7, and leftShift set equal to 0 as inputs and the rounded diffMv[x][y][i] as output.

The value of diffMv[x][y][i] is clipped as follows:

$$[[\text{diffMv}[x][y][i]=\text{Clip3}(-\text{dmvLimit},\text{dmvLimit}-1,\text{diffMv}[x][y][i]) \quad (8\text{-}736)]]$$

$$diffMv[\,x\,][\,y\,][\,i\,] = Clip3\,(\,-dmvLimit + 1,\,dmvLimit - 1,\,diffMv[\,x\,][\,y\,][\,i\,]\,)\;(8\text{-}736)$$

For x = 0..sbWidth – 1 and y = sbHeight/2..sbHeight – 1, the following applies

For i = 0..1, the following applieis:

$$diffMv[\,x\,][\,y\,][\,i\,] = -diffMv\;[\,sbWidth - 1 - x\,][\,sbHeight - 1 - y\,][\,i\,]\;(8\text{-}737)$$

FIG. 12A shows a flowchart of an exemplary method for video processing. Referring to FIG. 12A, the method 1210 includes, at step 1212, determining, for a conversion between a current video block of a video and a coded representation of the video, that a motion information of the current video block is refined using an optical flow-based method in which at least one motion vector offset is derived for a region within the current video block. The method 1210 further includes, at step 1214, clipping the at least one motion vector offset to a range [−N,M], wherein N and M are integers based on a rule. The method 1210 further includes, at step 1216, performing the conversion based on at least one clipped motion vector off.

FIG. 12B shows a flowchart of an exemplary method for video processing. Referring to FIG. 12B, the method 1220 includes, at step 1222, selecting, as a refined motion vector during a decoder-side motion vector refinement (DMVR) operation used to refine motion information, a motion information that is equal to a result of applying a similarity matching function using one or more motion vector differences associated with a current video block of a video. The method 1220 further includes, at step 1224, performing a conversion between the current video block and a coded representation of the video using the refined motion vector.

FIG. 12C shows a flowchart of an exemplary method for video processing. Referring to FIG. 12C, the method 1230 includes, at step 1232, deriving, for a conversion between a current video block of a video and a coded representation of the video, motion information associated with the current video block. The method 1230 further includes, at step 1234, applying a refinement operation to the current video block including a first sub-region and a second sub-region according to a rule, such that the rule permits the first sub-region and the second sub-region to have different motion information from each other due to the refinement operation. The method 1230 further includes, at step 1236, performing the conversion using refined motion information of the current video block.

FIG. 12D shows a flowchart of an exemplary method for video processing. Referring to FIG. 12D, the method 1240 includes, at step 1242, deriving, for a conversion between a current video block of a video and a coded representation of the video, motion information associated with the current video block. The method 1240 further includes, at step 1244, determining, for a sub-region of the current video block, an applicability of a refinement operation using a bi-directional optical flow (BIO) based on an output of a decoder-side motion vector refinement (DMVR) used to refine the motion information. The method 1240 further includes, at step 1246, performing the conversion based on the determining.

FIG. 12E shows a flowchart of an exemplary method for video processing. Referring to FIG. 12E, the method 1250 includes, at step 1252, deriving motion information associated with a current video block coded with a merge mode with motion vector difference (MMVD) that includes a motion vector expression including a distance table specifying a distance between two motion candidates. The method 1250 further includes, at step 1254, applying a decoder-side motion vector refinement (DMVR) to the current video block to refine the motion information according to a rule specifying how to refine the distance used for the MMVD. The method 1250 further includes, at step 1256, performing a conversion between the current video block and a coded representation of the video.

Figure 12F:
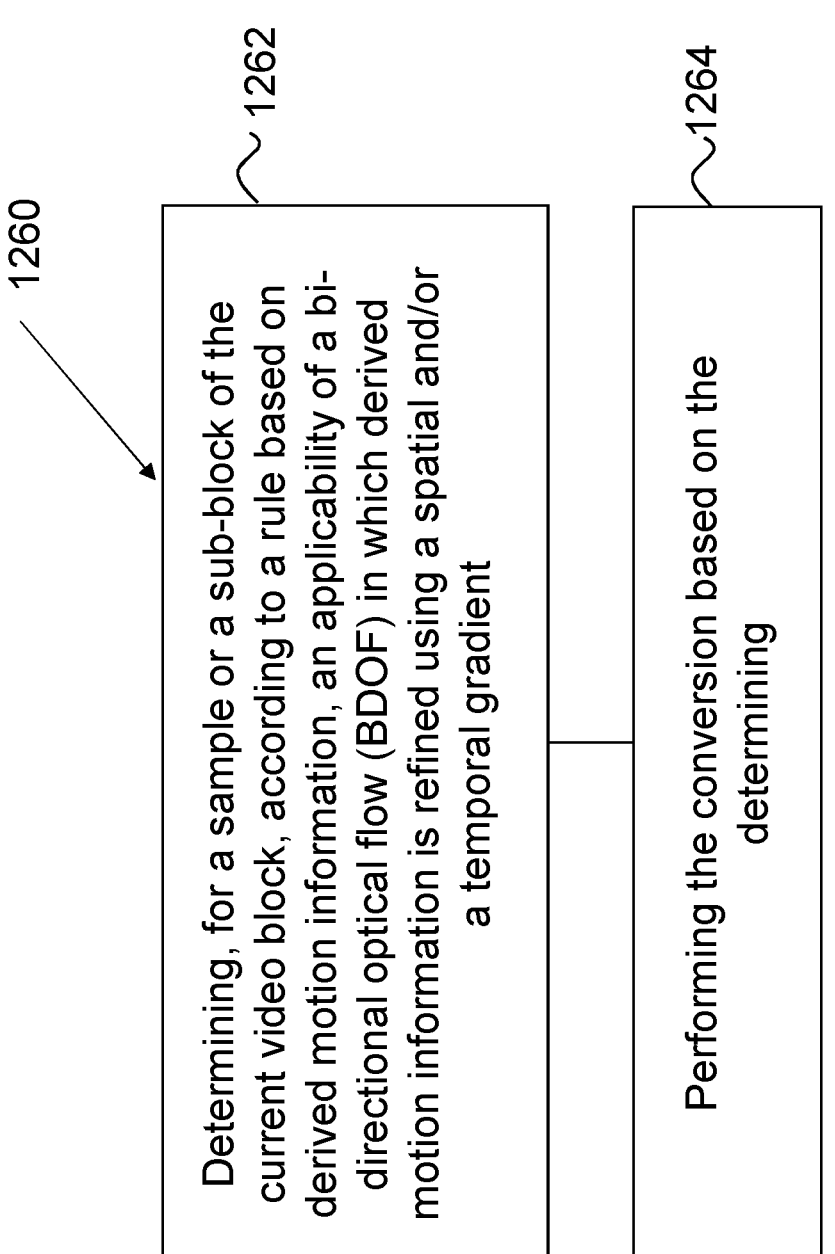

FIG. 12F shows a flowchart of an exemplary method for video processing. Referring to FIG. 12F, the method 1260 includes, at step 1262, determining, for a sample or a sub-block of the current video block, according to a rule based on derived motion information, an applicability of a bi-directional optical flow (BDOF) in which derived motion information is refined using a spatial and/or a temporal gradient. The method 1260 further includes, at step 1264, performing the conversion based on the determining.

FIG. 13A shows a flowchart of an exemplary method for video processing. Referring to FIG. 13A, the method 1310 includes, at step 1311, deriving, for a conversion between a current a current video block of a video and a coded representation of the video, a motion vector difference (MVD). The method 1310 further includes, at step 1312, applying a clipping operation to a derived motion vector difference to generate a clipped motion vector difference. The method 1310 further includes, at step 1313, calculating a cost of the clipped motion vector difference using a cost function. The method 1310 further includes, at step 1314, determining, according to a rule based on at least one of the derived motion vector difference, the clipped motion vector difference, or the cost, to disallow a bi-directional optical flow (BDOF) operation in which the derive motion vector difference is refined using a spatial and/or a temporal gradient. The method 1310 further includes, at step 1315, performing the conversion based on the determining.

Figure 13B:
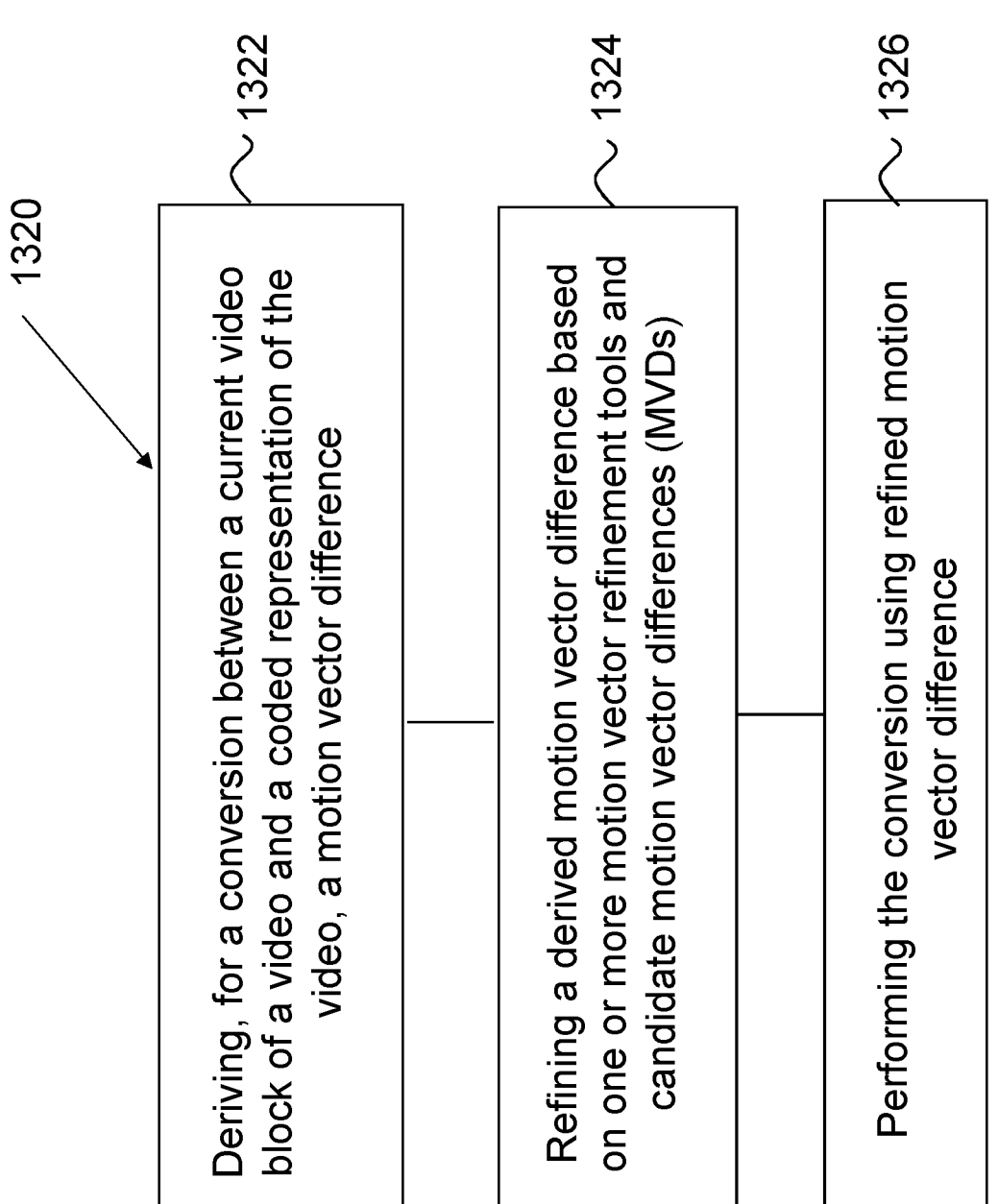

FIG. 13B shows a flowchart of an exemplary method for video processing. Referring to FIG. 13B, the method 1320 includes, at step 1322, deriving, for a conversion between a current video block of a video and a coded representation of the video, a motion vector difference. The method 1320 further includes, at step 1324, refining a derived motion vector difference based on one or more motion vector refinement tools and candidate motion vector differences (MVDs). The method 1320 further includes, at step 1326, performing the conversion using refined motion vector difference.

FIG. 13C shows a flowchart of an exemplary method for video processing. Referring to FIG. 13C, the method 1330 includes, at step 1332, restricting a derived motion vector difference associated with a current video block to a candidate set, the derived motion vector difference is used for a refinement operation to refine motion information associated with the current video block. The method 1330 further includes, at step 1334, performing a conversion between a current video block of a video and a coded representation of the video using the derived motion vector difference as a result of the restricting.

FIG. 13D shows a flowchart of an exemplary method for video processing. Referring to FIG. 13D, the method 1340 includes, at step 1342, applying, during a bi-directional optical flow (BDOF) operation used to refine motion information associated with a current video block of a video unit of a video, a clipping operation using a set of clipping parameters that is determined according to a rule based on the video unit and/or usage of coding tool in the video unit. The method 1340 further includes, at step 1344, performing a conversion between the current video block and a coded representation of the video.

FIG. 13E shows a flowchart of an exemplary method for video processing. Referring to FIG. 13E, the method 1350 includes, at step 1352, applying, during a refinement operation used to refine motion information associated with a current video block of a video, a clipping operation according to a rule to clip x component and/or y component of a motion vector difference (vx, vy). The method 1350 further includes, at step 1354, performing a conversion between the current video block and a coded representation of the video using the motion vector difference. In some implementations, the rule specifies to convert the motion vector difference to zero or a value in a form of $K^{-m}$ before or after the clipping operation, whereby m is an integer.

FIG. 13F shows a flowchart of an exemplary method for video processing. Referring to FIG. 13F, the method 1360 includes, at step 1362, selecting, for a conversion between a current video block of a video and a coded representation of the video, a search region used to derive or refine motion information during a decoder-side motion derivation operation or a decoder-side motion refinement operation according to a rule. The method 1360 further includes, at step 1364, performing the conversion based on derived or refined motion information.

FIG. 14A shows a flowchart of an exemplary method for video processing. Referring to FIG. 14A, the method 1410 includes, at step 1412, applying, for a conversion between a current video block of a video and a coded representation of the video, a decoder-side motion vector difference (DMVR) operation to refine a motion vector difference associated with the current video block by using a search region used in the refining including a best matching integer position. The method 1410 further includes, at step 1414, performing the conversion using refined motion vector difference, wherein the applying of the DMVR operation includes deriving a sub-pel motion vector difference (MVD) according to a rule.

Figure 14B:
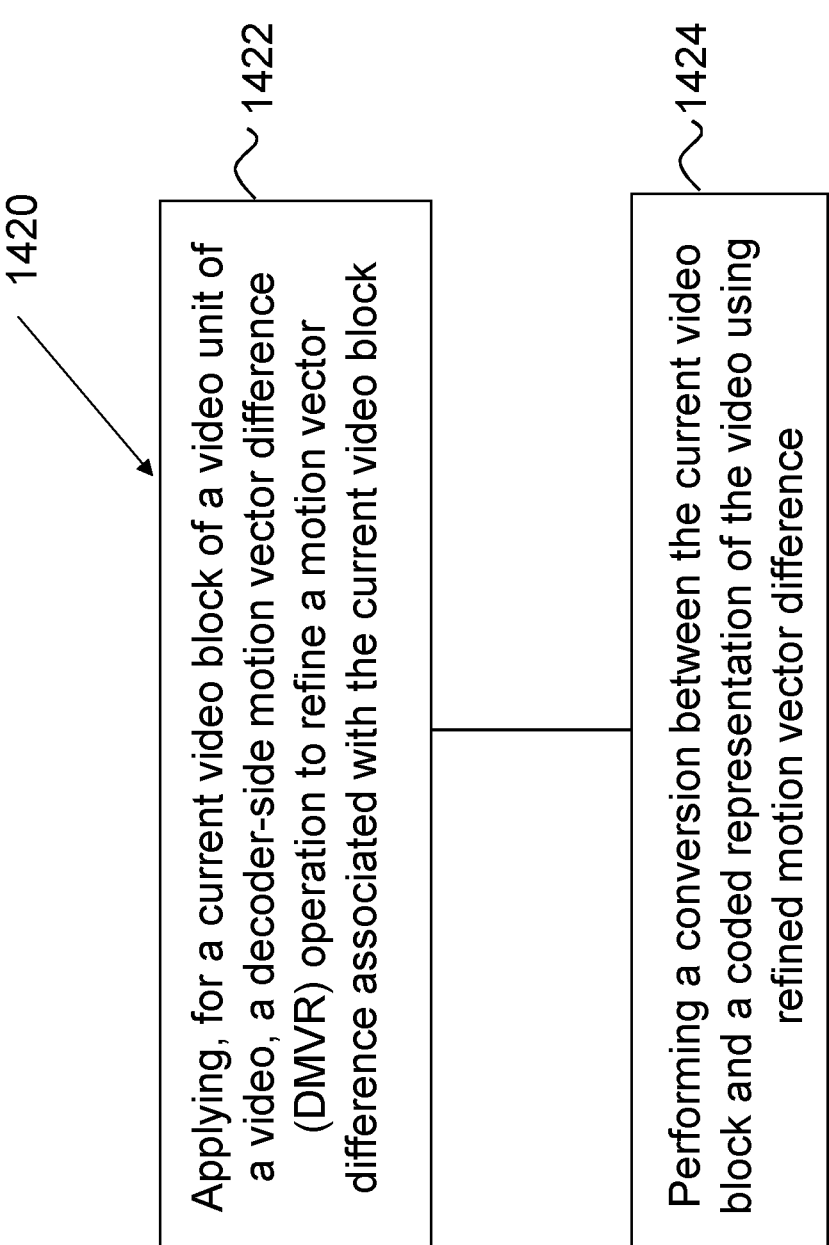

FIG. 14B shows a flowchart of an exemplary method for video processing. Referring to FIG. 14B, the method 1420 includes, at step 1422, applying, for a current video block of a video unit of a video, a decoder-side motion vector difference (DMVR) operation to refine a motion vector difference associated with the current video block. The method 1420 further includes, at step 1424, performing a conversion between the current video block and a coded representation of the video using refined motion vector difference. In some implementations, the applying of the DMVR operation includes determining to allow or disallow a sub-pel motion vector difference (MVD) derivation depending on use of a bi-directional optical flow (BDOF) for the video unit.

FIG. 14C shows a flowchart of an exemplary method for video processing. Referring to FIG. 14C, the method 1430 includes, at step 1432, deriving, during a refinement operation using an optical flow, a motion vector difference of a first sample of a current video block of a video. The method 1430 further includes, at step 1434, determining a motion vector difference of a second sample based on a derived motion vector difference of the first sample. The method 1430 further includes, at step 1436, performing a conversion between the current video block and a coded representation of the video based on the determining.

FIG. 14D shows a flowchart of an exemplary method for video processing. Referring to FIG. 14D, the method 1440 includes, at step 1442, deriving a prediction refinement sample by applying a refinement operation using a bi-directional optical flow (BDOF) operation to a current video block of a video. The method 1440 further includes, at step 144, determining, according to a rule, an applicability of a clipping operation to clip the derived prediction refinement sample to a predetermined range [−M, N], whereby M and N are integers. The method 1440 further includes, at step 1446, performing a conversion between the current video block and a coded representation of the video.

FIG. 14E shows a flowchart of an exemplary method for video processing. Referring to FIG. 14E, the method 1450 includes, at step 1452, determining coding group sizes for a current video block including a first coding group and a second coding group that are coded using different residual coding modes such that sizes of the first coding group and the second coding group are aligned according to a rule. The method 1450 further includes, at step 1454, performing a conversion between the current video block and a coded representation of the video based on the determining.

FIG. 14F shows a flowchart of an exemplary method for video processing. Referring to FIG. 14F, the method 1460 includes, at step 1462, determining, for a conversion between a current video block of a video and a coded representation of the video, an applicability of a prediction refinement optical flow (PROF) tool in which motion information is refined using an optical flow, based on coded information and/or decoded information associated with the current video block. The method 1460 further includes, at step 1464, performing the conversion based on the determining.

Figure 15:
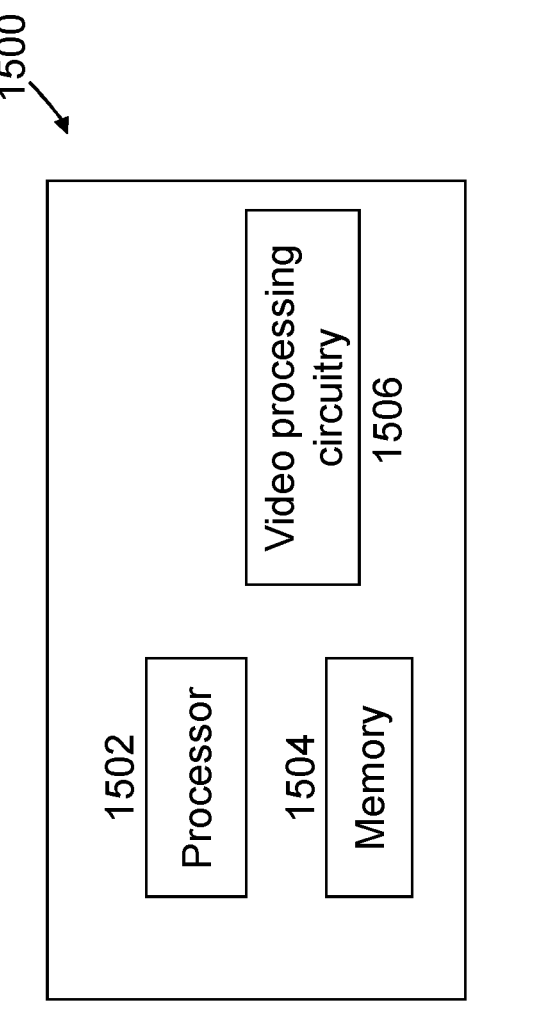
FIG. 15 is a block diagram for an example of a hardware platform for implementing a visual media decoding or a visual media encoding technique described in the present disclosure.

FIG. 15 is a block diagram of a video processing apparatus 1500. The apparatus 1500 may be used to implement one or more of the methods described herein. The apparatus 1500 may be embodied in a smartphone, tablet, computer, Internet of Things (IoT) receiver, and so on. The apparatus 1500 may include one or more processors 1502, one or more memories 1504 and video processing hardware 1506. The processor(s) 1502 may be configured to implement one or more methods (including, but not limited to, methods as shown in FIGS. 12A to 14F) described in the present disclosure. The memory (memories) 1504 may be used for storing data and code used for implementing the methods and techniques described herein. The video processing hardware 1506 may be used to implement, in hardware circuitry, some techniques described in the present disclosure.

Figure 16:
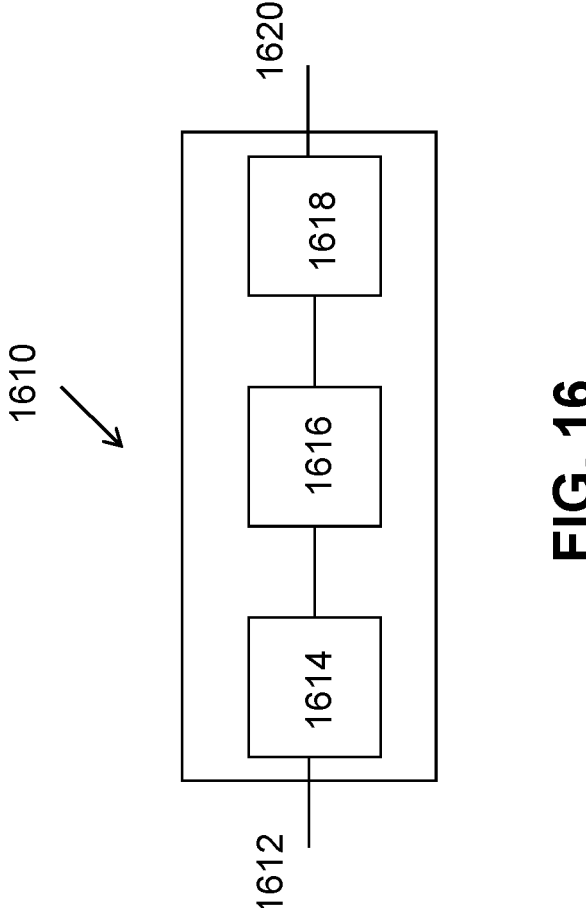
FIG. 16 is a block diagram of a video processing system.

FIG. 16 is another example of a block diagram of a video processing system in which disclosed techniques may be implemented. FIG. 16 is a block diagram showing an example video processing system 1610 in which various techniques disclosed herein may be implemented. Various implementations may include some or all of the components of the system 1610. The system 1610 may include input 1612 for receiving video content. The video content may be received in a raw or uncompressed format, e.g., 8 or 10 bit multi-component pixel values, or may be in a compressed or encoded format. The input 1612 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 1610 may include a coding component 1614 that may implement the various coding or encoding methods described in the present disclosure. The coding component 1614 may reduce the average bitrate of video from the input 1612 to the output of the coding component 1614 to produce a coded representation of the video. The coding techniques are therefore sometimes called video compression or video transcoding techniques. The output of the coding component 1614 may be either stored, or transmitted via a communication connected, as represented by the component 1616. The stored or communicated bitstream (or coded) representation of the video received at the input 1612 may be used by the component 1618 for generating pixel values or displayable video that is sent to a display interface 1620. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a video block may be encoded in terms of transformed and coded error residual values and also using bits in headers and other fields in the bitstream. Herein, a video block is a group of pixels corresponding to an operation, e.g., a coding unit or a transform unit or a prediction unit, and so on.

Various techniques and embodiments may be described using the following clause-based format.

The first set of clauses describe certain features and aspects of the disclosed techniques in the previous section.

1. A method for video processing, comprising: deriving motion information associated with a video processing unit during a conversion between the video processing unit and a bitstream representation of the video processing unit; determining, for a sub-region of the video processing unit to which a refinement operation is applied, whether to refine the motion information; and applying, based on the determining, the refinement operation to the video processing unit to refine the motion information.

2. The method of clause 1, wherein the refinement operation includes a decoder side motion vector derivation operation, a decoder-side motion vector refinement (DMVR) operation, a sample refinement operation, or a prediction refinement operation based on an optical flow.

3. The method of clause 1, wherein the determining is based on coding information associated with the video processing unit.

4. The method of clause 3, wherein the coding information associated with the video processing unit includes at least one of motion vectors, picture order count (POC) values of reference pictures, a merge index, a motion vector predictor (MVP) index, or whether a SBT mode is employed by the video processing unit.

5. The method of clause 1, wherein the determining is based on a relationship between a first motion vector referring to a first reference list and a second motion vector referring to second reference list, the first motion vector and the second motion vector obtained before the applying of the refinement operation.

6. The method of clause 1, wherein the applying of the refinement operation is performed in multiple steps with refined regions having a size determined based on the number of steps of the multiple steps.

7. The method of clause 1, wherein the applying of the refinement operation includes: applying the refinement operation to a first sub-region; and applying the refinement operation to a second sub-region different from the first sub-region, wherein refined motion information within the video processing unit is different from each other in the first and second sub-regions.

8. The method of clause 1, further including determining whether to apply bi-directional optical flow (BIO) based on an outcome of the refinement operation.

9. The method of clause 1, wherein the applying of the refinement operation includes selecting N pairs of MVDs (Motion Vector Differences) to generate a final prediction sample, wherein N is a natural number greater than 1 and each pair includes two motion vector differences for different lists.

10. The method of clause 1, wherein the refinement operation is used together with MMVD (merge with MVD) and a MMVD distance is maintained as certain values during the refinement operation.

11. The method of clause 1, further comprising disabling a BDOF for a sample or a sub-block of the video processing unit based on at least one of derived MVD, spatial gradients, or temporal gradients.

12. The method of clause 1, further comprising calculating a cost for a clipped MVD when derived MVD in BDOF is changed after a clipping operation.

13. The method of clause 1, wherein the conversion includes generating the bitstream representation from the current video processing unit or generating the current video processing unit from the bitstream representation.

14. A method for video processing, comprising: obtaining motion information associated with a video processing unit; determining, for a sub-region of the video processing unit, whether to refine the motion information of the video processing unit, the video processing unit being a unit for applying a refinement operation; and using, based on the determining, the motion information without applying the refinement operation on the processing block.

15. The method of clause 14, wherein the refinement operation includes a decoder side motion vector derivation operation, a decoder-side motion vector refinement (DMVR) operation, a sample refinement operation, or a prediction refinement operation based on an optical flow.

16. The method of clause 14, wherein the determining is based on coding information associated with the video processing unit, the coding information includes at least one of motion vectors, picture order count (POC) values of reference pictures, a merge index, a motion vector predictor (MVP) index, or whether a SBT mode is employed by the video processing unit.

17. The method of clause 14, wherein the refinement operation including bi-directional optical flow (BIO) is omitted when the video processing unit is coded with advanced motion vector prediction (AMVP) mode.

18. The method of clause 14, wherein the refinement operation is omitted based on sum of two motion vectors or absolute values of MV components.

19. The method of clause 14, wherein the refinement operation is omitted when a SBT mode is employed by the video processing unit.

20. The method of clause 14, wherein the determining is based on a relationship between a first motion vector referring to a first reference list and a second motion vector referring to second reference list, the first motion vector and the second motion vector obtained before the applying of the refinement operation.

21. The method of clause 14, further comprising disabling a BDOF for a sample or a sub-block of the video processing unit based on at least one of derived MVD, spatial gradients, or temporal gradients.

22. The method of clause 14, further comprising calculating a cost for a clipped MVD when derived MVD in BDOF is changed after a clipping operation.

23. A method of video processing, comprising: refining, during a conversion between a current video block and a bitstream representation of the current video block, a derived motion vector difference based on one or more motion vector refinement tools and candidate motion vector differences (MVDs); and performing the conversion using the derived motion vector difference and a motion vector that is signaled in the bitstream representation.

24. The method of clause 23, wherein the refining comprises a two-step process comprising a first step in which a modified y component and an unmodified x component MVD is used and a second step in which a modified x component and an unmodified y component MVD is used.

25. The method of clause 23, wherein the candidate MVDs include $(v_x+\text{offsetX}, v_y)$ wherein offsetX being in the range [−ThX1, ThX2] wherein ThX1 and ThX2 are non-negative integer values, wherein the derived MVD is $(v_x, v_y)$.

26. The method of clause 23, wherein the candidate MVDs include $(v_x, v_y+\text{offsetY})$ wherein offsetY being in the range [−ThY1, ThY2] wherein ThY1 and ThY2 are non-negative integer values, wherein the derived MVD is $(v_x, v_y)$.

27. The method of any of clauses 23-26, wherein the conversion uses a bidirectional optical flow coding tool.

28. A method of video processing, comprising: restricting, during a conversion between a current video block and a bitstream representation of the current video block, a derived motion vector difference (DMVD) to a candidate set; and performing the conversion using a result of restricting the DMVD to the candidate set.

29. The method of clause 28, wherein the candidate includes candidates $(v_x, v_y)$ with with $v_x$ and/or $v_y$ that are in the form of $K^m$, wherein m is an integer.

30. A method of video processing, comprising: determining, for a conversion between a bitstream representation of a current video block of a video and the current video block, that a motion vector difference value is clipped to a range [−N,M], wherein N and M are integers. The determination of clipping is performed based on a rule, as further described herein. The method further includes performing the conversion based on the determining, wherein the rule specifies to use the same range for conversion using a prediction refinement optical flow (PROF) and a bi-directional optical flow tool.

31. The method of clause 30, wherein N=M=31.

32. The method of clause 30, wherein N=M=255.

33. A method of video processing, comprising: determining, for a conversion between a bitstream representation of a current video block of a video and the current video block, a motion vector difference of a first sample based on a motion vector difference of a second sample of the current video block; and performing the conversion based on the determining; wherein the conversion is based on an optical flow coding or decoding tool.

34. The method of clause 33, wherein the first sample and the second sample use different optical flow coding tools.

35. A method of video processing, comprising: determining whether to enable use of a prediction refinement optical flow (PROF) tool for a conversion between a bitstream representation of a current video block and the current video block wherein the conversion uses an optical flow coding tool; and performing the conversion based on the determining.

36. The method of clause 35, wherein the determining disables use of the PROF tool due to a reference picture used in the conversion having a different dimension than a dimension of a current picture that contains the current video block.

37. The method of any of clauses 35-36, wherein the determining enables the PROF tool due to the conversion using bi-predictive prediction and both reference pictures having same dimensions.

38. The method of any of clauses 1 to 37, wherein the conversion comprises generating the bitstream representation by encoding the current video block.

39. The method of any of clauses 1 to 37, wherein the conversion comprises generating the current video block by decoding the bitstream representation.

40. An apparatus in a video system comprising a processor and a non-transitory memory with instructions thereon, wherein the instructions upon execution by the processor, cause the processor to implement the method in any one of clauses 1 to 39.

41. A computer program product stored on a non-transitory computer readable media, the computer program product including program code for carrying out the method in any one of clauses 1 to 39.

The second set of clauses describe certain features and aspects of the disclosed techniques in the previous section.

1. A video processing method, comprising: determining, for a conversion between a current video block of a video and a coded representation of the video, that a motion information of the current video block is refined using an optical flow-based method in which at least one motion vector offset is derived for a region within the current video block; clipping the at least one motion vector offset to a range [−N,M], wherein N and M are integers based on a rule; and performing the conversion based on at least one clipped motion vector offset.

2. The method of clause 1, wherein the motion vector offset is used to refine reference samples for the region within the current video block.

3. The method of clause 1, wherein the optical flow-based method comprises at least one of a prediction refinement optical flow (PROF) method applied to blocks with affine motion model or a bi-directional optical flow (BDOF) method.

4. The method of clause 1, wherein the region within the current video block is the whole current video block or a sub-block within the current video block.

5. The method of clause 1, wherein the rule specifies to use a same range or different ranges for the conversion using a PROF method in which the at least one motion vector offset is derived using an optical flow calculation and a BDOF method in which the at least one motion vector offset is derived using a spatial gradient and/or temporal gradient.

6. The method of clause 1, wherein the motion vector offset comprises a horizontal component and a vertical component, and wherein the clipping of the at least one motion vector offset comprises clipping horizontal component and/or vertical component to the range.

7. The method of clause 1, wherein N and M have a same value which is unequal to $2^K$ whereby K is an integer.

8. The method of clause 7, wherein the same value is equal to $(2^K-1)$, whereby K is an integer.

9. The method of clause 7, wherein the same value is one of 31, 63, 15, 7, 3, 127, or 255.

10. The method of clause 7, wherein M is equal to N and 2*M is not equal to a value of $2^K$, whereby K is an integer.

11. The method of any of clauses 1 to 10, wherein the rule specifies that the motion vector offset is clipped to one of [−31, 31], [−15, 15], [−63, 63], or [−127, 127] for the conversion using the BDOF.

12. The method of any of clauses 1 to 10, wherein the rule specifies that the motion vector offset is clipped to one of [−63, 63] or [−31, 31] for the conversion using the PROF.

13. The method of clause 1, wherein M is not equal to N and a sum of M and N is not equal to a value of $2^K$, whereby K is an integer.

14. A video processing method, comprising: selecting, as a refined motion vector during a decoder-side motion vector refinement (DMVR) operation used to refine motion information, a motion information that is equal to a result of applying a similarity matching function using one or more motion vector differences associated with a current video block of a video; and performing a conversion between the current video block and a coded representation of the video using the refined motion vector.

15. The method of clause 14, wherein the similarity matching function includes a mean removed sum of absolute differences (MRSAD), a sum of absolute differences (SAD), or a sum of absolute transformed differences (SATD).

16. The method of clause 14, wherein the motion information is modified by performing one of multiplying, dividing, adding, or subtracting using a scaling factor.

17. The method of clause 16, wherein the scaling factor is dependent on motion vector difference (MVD) sets that are allowed according to a rule and within a range [−M, N], whereby M and N are integers greater than 0.

18. A video processing method, comprising: making a decision regarding an application of a refinement operation to refine a motion information based on a characteristic of the current video block; and performing the conversion based on the determining.

19. The method of clause 18, wherein the refinement operation includes at least one of a decoder side motion vector derivation operation, a decoder-side motion vector refinement (DMVR) operation, a sample refinement operation, or a prediction refinement operation based on an optical flow.

20. The method of clause 18, wherein the characteristic of the current video block corresponds to a coding information of the current video block.

21. The method of clause 20, wherein the coding information of the current video block includes at least one of motion vectors, picture order count (POC) values of reference pictures, a merge index, a motion vector predictor (MVP) index, or whether a sub-block transform (SBT) mode is employed by the current video block.

22. The method of clause 20, wherein the coding information of the current video block includes whether the current video block is coded with an advanced motion vector prediction (AMVP) mode or a merge mode.

23. The method of clause 20, wherein the refinement operation corresponds to a decoder-side motion vector refinement (DMVR) operation and/or a bi-directional optical flow (BDOF) operation and wherein the refinement operation is enabled depending on sum of two motion vectors or absolute values of motion vectors.

24. The method of clause 20, wherein the refinement operation corresponds to a decoder-side motion vector refinement (DMVR) operation and/or a bi-directional optical flow (BDOF) operation and wherein the refinement operation is allowed according to a rule that specifies a merge index or a motion vector predictor (MVP) index.

25. The method of clause 20, wherein the refinement operation corresponds to a decoder-side motion vector refinement (DMVR) operation and/or a bi-directional optical flow (BDOF) operation and wherein the refinement operation is disallowed in a case that the SBT mode is employed by the current video block.

26. The method of clause 20, wherein the refinement operation corresponds to a decoder-side motion vector refinement (DMVR) operation and/or a bi-directional optical flow (BDOF) operation and wherein the refinement operation is allowed or disallowed for sub-partitions with non-zero residual in the sub-block transform mode.

27. The method of clause 18, wherein the characteristic of the current video block corresponds to a relationship between a first motion vector referring to a first reference list and a second motion vector referring to second reference list, the first motion vector and the second motion vector obtained before the applying of the refinement operation.

28. The method of clause 27, wherein the refinement operation is disabled according to a rule depending on a degree of a symmetry between the first motion vector and the second motion vector are symmetric.

29. The method of clause 28, wherein the degree of the symmetry is determined as i) symmetric in which a sum of MV0 and MV1 has only zero components, ii) nearly symmetric in which abs(MV0+MV1)<Th1, or iii) far from symmetric in which abs(MV0+MV1)>Th2, whereby MV0 and MV1 correspond to the first motion vector and the second motion vector, respectively, and Th1 and Th2 are integers.

30. The method of clause 28, wherein the degree of the symmetry is determined based on picture order count (POC) values of reference pictures of the current video block.

31. The method of clause 18, wherein the determining determines applying the refinement operation in multiple steps such that a size of a refined region for a Nth refinement step is reduced with an increase of a value of N, whereby N is an integer greater than 0.

32. The method of clause 18, wherein the decision includes applying the refinement operation by selecting N pairs of motion vector differences to generate a final prediction sample, whereby N is an integer greater than 1 and each pair of the motion vector differences includes two motion vector differences for different lists.

33. The method of clause 32, wherein N is 2.

34. The method of clause 32, wherein pairs of the motion vector differences are selected for each sub-region of the current video block.

35. A video processing method, comprising: deriving, for a conversion between a current video block of a video and a coded representation of the video, motion information associated with the current video block; applying a refinement operation to the current video block including a first sub-region and a second sub-region according to a rule, such that the rule permits the first sub-region and the second sub-region to have different motion information from each other due to the refinement operation; and performing the conversion using refined motion information of the current video block.

36. The method of clause 35, wherein the first sub-region has decoded motion information and the second sub-region has refined motion information derived during the refinement operation applied to a video region covering the second sub-region.

37. A video processing method, comprising: deriving, for a conversion between a current video block of a video and a coded representation of the video, motion information associated with the current video block; determining, for a sub-region of the current video block, an applicability of a refinement operation using a bi-directional optical flow (BIO) based on an output of a decoder-side motion vector refinement (DMVR) used to refine the motion information; and performing the conversion based on the determining.

38. The method of clause 37, wherein the determining determines to disable the refinement operation using the BIO in a case that the motion information refined by the DMVR is remained unchanged for the sub-region.

39. A video processing method, comprising: deriving motion information associated with a current video block coded with a merge mode with motion vector difference (MMVD) that includes a motion vector expression including a distance table specifying a distance between two motion candidates; applying a decoder-side motion vector refinement (DMVR) to the current video block to refine the motion information according to a rule specifying how to refine the distance used for the MMVD; and performing a conversion between the current video block and a coded representation of the video.

40. The method of clause 39, wherein the rule specifies that refined distance by the DMVR is not included in the distance table.

41. The method of clause 39, wherein the rule specifies to disallow the DMVR in a case that refined distance or a rough refined distance by the DMVR is included in the distance table, the rough refined distance generated by adding a best integer motion vector difference to the distance.

42. The method of clause 39, the rule specifies to allow the DMVR for all distances under certain conditions.

43. A video processing method, comprising: determining, for a sample or a sub-block of the current video block, according to a rule based on derived motion information, an applicability of a bi-directional optical flow (BDOF) in which derived motion information is refined using a spatial and/or a temporal gradient; and performing the conversion based on the determining.

44. The method of clause 43, wherein the derived motion information includes at least one of motion vector difference, a spatial gradient, or a temporal gradient.

45. The method of clause 43, wherein the rule specifies to disallow the BDOF for the sample due to the derived motion information that increases a difference between a prediction sample in a first reference list and a prediction sample in a second reference list.

46. The method of clause 43, wherein the rule specifies to disallow the BDOF for the sample or the sub-block due to the derive motion information that increases a difference between a prediction sub-block in a first reference list and a prediction sub-block in a second reference list.

47. The method of clause 43, wherein the derived motion information corresponds to a derived offset and the derived offset is scaled by a factor to be used for the determining.

48. A video processing method, comprising: deriving, for a conversion between a current a current video block of a video and a coded representation of the video, a motion vector difference (MVD); applying a clipping operation to a derived motion vector difference to generate a clipped motion vector difference; calculating a cost of the clipped motion vector difference using a cost function; determining, according to a rule based on at least one of the derived motion vector difference, the clipped motion vector difference, or the cost, to disallow a bi-directional optical flow (BDOF) operation in which the derive motion vector difference is refined using a spatial and/or a temporal gradient; and performing the conversion based on the determining.

49. The method of clause 48, wherein the calculating is performed in a case that the derived motion vector difference (vx, vy) is changed to (clipVx, clipVy) after the clipping operation, whereby (clipVx, clipVy) is different from (vx, vy).

50. The method of clause 48, wherein the rule specifies to disallow the BDOF in a case that 1) costClipMvd>Th*costZeroMvd, BDOF or 2) costClipMvd>Th*costDerivedMvd, whereby costDerivedMvd and costClipMvd correspond to costs of the derived motion vector difference and the clipped motion vector difference, respectively.

51. The method of clause 48, wherein the rule specifies to disallow the BDOF in a case that at least one of vx and vy is changed after the clipping operation, whereby (vx, vy) is the derived motion vector difference.

52. The method of clause 48, wherein the rule specifies to disallow the BDOF based on an absolute difference of at least one of x component and y component of the derived motion vector difference, (vx, vy), and the clipped motion vector difference, (clipVx, clipVy).

53. The method of clause 48, wherein the calculating of the cost is performed for certain motion vector differences and a final motion vector difference is determined as one having a minimum cost value.

54. The method of clause 48, wherein a horizontal motion vector difference and a vertical motion vector difference are determined in a case that the motion vector difference is changed after the clipping operation.

55. The method of clause 48, wherein, for multiple motion vector differences having a common part in cost functions, the calculating is performed not to repeat the common part.

56. The method of clause 48, wherein for multiple motion vector differences having a common part in cost functions, the common part is removed from the cost functions before the calculating.

57. A video processing method, comprising: deriving, for a conversion between a current video block of a video and a coded representation of the video, a motion vector difference; refining a derived motion vector difference based on one or more motion vector refinement tools and candidate motion vector differences (MVDs); and performing the conversion using refined motion vector difference.

58. The method of clause 57, wherein the refining is performed to include a first step in which a modified y component and an unmodified x component MVD is used and a second step in which a modified x component and an unmodified y component MVD is used.

59. The method of clause 57, wherein the candidate MVDs include (vx+offsetX, vy) wherein offsetX being in the range [−ThX1, ThX2] wherein ThX1 and ThX2 are non-negative integer values, wherein the derived MVD is (vx, vy).

60. The method of clause 57, wherein the candidate MVDs include (vx, vy+offsetY) wherein offsetY being in the range [−ThY1, ThY2] wherein ThY1 and ThY2 are non-negative integer values, wherein the derived MVD is (vx, vy).

61. The method of clause 57, wherein the derived MVD is (vx, vy) and wherein either vx or vy is refined first.

62. The method of clause 57, wherein the derived MVD is (vx, vy) and wherein vx and vy are refined together.

63. The method of clause 57, wherein the derived MVD is (vx, vy) and wherein a same number of candidate MVDs are derived from vx and vy.

64. The method of clause 57, wherein a refined motion vector difference provides a minimum cost value obtained using a cost function.

65. A video processing method, comprising: restricting a derived motion vector difference associated with a current video block to a candidate set, the derived motion vector difference is used for a refinement operation to refine motion information associated with the current video block; and performing a conversion between a current video block of a video and a coded representation of the video using the derived motion vector difference as a result of the restricting.

66. The method of clause 65, wherein the candidate set includes a number of allowed horizontal MVDs candidates that is smaller than a value of (1+MVDmaxX−MVDminX) and/or a number of allowed vertical MVDs candidates that is smaller than a value of (1+MVDmaxY−MVDminY), and wherein maximum and minimum values of a horizontal MVD are denoted by MVDmaxX and MVDminX, respectively, and maximum and minimum values of a vertical MVD are denoted by MVDmaxY and MVDminY, respectively.

67. The method of clause 65, wherein the candidate set includes a candidate, (vx, vy), that is obtained using an equation during the refinement operation, and the candidate satisfies that 1) at least one of vx and vy is in the form of $K^m$, whereby m is an integer, or 2) at least one of vx and vy is zero.

68. The method of clause 65, wherein the candidate set includes a candidate, $(\Delta v_x(x,y), \Delta v_y(x,y))$, that is obtained using an equation during the refinement operation, and wherein the candidate satisfies that 1) at least one of $\Delta v_x(x,y)$ and $\Delta v_y(x,y)$ is in the form of $K^m$, whereby m is an integer, or 2) at least one of $\Delta v_x(x,y)$ and $\Delta v_y(x,y)$ is zero.

69. The method of clause 65, wherein the candidate set includes a candidate, (vx, vy) or $(\Delta v_x(x,y), \Delta v_y(x,y))$, that is obtained using an equation during the refinement operation, and wherein the candidate satisfies 1) an absolute value of at least one of vx, vy, $\Delta v_x(x,y)$ and $\Delta v_y(x,y)$ is zero, or 2) at least one of vx, vy, $\Delta v_x(x,y)$ and $\Delta v_y(x,y)$ is in the form of $K^m$, whereby m is an integer.

70. The method of clause 65, wherein the candidate set includes a candidate, (vx, vy) or $(\Delta v_x (x,y), \Delta v_y(x,y))$, that is obtained using an equation during the refinement operation, and wherein the candidate satisfies 1) at least one of vx, vy, $\Delta v_x(x,y)$ and $\Delta v_y(x,y)$ is zero, or 2) at least one of vx, vy, $\Delta v_x(x,y)$ and $\Delta v_y(x,y)$ is in the form of $K^m$ or $−K^m$, whereby m is an integer.

71. The method of clause 65, wherein the derived motion vector difference is firstly derived as an initially derived motion vector without being restricted to the candidate set and then modified to be restricted to the candidate set.

72. The method of clause 71, wherein the initially derived motion vector difference and the modified motion vector difference are denoted by X and X' and wherein X is set equal to abs(vx) or abs(vy) and X' is obtained from X using a sign(vx) or sign(vy), whereby abs(t) corresponds to an absolute function that returns to an absolute value of t and sign(t) corresponds to a sign function that returns a value depending on a sign of t.

73. The method of clause 71, wherein the candidate set has values that are power of K and dependent on at least one of vx and vy, whereby the derived motion vector difference is (vx, vy).

74. The method of clause 71, wherein the derived motion vector difference is (vx, vy) and at least one of vx and vy is firstly modified.

75. The method of clause 71, wherein the initially derived motion vector is modified by using a log K(x) function and a ceil(y) function, whereby log K(x) returns a logarithm of x in base K and ceil(y) returns the smallest integer greater than or equal to y.

76. The method of clause 71, wherein the initially derived motion vector is modified by using a floor(y) function, whereby floor(y) returns the largest integer less than or equal to y.

77. The method of clause 71, wherein the initially derived motion vector is modified by using a predefined look-up table.

78. The method of clause 65, wherein only candidates in the candidate set are checked to derive motion vector differences.

79. The method of clause 78, wherein the candidate set includes candidate MVD (motion vector difference) values that are in a form of $K^N$, $-K^N$, or zero, whereby K is an integer greater than 0 and N is an integer.

80. The method of clause 79, wherein the candidate set includes candidate MVD (motion vector difference) values that are in a form of $M/K^N$, whereby M is an integer.

81. The method of clause 79, wherein the candidate set includes candidate MVD (motion vector difference) values that is zero or in a form of $K^M/K^N$, whereby M and N are integers.

82. The method of clause 65, wherein the derived motion vector difference is derived to have a x component and/or y component whose values are allowed according to rule.

83. The method of clause 82, wherein the rule specifies that the derived motion vector difference, (vx, vy), has a value obtained using a floor function, ceiling function, or a sign function, whereby the floor function, floor(t), returns the largest integer less than or equal to t, the ceiling function, ceil(t), returns the smallest integer greater than or equal to t, and the sign function, sign(t), returns a value depending on a sign of t.

84. The method of clause 82, wherein the rule specifies to obtain the derived motion vector difference, (vx, vy), such that i) vx is derived by using at least one of a numerator (numX) and a denominator (denoX) and/or ii) vy is derived using at least one of a numerator (numY) and a denominator (denoY).

85. The method of clause 84, wherein the rule specifies to use the numerator and/or the denominator as a variable used in a floor function, a ceiling function, or a sign function, whereby the floor function, floor(t), returns the largest integer less than or equal to t, the ceiling function, ceil(t), returns the smallest integer greater than or equal to t, and the sign function, sign(t), returns a value depending on a sign of t.

86. The method of clause 84, wherein the rule specifies that vx is derived as sign(numX*denoX)*esp2(M) whereby M is an integer that achieves a minimum value of cost(numX, denoX, M) and sign(t) returns a value depending on a sign of t.

87. The method of clause 84, wherein the rule specifies that vx is equal to zero or obtained as using an equation: $\text{sign}(numX*denoX)*K^{F1(\log\ K(abs(numX)+offset1))-F2(\log\ K(abs(denoX)+offset2))2}$, whereby offset1 and offset 2 are integers and sign(t) returns a value depending on a sign of t.

88. The method of clause 87, wherein the rule specifies that vx is equal to 0 in a case that i) denoX is equal to zero, ii) numX is equal to zero, iii) numX is equal to zero or denoX is equal to zero, iv) denoX is less than T1, v) numX is less than T1, or vi) numX is less than T1 or denoX is less than T2, whereby T1 and T2 are integers.

89. The method of clause 87, wherein the offset1 depends on numX.

90. The method of clause 87, wherein the offset1 is equal to $K^{floor(\log\ K(abs(numX)))}/2+P$, whereby P is an integer, floor(t) returns the largest integer less than or equal to t, log K(x) returns a logarithm of x in base K, and abs(t) returns to an absolute value of t.

91. The method of clause 87, wherein the offset2 depends on denoX.

92. The method of clause 87, wherein the offset1 is equal to $K^{floor(\log\ K(abs(denoX)))}/2+P$, whereby P is an integer, floor(t) returns the largest integer less than or equal to t, log K(x) returns a logarithm of x in base K, and abs(t) returns to an absolute value of t.

93. The method of clause 84, wherein the rule specifies that vx is dependent on a value of delta that is obtained as an equation, delta=floor(log 2(abs(numX)))−floor (log 2(abs(denoX))), whereby floor(t) returns the largest integer less than or equal to t, log K(x) returns a logarithm of x in base K, and abs(t) returns to an absolute value of t.

94. The method of clause 93, wherein the delta is modified in a case that 1) floor(log 2(abs(numX))) is greater than 0 and abs(numX) & (1<<(floor(log 2(abs(numX)))−1)) is not equal to zero or 2) floor(log 2(abs(denoX))) is greater than 0 and abs(denoX) & (1<<(floor(log 2(abs (denoX)))−1)) is not equal to zero.

95. The method of clause 93, wherein vx is set to 0 in a case that delta is less than 0.

96. The method of any of clauses 83 to 95, wherein at least one of vx and vy are used to derive a parameter indicating prediction sample values used in the BDOF or a parameter indicating a luma prediction refinement used in PROF.

97. The method of clause 96, wherein the parameter indicating prediction sample values used in the BDOF is bdofOffset that is derived using an equation, bdofOffset=Round((vx*(gradientHL1[x+1][y+1]−gradientHL0[x+1][y+1]))>>1)+Round((vy*(gradientVL1[x+1][y+1]−gradientVL0[x+1][y+1]))>>1).

98. The method of clause 96, wherein the parameter indicating a luma prediction refinement used in PROF is ΔI that is derived using an equation, ΔI(posX, posY)=dMvH[posX][posY]×gradientH[posX][posY]+ dMvV[posX][posY]×gradientV[posX][posY], whereby dMvH[posX][posY] and dMvV[posX][posY] corresponding to vx and vy.

99. The method of clause 65, wherein at least one of a horizontal component and a vertical component of the derived motion vector difference is derived depending on a tool used for the refinement operation and modified to be within the candidate set associated with the tool.

100. The method of clause 99, wherein the at least one of the horizontal component and the vertical component of the derived motion vector difference is modified by a modification process that is unified despite the tool.

101. The method of clause 65, wherein a cost is calculated using a cost function for each candidate value and a candidate value corresponding to a minimum cost value is selected as a final motion vector difference (vx, vy).

102. The method of clause 65, wherein the candidate set is pre-defined.

103. The method of clause 102, wherein the candidate set includes a candidate (vx, vy) such that at least one of vx and vy is in a form $-2^x/2^X$ whereby x is in a range $[-(X-1), (X-1)]$.

104. The method of clause 102, wherein the candidate set includes a candidate (vx, vy) such that vx and vy are only from one of sets including i) $\{-32, -16, -8, -4, -2, -1, 0, 1, 2, 4, 8, 16, 32\}/64$, ii) $\{-32, -16, -8, -4, -2, -1, 0, 1, 2, 4, 8, 16, 32\}$, iii) $\{-32, -16, -8, -4, -2, -1, 0, 1, 2, 4, 8, 16, 32\}/32$, iv) $\{-64, -32, -16, -8, -4, -2, -1, 0, 1, 2, 4, 8, 16, 32, 64\}$, v) $\{-64, -32, -16, -8, -4, -2, -1, 0, 1, 2, 4, 8, 16, 32, 64\}/64$, vi) $\{-128, -64, -32, -16, -8, -4, -2, -1, 0, 1, 2, 4, 8, 16, 32, 64, 128\}/128$, or vii) $\{-128, -64, -32, -16, -8, -4, -2, -1, 0, 1, 2, 4, 8, 16, 32, 64, 128\}$.

105. The method of clause 102, wherein the candidate set includes a candidate (vx, vy) such that a horizontal and/or vertical component of the candidate is in a form of $S \times 2^m/2^n$, whereby S is 1 or −1 and m and n are integers.

106. The method of clause 65, wherein the candidate set is dependent on coded information of the current video block.

107. The method of clause 65, wherein the candidate set is signaled at a video unit level including a sequence, a picture, a slice, a tile, a brick, or another video region.

108. The method of clause 65, wherein the refinement operation on a sample during a bi-directional optical flow (BDOF) or a prediction refinement optical flow (PROF) excludes multiplication operations.

109. A video processing method, comprising: applying, during a bi-directional optical flow (BDOF) operation used to refine motion information associated with a current video block of a video unit of a video, a clipping operation using a set of clipping parameters that is determined according to a rule based on the video unit and/or usage of coding tool in the video unit; and performing a conversion between the current video block and a coded representation of the video.

110. The method of clause 109, wherein the rule specifies to use different sets of clipping parameters for different video units of the video.

111. The method of clause 109 or 110, wherein the video unit corresponds to a sequence, a picture, a slice, a tile group, tile, a coding tree unit, or a coding unit.

112. The method of clause 109, wherein a horizontal motion vector difference and a vertical motion vector difference are clipped to different threshold values from each other.

113. The method of clause 109, wherein a threshold value used in the clipping operation depends on a dimension of a picture including the current video block and/or decoded motion information of the current video block.

114. The method of clause 109, wherein a threshold value used in the clipping operation is signaled in a sequence parameter set (SPS), a video parameter set (VPS), an adaptation parameter set (APS), a picture parameter set (PPS), a slice header, and/or a tile group header.

115. The method of clause 109, wherein the rule specifies to determine the set of clipping parameters based on usage of a decoder-side motion vector difference (DMVR) or an affine inter mode.

116. The method of clause 109, wherein values of the clipping parameters increase or decrease depending on whether the coding tool is disabled for the video unit or not.

117. A video processing method, comprising: applying, during a refinement operation used to refine motion information associated with a current video block of a video, a clipping operation according to a rule to clip x component and/or y component of a motion vector difference (vx, vy); and performing a conversion between the current video block and a coded representation of the video using the motion vector difference, wherein the rule specifies to convert the motion vector difference to zero or a value in a form of $K^{-n}$ before or after the clipping operation, whereby m is an integer.

118. The method of clause 117, wherein the motion vector difference (vx, vy) has values corresponding to vx and vy that are used in a BDOF to derive bdofOffset according to an equation, bdofOffset=Round((v$_x$*(gradientHL1[x+1][y+1]−gradientHL0[x+1][y+1]))>>1)+Round((vy*(gradientVL1[x+1][y+1]−gradientVL0[x+1][y+1]))>>1).

119. The method of clause 117, wherein the motion vector difference (vx, vy) has values corresponding to dMvH[posX][posY] and dMvV[posX][posY] that are used in a PROF to derive ΔI according to an equation, ΔI(posX, posY)=dMvH[posX][posY]×gradientH[posX][posY]+dMvV[posX][posY]×gradientV[posX][posY].

120. The method of clause 117, wherein the rule uses different ranges for the x component and the y component depending on a type of the refinement operation.

121. A video processing method, comprising: selecting, for a conversion between a current video block of a video and a coded representation of the video, a search region used to derive or refine motion information during a decoder-side motion derivation operation or a decoder-side motion refinement operation according to a rule; and performing the conversion based on derived or refined motion information.

122. The method of clause 121, wherein the rule specifies to select a non-square motion vector difference (MVD) region.

123. The method of clause 122, wherein the non-square MVD region corresponds to a 5*5 diamond region, 5*5 octagon region, or 3*3 diamond region.

124. The method of clause 121, wherein the search region has different search ranges in a horizontal direction and a vertical direction.

125. The method of clause 121, wherein the rule specifies to select the search region based on a dimension and/or a shape of the current video block, and wherein the dimension corresponds to at least one of a height (H) and a width (W) of the current video block.

126. The method of clause 125, wherein the rule specifies, depending on the dimension of the current video block, a horizontal MVD search range to be smaller than a vertical MVD search range or to search a diamond MVD space.

127. The method of clause 121, wherein the rule specifies to select the search region based on motion information of the current video block that is before being refined.

128. The method of clause 127, wherein the rule specifies, depending on the motion information including sumAbsHorMv and/or sumAbsHorMv, a horizontal MVD search range to be smaller than a vertical MVD search range or to search a diamond MVD space, whereby sumAbsHorMv=abs(MV0[0])+abs(MV1[0]), sumAbsVerMv=abs(MV0[1])+abs(MV1[1]), and abs (MVx) refers to an absolute value of Mvx.

129. The method of clause 121, wherein the rule specifies to select a horizontal search range and/or a vertical search range based on reference pictures.

130. The method of clause 121, wherein the rule specifies to select a horizontal search range and/or a vertical search range based on magnitudes of motion vectors.

131. A video processing method, comprising: applying, for a conversion between a current video block of a video and a coded representation of the video, a decoder-side motion vector difference (DMVR) operation to refine a motion vector difference associated with the current video block by using a search region used in the refining including a best matching integer position; and performing the conversion using refined motion vector difference, wherein the applying of the DMVR operation includes deriving a sub-pel motion vector difference (MVD) according to a rule.

132. The method of clause 131, wherein the rule specifies to derive a horizontal sub-pel MVD in a case that left and right positions of the best matching integer position are both included in the search region.

133. The method of clause 131, wherein the rule specifies to derive a vertical sub-pel MVD in a case that above and below positions of the best matching integer position are both included in the search region.

134. The method of clause 131, wherein the rule specifies to derive the sub-pel MVD for certain positions.

135. A video processing method, comprising: applying, for a current video block of a video unit of a video, a decoder-side motion vector difference (DMVR) operation to refine a motion vector difference associated with the current video block; and performing a conversion between the current video block and a coded representation of the video using refined motion vector difference, wherein the applying of the DMVR operation includes determining to allow or disallow a sub-pel motion vector difference (MVD) derivation depending on use of a bi-directional optical flow (BDOF) for the video unit.

136. The method of clause 135, wherein the video unit corresponds to a picture, a slice, a tile group, a tile, a coding tree unit, or a coding unit.

137. The method of clause 135, wherein the sub-pel MVD derivation is disallowed due to the use of the BDOF for the video unit.

138. The method of clause 135, wherein the sub-pel MVE derivation is allowed due to non-use of the BDOF for the video unit.

139. A video processing method, comprising: deriving, during a refinement operation using an optical flow, a motion vector difference of a first sample of a current video block of a video; determining a motion vector difference of a second sample based on a derived motion vector difference of the first sample; and performing a conversion between the current video block and a coded representation of the video based on the determining.

140. The method of clause 139, wherein the refinement operation is performed using a prediction refinement with optical flow (PROF) and wherein the motion vector difference of the first sample is derived using an affine model for a position within the current video block and used to determine the motion vector difference of the second sample for a different position.

141. The method of clause 139, wherein the motion vector difference of the first sample located in an upper part is derived using an affine model and used to determine the motion vector difference of the second sample located in a lower part, whereby the current video block has a width (W) and a height (H), the upper part and the lower part have a size of W*H/2.

142. The method of clause 139, wherein the motion vector difference of the first sample located in a lower part is derived using an affine model and used to determine the motion vector difference of the second sample located in an upper part, whereby the current video block has a width (W) and a height (H), the upper part and the lower part have a size of W*H/2.

143. The method of clause 139, wherein the motion vector difference of the first sample located in a left part is derived using an affine model and used to determine the motion vector difference of the second sample located in a right part, whereby the current video block has a width (W) and a height (H), the left part and the right part have a size of W/2*H.

144. The method of clause 139, wherein the motion vector difference of the first sample located in a right part is derived using an affine model and used to determine the motion vector difference of the second sample located in a left part, whereby the current video block has a width (W) and a height (H), the left part and the right part have a size of W/2*H.

145. The method of clause 139, wherein the motion vector difference of the first sample is derived using an affine model and rounded to a predefined precision or/and clipped to a predefined range before being used to determine the motion vector difference of the second sample.

146. The method of clause 139, wherein, for the first sample or the second sample at a position (x,y), MVDh and MVDv are horizontal and vertical motion vector differences, respectively, and obtained by using equations: $MVDh(x,y)=-MVDh(W-1-x, H-1-y)$ and $MVDv(x,y)=-MVDv(W-1-x, H-1-y)$, whereby W and H are width and height of the current video block.

147. A video processing method, comprising: deriving a prediction refinement sample by applying a refinement operation using a bi-directional optical flow (BDOF) operation to a current video block of a video; determining, according to a rule, an applicability of a clipping operation to clip the derived prediction refinement sample to a predetermined range [−M, N], whereby M and N are integers; and performing a conversion between the current video block and a coded representation of the video.

148. The method of clause 147, wherein the rule determines to apply the clipping operation.

149. The method of clause 147, wherein N is equal to a value of M−1.

150. The method of clause 147, wherein the predefined range depends on a bit depth of a color component of the current video block.

151. The method of clause 150, wherein M is equal to $2^K$, K=Max(K1, BitDepth+K2), whereby BitDepth is a bit depth of a color component of the current video block, whereby K1 and K2 are integers.

152. The method of clause 150, M is equal to $2^K$, K=Min(K1, BitDepth+K2), whereby BitDepth is a bit depth of a color component of the current video block, whereby K1 and K2 are integers.

153. The method of clause 147, wherein the predefined range is applied to another video block using a prediction refinement optical flow (PROF).

154. The method of clause 147, wherein the rule determines not to apply the clipping operation.

155. A video processing method, comprising: determining coding group sizes for a current video block including a first coding group and a second coding group that are coded using different residual coding modes such that sizes of the first coding group and the second coding group are aligned according to a rule; and performing a conversion between the current video block and a coded representation of the video based on the determining.

156. The method of clause 155, wherein the first coding group is coded using a transform skip mode in which a transform is bypassed or an identify transform is applied, and wherein the rule specifies that a size of the first coding group is determined based on whether the current video block contains more than 2*M samples and/or a residual block size.

157. The method of clause 155, wherein the first coding group is coded without using a transform skip mode in which a transform is bypassed or an identify transform is applied, and wherein the rule specifies that a size of the first coding group is determined based on whether a width (W) or height (H) of the current video block is equal to K, whereby K is an integer.

158. The method of clause 155, wherein the first coding group and the second coding group are coded using a transform skip mode and a regular residual coding mode, respectively, and wherein the rule specifies that the first coding group and the second coding group have a size of 2*2, 2*8, 2*8, 2*4, 8*2, or 4*2.

159. The method of clause 158, wherein the size is used for N*2 or N*2 residual blocks, whereby N is an integer.

160. A video processing method, comprising: determining, for a conversion between a current video block of a video and a coded representation of the video, an applicability of a prediction refinement optical flow (PROF) tool in which motion information is refined using an optical flow, based on coded information and/or decoded information associated with the current video block; and performing the conversion based on the determining.

161. The method of clause 160, wherein the current video block is coded using an affine mode.

162. The method of clause 161, wherein the determining determines not to apply the PROF tool due to a reference picture used in the conversion having a different dimension than a dimension of a current picture that contains the current video block.

163. The method of clause 161, wherein the determining determines to apply the PROF tool due to the conversion using a bi-predictive prediction and both reference pictures having same dimensions.

164. The method of clause 161, wherein the applicability of the PROF tool is determined depending on a resolution ratio between a reference picture and a current picture including the current video block.

165. The method of clause 160, wherein the determining determines not to apply the PROF tool according to a rule specifying a certain condition.

166. The method of clause 165, wherein the certain condition includes i) a generalized bi-prediction is enabled, ii) a weight prediction is enabled, or iii) a half pixel interpolation filter is applied.

167. The method of any of clauses 1 to 166, wherein information related to the refinement operation is signaled at a video unit level including a sequence, a picture, a slice, a tile, a brick, or another video region.

168. The method of any of clauses 1 to 166, wherein the refinement operation is performed according to a rule based on coded information of the current video block depending on whether a bi-directional optical flow (BDOF) or a prediction refinement optical flow (PROF) is applied to the current video block.

169. The method of any of clauses 1 to 168, wherein the conversion comprises generating the coded representation from the video or generating the video from the coded representation.

170. An apparatus in a video system comprising a processor and a non-transitory memory with instructions thereon, wherein the instructions upon execution by the processor, cause the processor to implement the method in any one of clauses 1 to 169.

171. A computer program product stored on a non-transitory computer readable media, the computer program product including program code for carrying out the method in any one of clauses 1 to 169.

From the foregoing, it will be appreciated that specific embodiments of the presently disclosed technology have been described herein for purposes of illustration, but that various modifications may be made without deviating from the scope of the disclosed technology. Accordingly, the presently disclosed technology is not limited except as by the appended claims.

Implementations of the subject matter and the functional operations described in the present disclosure can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., erasable programmable read-only memory (EPROM), electrically erasable programmable read-only memory (EEPROM), and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While the present disclosure contains many specifics, these should not be construed as limitations on the scope of any embodiment or of what may be claimed, but rather as descriptions of features that may be specific to particular embodiments of particular inventions. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method of processing video data, comprising:
determining, for a first conversion between a first bi-predicted video block of a video and a bitstream of the video, that a first optical flow-based method is performed on the first bi-predicted video block, wherein at least one first motion vector offset is derived to refine prediction samples of a region within the first bi-predicted video block in the first optical flow-based method;
clipping the at least one first motion vector offset to a first range;
performing the first conversion based on at least one clipped first motion vector offset;
determining, for a second conversion between a second affine video block of the video and the bitstream, that a second optical flow-based method different from the first optical flow-based method is performed on the second affine video block, wherein at least one second motion vector offset is derived to refine prediction samples of a region within the second affine video block in the second optical flow-based method;
clipping the at least one second motion vector offset to a second range; and
performing the second conversion based on at least one clipped second motion vector offset,
wherein the first range is different from the second range,
wherein the first range is [−N0, M0] and the second range is [−N1, M1], wherein N0, M0, N1 and M1 are integers, and
wherein N0 and M0 have a same value which is unequal to $2^{K0}$ and equal to $2^{K0}-1$, and N1 and M1 have a same value which is unequal to $2^{K1}$ and equal to $2^{K1}-1$, wherein K0 and K1 are different integers.

2. The method of claim 1, wherein [−N0, M0] is [−15, 15].

3. The method of claim 1, wherein [−N1, M1] is [−31, 31].

4. The method of claim 1, wherein the region within the first bi-predicted video block is a whole first bi-predicted video block or a sub-block within the first bi-predicted video block, and the region within the second affine video block is a whole second affine video block or a sub-block within the second affine video block.

5. The method of claim 1, wherein the first motion vector offset comprises a horizontal component and a vertical component, and wherein the clipping comprises clipping the horizontal component and/or the vertical component of the first motion vector offset to the first range; and/or wherein the second motion vector offset comprises a horizontal component and a vertical component, and wherein the clipping comprises clipping the horizontal component and/or the vertical component of the second motion vector offset to the second range.

6. The method of claim 1, wherein the first conversion comprises encoding the first bi-predicted video block into the bitstream and the second conversion comprises encoding the second affine video block into the bitstream.

7. The method of claim 1, wherein the first conversion comprises decoding the first bi-predicted video block from the bitstream and the second conversion comprises decoding the second affine video block from the bitstream.

8. An apparatus for processing video data comprising a processor and a non-transitory memory with instructions thereon, wherein the instructions upon execution by the processor, cause the processor to:

determine, for a first conversion between a first bi-predicted video block of a video and a bitstream of the video, that a first optical flow-based method is performed on the first bi-predicted video block, wherein at least one first motion vector offset is derived to refine prediction samples of a region within the first bi-predicted video block in the first optical flow-based method;

clip the at least one first motion vector offset to a first range;

perform the first conversion based on at least one clipped first motion vector offset;

determine, for a second conversion between a second affine video block of the video and the bitstream, that a second optical flow-based method different from the first optical flow-based method is performed on the second affine video block, wherein at least one second motion vector offset is derived to refine prediction samples of a region within the second affine video block in the second optical flow-based method;

clip the at least one second motion vector offset to a second range; and perform the second conversion based on at least one clipped second motion vector offset, wherein the first range is different from the second range, wherein the first range is [−N0, M0] and the second range is [−N1, M1], wherein N0, M0, N1 and M1 are integers, and wherein N0 and M0 have a same value which is unequal to $2^{K0}$ and equal to $2^{K0}-1$, and N1 and M1 have a same value which is unequal to $2^{K1}$ and equal to $2^{K1}-1$, wherein K0 and K1 are different integers.

9. The apparatus of claim 8, wherein [−N0, M0] is [−15, 15].

10. The apparatus of claim 8, wherein [−N1, M1] is [−31, 31].

11. A non-transitory computer-readable storage medium storing instructions that cause a processor to:

determine, for a first conversion between a first bi-predicted video block of a video and a bitstream of the video, that a first optical flow-based method is performed on the first bi-predicted video block, wherein at least one first motion vector offset is derived to refine prediction samples of a region within the first bi-predicted video block in the first optical flow-based method;

clip the at least one first motion vector offset to a first range; and perform the first conversion based on at least one clipped first motion vector offset;

determine, for a second conversion between a second affine video block of the video and the bitstream, that a second optical flow-based method different from the first optical flow-based method is performed on the second affine video block, wherein at least one second motion vector offset is derived to refine prediction samples of a region within the second affine video block in the second optical flow-based method;

clip the at least one second motion vector offset to a second range; and perform the second conversion based on at least one clipped second motion vector offset, wherein the first range is different from the second range, wherein the first range is [−N0, M0] and the second range is [−N1, M1], wherein N0, M0, N1 and M1 are integers, and wherein N0 and M0 have a same value which is unequal to $2^{K0}$ and equal to $2^{K0}-1$, and N1 and M1 have a same value which is unequal to $2^{K1}$ and equal to $2^{K1}-1$, wherein K0 and K1 are different integers.

12. The non-transitory computer-readable storage medium of claim 11, wherein [−N0, M0] is [−15, 15].

13. The non-transitory computer-readable storage medium of claim 11, wherein [−N1, M1] is [−31, 31].

14. A non-transitory computer-readable recording medium storing a bitstream of a video which is generated by a method performed by a video processing apparatus, wherein the method comprises:

determining, for a first bi-predicted video block of the video that a first optical flow-based method is performed on the first bi-predicted video block, wherein at least one first motion vector offset is derived to refine prediction samples of a region within the first bi-predicted video block in the first optical flow-based method;

clipping the at least one first motion vector offset to a first range; and generating the bitstream based on at least one clipped first motion vector offset;

determining, for a second affine video block of the video, that a second optical flow-based method different from the first optical flow-based method is performed on the second affine video block, wherein at least one second motion vector offset is derived to refine prediction samples of a region within the second affine video block in the second optical flow-based method;

clipping the at least one second motion vector offset to a second range; and generating the bitstream based on at least one clipped second motion vector offset, wherein the first range is different from the second range, wherein the first range is [−N0, M0] and the second range is [−N1, M1], wherein N0, M0, N1 and M1 are integers, and wherein N0 and M0 have a same value which is unequal to $2^{K0}$ and equal to $2^{K0}-1$, and N1 and M1 have a same value which is unequal to $2^{K1}$ and equal to $2^{K1}-1$, wherein K0 and K1 are different integers.

* * * * *